US008811907B2

(12) United States Patent
Hosoya et al.

(10) Patent No.: US 8,811,907 B2
(45) Date of Patent: Aug. 19, 2014

(54) CONTROL METHOD OF RADIO COMMUNICATION SYSTEM, RADIO COMMUNICATION SYSTEM, AND RADIO COMMUNICATION APPARATUS

(75) Inventors: Kenichi Hosoya, Tokyo (JP); Kenichi Maruhashi, Tokyo (JP); Naoyuki Orihashi, Tokyo (JP)

(73) Assignee: NEC Corporation, Tokyo (JP)

( * ) Notice: Subject to any disclaimer, the term of this patent is extended or adjusted under 35 U.S.C. 154(b) by 250 days.

(21) Appl. No.: 13/505,692

(22) PCT Filed: Nov. 2, 2010

(86) PCT No.: PCT/JP2010/006470
§ 371 (c)(1),
(2), (4) Date: May 2, 2012

(87) PCT Pub. No.: WO2011/055535
PCT Pub. Date: May 12, 2011

(65) Prior Publication Data
US 2012/0220238 A1 Aug. 30, 2012

(30) Foreign Application Priority Data
Nov. 4, 2009 (JP) ................................ 2009-253118

(51) Int. Cl.
*H04B 1/00* (2006.01)

(52) U.S. Cl.
USPC ...................... 455/63.4; 455/575.7

(58) Field of Classification Search
CPC ............................ H04W 16/28; H04B 1/3838
USPC ............................................. 455/63.4, 575.7
See application file for complete search history.

(56) References Cited

U.S. PATENT DOCUMENTS 6,879,845 B2 * 4/2005 Suzuki et al. .............. 455/562.1
7,164,932 B1 * 1/2007 Sato et al. .................. 455/562.1
(Continued)

FOREIGN PATENT DOCUMENTS

CN      1841961 A      10/2006
JP      11-252614 A    9/1999
(Continued)

OTHER PUBLICATIONS

Alalusi, Sayf, et al, "A 60GHz Phase Array in CMOS," IEEE 2006 Custom Intergrated Circuits Conference (CICC), 2006, pp. 393-396.
Buckwalter, James F., et al., "An Integrated Subharmonic Coupled-Oscillator Scheme for a 60-GHz Phased-Array Transmitter," IEEE Transactions on MicrowaveTheory and Techniques, Dec. 2006, pp. 4271-4280, vol. 54, No. 12.
(Continued)

*Primary Examiner* — April G Gonzales
(74) *Attorney, Agent, or Firm* — Sughrue Mion, PLLC

(57) ABSTRACT

A communication device 1 (transceivers 400) transmits a training signal from its own transmitting antenna while performing beam scanning, and a communication device 2 (transceivers 500) receives this training signal in a state where a quasi-omni pattern is generated in its own receiving antenna. Further, the device 1 transmits a training signal in a state where a quasi-omni pattern is generated in the transmitting antenna, and the device 2 receives this training signal by the receiving antenna while performing beam scanning. The device 1 and 2 detects, from respective reception results, transmitting-antenna-setting candidates of the device 1 and receiving-antenna-setting candidates of the device 2,and determines antenna-setting pairs (combinations of antenna-setting candidates). The above-described processes are also performed for a receiving antenna of the device 1 and a transmitting antenna of the device 2. The device 1 and 2 communicates by using the obtained antenna-setting pairs. In this way, when radio communication is performed by using beam forming, the time necessary for finding and setting a beam direction is reduced, thereby reducing the transmission-disconnected time.

82 Claims, 27 Drawing Sheets

(56) References Cited

U.S. PATENT DOCUMENTS

| | | | |
|---|---|---|---|
| 7,710,319 B2* | 5/2010 | Nassiri-Toussi et al. | 342/377 |
| 8,000,648 B2* | 8/2011 | Yoshida et al. | 455/7 |
| 2002/0068590 A1* | 6/2002 | Suzuki et al. | 455/466 |
| 2005/0073976 A1* | 4/2005 | Fujii | 370/334 |
| 2005/0075142 A1 | 4/2005 | Hoffmann et al. | |
| 2007/0205943 A1* | 9/2007 | Nassiri-Toussi et al. | 342/377 |
| 2008/0045143 A1* | 2/2008 | Yoshida et al. | 455/7 |

FOREIGN PATENT DOCUMENTS

| | | |
|---|---|---|
| JP | 2000-165959 A | 6/2000 |
| JP | 2000-307494 A | 11/2000 |
| JP | 2002-100917 A | 4/2002 |
| JP | 2003-332971 A | 11/2003 |
| JP | 2005-323189 A | 11/2005 |
| JP | 2006-245983 A | 9/2006 |
| JP | 2007-524272 A | 8/2007 |
| WO | 2008/090836 A1 | 7/2008 |

OTHER PUBLICATIONS

Lakkis, Ismail, et al., "TG3c CaH for Proposals," IEEE P802.15 Wireless Personal Area Networks (WPANs), May 2008, 15-08-0355-00-003c.

Maruhashi, Kenichi, et al., "60-GHz-band LTCC Module Technology for Wireless Gigabit Transceiver Applications," IEEE International Workshop on Radio Frequency Integration Technology, Nov. 30-Dec. 2, 2005, pp. 131-134.

Ohata, Keiichi, et al., "1.25Gbps Wireless Gigabit Ethernet Link at 60GHz-Band," IEEE MTT-S International Microwave Symposium, Jun. 2003, pp. 373-376.

Sato, Katsuyoshi, et al., "Channel Model for Millimeter Wave WPAN," The 18th Annual IEEE International Symposium on Personal, Indoor and Mobile Radio Communications (PIMRC'07), 2007.

Communication dated Jan. 24, 2014, issued by the State Intellectual Property Office of the People's Republic of China in corresponding Application No. 201080050280.7.

* cited by examiner

| ANTENNA SETTING IDENTIFICATION NUMBER (COMMUNICATION DEVICE 1 TRANSMISSION) | RELATIVE RECEIVED POWER (dB) |
|---|---|
| 0 | −16 |
| 1 | −18 |
| ⋮ | ⋮ |
| 6 | −10 |
| ⋮ | ⋮ |
| 14 | 0 |
| ⋮ | ⋮ |
| 30 | −17 |

| ANTENNA SETTING IDENTIFICATION NUMBER (COMMUNICATION DEVICE 1 TRANSMISSION) | RADIATION ANGLE (DEGREE) (COMMUNICATION DEVICE 1 TRANSMISSION) | RELATIVE RECEIVED POWER (dB) |
|---|---|---|
| 0 | − 60 | − 16 |
| 1 | − 56 | − 18 |
| ⋮ | ⋮ | ⋮ |
| 6 | − 36 | − 10 |
| ⋮ | ⋮ | ⋮ |
| 14 | − 4 | 0 |
| ⋮ | ⋮ | ⋮ |
| 30 | + 60 | − 17 |

| | IDENTIFICATION NUMBER OF ANTENNA SETTING CANDIDATE (COMMUNICATION DEVICE 1 TRANSMISSION) |
|---|---|
| 1 | 14 |
| 2 | 20 |
| 3 | 6 |
| 4 | 26 |

Fig. 16

| ORDER | ANTENNA SETTING IDENTIFICATION NUMBER (COMMUNICATION DEVICE 1 TRANSMISSION) | ANTENNA SETTING IDENTIFICATION NUMBER (COMMUNICATION DEVICE 2 TRANSMISSION) |
|---|---|---|
| 1 | 14 | 16 |
| 2 | 20 | 10 |
| 3 | 6 | 2 |
| 4 | 26 | 7 |

Fig. 17

CONTROL METHOD OF RADIO COMMUNICATION SYSTEM, RADIO COMMUNICATION SYSTEM, AND RADIO COMMUNICATION APPARATUS

CROSS REFERENCE TO RELATED APPLICATION

This application is a National Stage of International Application No. PCT/JP2010/006470, filed on Nov. 2, 2010, which claims priority from Japanese Patent Application No. 2009-253118, filed on Nov. 4, 2009, the contents of all of which are incorporated herein by reference in their entirety.

TECHNICAL FIELD

The present invention relates to a system that performs radio communication by adaptively controlling radio beams, and its control method.

BACKGROUND ART

In recent years, use of radio devices using wideband millimeter waves (30 GHz to 300 GHz) has become increasingly widespread. The millimeter-wave radio technology has been expected to be used especially for high-rate radio data communication in the order of gigabit such as radio transmission of high-resolution images (for example, see Non-patent literatures 1, 2 and 3).

However, millimeter waves having high frequencies have a high rectilinear propagation property, and therefore they cause a problem in cases where radio transmission is to be implemented indoors. In addition to the high rectilinear propagation property, millimeter waves are significantly attenuated by a human body or a similar object. Therefore, if a person stands between the transmitter and the receiver in a room or a similar circumstance, no unobstructed view can be obtained, thus making the transmission very difficult (shadowing problem). This problem results from the fact that the propagation environment has been changed because of the increase in the rectilinear propagation property of the radio waves, which results from the increase in the frequency. Therefore, this problem is not limited to the millimeter waveband (30 GHz and above). Although it is impossible to clearly specify the transition frequency at which the propagation environment of the radio waves changes, it has been believed to be around 10 GHz. Note that according to recommendations of the International Telecommunications Union ("Propagation data and prediction methods for the planning of indoor radio communication systems and radio local area networks in the frequency range 900 MHz to 100 GHz," ITU-R, P.1238-3,Apr., 2003), a power loss coefficient, which indicates the attenuation amount of a radio wave with respect to the propagation distance, is 22 for 60 GHz in an office, while it is 28 to 32 for 0.9 to 5.2 GHz. Considering that it is 20 in the case of free-space loss, the effects of scattering, diffraction, and the like are considered to be small in higher frequencies such as 60 GHz.

To solve the problem described above, Patent literature 2,for example, discloses a system in which a plurality of transmission paths are provided by installing a plurality of receiving units in the receiver, so that when one of the transmission paths between the transmitter and the receiving units is shielded, the transmission is carried out by another transmission path(s).

Further, as another method for solving the problem, Patent literature 3 discloses a contrivance to secure a plurality of transmission paths by installing reflectors on the walls and ceilings.

The method disclosed in Patent literature 2 cannot carry out transmission when shielding occurs in the vicinity of the transmitter or when all of the installed receiving units are shielded. Meanwhile, the method disclosed in Patent literature 3 requires users to give particular consideration to the configuration. For example, the reflectors need to be installed with consideration given to the positions of the transmitter and the receiver.

However, recent studies on propagation properties of millimeter waves have found out that reflected waves could be utilized without intentionally installing reflectors. FIG. 26 shows a configuration of a system using a wide-angle antenna, and FIG. 27 shows an example of a delay profile of a system using a wide-angle antenna like the one shown in FIG. 26 when the system is used indoors. In the system using the wide-angle antennas shown in FIG. 26, the received power of the dominant wave, which arrives faster than any other waves, is larger than that of any other waves as shown in FIG. 27. After that, although delayed waves such as the second and third waves arrive, their received power is smaller. These second and third waves are waves reflected from the ceiling and the walls. This situation is remarkably different from the propagation environment of radio waves having a lower rectilinear propagation property, such as a 2.4 GHz band used in wireless LANs (Local Area Networks). In 2.4 GHz band, it is very difficult to clearly separate waves in their directions-of-Arrival (DoAs) because of the effects of diffraction and multiple reflections. In contrast to this, in the millimeter waves having a high rectilinear propagation property, although radio waves are relatively clearly distinguished in their DoAs, the number of delayed waves is limited and their received-signal levels are small.

Therefore, when the direct wave is blocked, it is necessary to ensure a sufficient received-signal level by pointing a narrow beam having a high directive gain to a DOA of a reflected wave as shown in FIGS. 25A and 25B in order to continue the transmission by using the reflected wave. However, in order to free users from the need to give particular consideration to the configuration such as the relative positions of the transmitter and receiver, a beam forming technique capable of dynamically controlling a narrow beam is indispensable.

To implement beam forming, it is necessary to use an antenna having function of controlling its directivity. Typical antennas for such use include a phased array antenna. For millimeter waves having a short wavelength (e.g., 5 mm in the case of a frequency of 60 GHz), the phased array antenna can be implemented in a small area, and phase shifter arrays and oscillator arrays for use in those antenna arrays have been developed (for example, see Non-patent literatures 3 and 4). In addition to the phased array antenna, a sector-selectable antenna and a mechanically-direction-adjustable antenna may be also used to implement the antenna directivity control.

Further, as a technique for a different purpose from the beam forming using an antenna array, direction-of-arrival (DOA) estimation techniques have been known. The DoA estimation techniques are used in, for example, radars, sonar, and propagation environment measurements, and used for estimating the DoAs and the power of radio waves to be received at antenna arrays with high accuracy. When a DoA estimation technique is used in propagation environment measurement with an installed radio wave source, an omni (nondirectional) antenna is often used as the radio wave source. For example, Non-patent literature 6 shows an example of such a technique.

CITATION LIST

Patent Literature

Patent literature 1: International Patent Application Publication No. WO 2008/090836
Patent literature 2: Japanese Patent Application Publication No. 2006-245986
Patent literature 3: Japanese Patent Application Publication No. 2000-165959
Patent literature 4: United States Patent Application Publication No. 2007/0205943

Non Patent Literature

Non-patent literature 1: K. Maruhashi et al., "60-GHz-band LTCC Module Technology for Wireless Gigabit Transceiver Applications", IEEE International Workshop on Radio-Frequency Integration Technology, Digest, pp. 131-134,Dec. 2005.
Non-patent literature 2: K. Ohata et al., "1.25 Gbps Wireless Gigabit Ethernet Link at 60 GHz-Band", IEEE MTT-S International Microwave Symposium, Digest, pp. 373-376,June 2003.
Non-patent literature 3: J. F. Buckwalter et al., "An Integrated Subharmonic Coupled-Oscillator Scheme for a 60-GHz Phased-Array Transmitter", IEEE Transactions on Microwave Theory and Techniques, Vol. 12,pp. 4271-4280,Dec. 2006.
Non-patent literature 4: S. Alausi et al., "A 60 GHz Phased Array in CMOS", IEEE 2006 Custom Integrated Circuits Conference, Digest, pp. 393-396,San Jose, Sep. 2006.
Non-patent literature 5: I. Lakkis et al., "IEEE P802.15 Working Group for Wireless Personal Area Networks (WPANS): TG3c Call for Proposals", 15-08-0355-00-003c, May, 2008.
Non-patent literature 6: K. Sato et al., "Channel model for millimeter wave WPAN", The 18th Annual IEEE International Symposium on Personal, Indoor and Mobile Radio communications (PIMRC'07), 2007.

SUMMARY OF INVENTION

Technical Problem

In indoor millimeter wave systems, when the direct wave is blocked and the radio transmission is to be continued by using reflected waves, the following problem arises.

When the wave (direct wave, reflected wave) that is actually used is switched, it is desirable to minimize the period during which the transmission is disconnected. Such minimization of the transmission disconnected period becomes especially an important requirement, for example, in the transmission of non-compressed images that requires a real-time capability. Meanwhile, when a reflected wave is used, it is necessary to increase the directive gain of the antenna and thereby to increase the reception strength by narrowing the antenna beam width.

However, the number of directions (steps) in which the search needs to be performed increases as the beam width becomes narrower. Therefore, the time necessary to search the beam directions and thereby set an optimal beam direction becomes longer, and therefore transmission-disconnected time also becomes longer. Accordingly, it has been desired to develop a beam direction setting method that can shorten the transmission-disconnected time even in such situations. It should be noted that the use of a device capable of temporally storing data is impractical because a huge buffer memory is required when the transmission-disconnected time becomes longer.

Characteristics of propagation paths between two communication devices are expressed by a channel response matrix. It has been known that if this channel response matrix is determined, the optimal combination of the antenna settings (hereinafter called "antenna-setting pair") of the transceivers can be obtained by using SVD (Singular-Value Decomposition). However on the other hand, since SVD is complex and requires a long processing time, it is very difficult to implement SVD, for example, in a non-compressed image transmission apparatus that requires a high-rate processing capability.

Accordingly, Patent literature 4,for example, discloses a method for obtaining an optimal AWV (Array weight vector) with which the signal strength is maximized by adding a unitary matrix (e.g., Hadamard matrix) as phases of the antenna array and repeating the training of the antenna array of the transmitter and the training of the antenna array of the receiver. Although this method can reduce the processing time in comparison to SVD, it still requires a certain time to obtain the optimal AWV combination because the switching between the transmission and the reception needs to be repeatedly carried out.

Meanwhile, Non-patent literature 5 discloses a technique to optimize a transmitting/receiving beam direction (antenna setting) by gradually increasing the beam resolution. However, this technique also requires measuring communication quality for a number of combinations of the transmitting/receiving beam directions (antenna settings) while repeatedly carrying out the switching between the transmission and the reception, and thereby requiring a huge amount of time to obtain an optimal beam combination.

Further, this literature also brings up an idea called "quasi-omni (quasi-nondirectional) pattern" as a beam having the lowest resolution. This quasi-omni pattern means a pattern having a constant antenna gain over a very wide angle in the space around the transceiver, though it is not a complete omni (nondirectional) pattern. Since it is often very difficult to obtain a complete omni pattern in antenna arrays, this quasi-omni pattern is often used as a substitute in such cases. Further, in the millimeter waveband, there are cases where it is very difficult to obtain a good quasi-omni pattern. Note that the "good quasi-omni pattern" means a radiation pattern having a sufficiently small antenna gain variation over a wide or desired angular range.

In general, when a link is to be established at the initial stage, it would be acceptable if the acquisition of an optimal antenna setting requires a long time. However, in a case where a link needs to be re-established due to disconnection of the transmission on the previously-established link, a fast search for another optimal antenna-setting pair is required. Further, in the case of multipoint communication, a faster search for an optimal antenna-setting pair is also required because it requires re-establishment of a plurality of links.

The present invention has been made in view of the above-described problems, and an object thereof is to provide a radio control method capable of, when radio communication is performed by using beam forming, reducing the time necessary for finding and setting a beam direction (antenna setting) and thereby reducing the transmission-disconnected time.

Solution to Problem

A method according to a first aspect of the present invention is a control method of a radio communication system including first and second communication devices. The first communication device is configured to be able to control a transmission beam direction of a first transmitting antenna by changing transmitting-antenna setting and to control a reception beam direction of a first receiving antenna by changing receiving-antenna setting. Further, the second communication device is configured to be able to control a transmission beam direction of a second transmitting antenna by changing transmitting-antenna setting and to control a reception beam direction of a second receiving antenna by changing receiving-antenna setting. The method according to this aspect includes the following steps (a) to (k):

(a) transmitting a training signal from the first transmitting antenna while changing antenna setting of the first transmitting antenna;

(b) receiving the training signal by the second receiving antenna in a state where a fixed beam pattern is set in the second receiving antenna;

(c) obtaining a data string describing a relation between antenna setting of the first transmitting antenna and a reception signal characteristic of the second receiving antenna based on a reception result of a training signal obtained in the step (b);

(d) determining at least one first transmitting-antenna-setting candidate, which serves as a candidate to be used for communication, of the first transmitting antenna by using the data string;

(e) determining at least one second transmitting-antenna-setting candidate, which serves as a candidate to be used for communication, of the second transmitting antenna, by performing the steps (a) to (d), which were performed by using the first transmitting antenna and the second receiving antenna, for a combination of the second transmitting antenna and the first receiving antenna;

(f) transmitting a training signal from the first transmitting antenna in a state where a fixed beam pattern is set in the first transmitting antenna;

(g) receiving the training signal by the second receiving antenna while changing antenna setting of the second receiving antenna;

(h) obtaining a data string describing a relation between antenna setting and a reception signal characteristic of the second receiving antenna based on a reception result of a training signal obtained in the step (g);

(i) determining at least one second receiving-antenna-setting candidate, which serves as a candidate to be used for communication, of the second receiving antenna by using the data string;

(j) determining at least one first receiving-antenna-setting candidate, which serves as a candidate to be used for communication, of the first receiving antenna, by performing the steps (f) to (i), which were performed by using the first transmitting antenna and the second receiving antenna, for a combination of the second transmitting antenna and the first receiving antenna; and (k) using the combination of the first transmitting-antenna-setting candidate and the second receiving antenna candidate, and the combination of the first receiving-antenna-setting candidate and the second transmitting antenna candidate for communication between the first and second communication devices.

A second aspect of the present invention relates to a radio communication system including first and second communication devices. The first communication device is configured to transmit a radio signal from a first transmitting antenna and to receive a radio signal by a first receiving antenna. The second communication device is configured to transmit a radio signal from a second transmitting antenna and to receive a radio signal by a second receiving antenna. Further, the first and second communication devices are configured to perform a process of determining a transmitting-antenna-setting candidate and a receiving-antenna-setting candidate used for radio communication in a cooperative manner. The determination process includes the following processes (a) to (k):

(a) transmitting a training signal from the first transmitting antenna while changing antenna setting of the first transmitting antenna and thereby changing a transmission beam direction;

(b) receiving the training signal by the second receiving antenna in a state where a fixed beam pattern is set in the second receiving antenna;

(c) obtaining a data string describing a relation between antenna setting of the first transmitting antenna and a reception signal characteristic of the second receiving antenna based on a reception result of a training signal obtained in the process (b);

(d) determining at least one first transmitting-antenna-setting candidate, which serves as a candidate to be used for communication, of the first transmitting antenna by using the data string;

(e) determining at least one transmitting-antenna-setting candidate, which serves as a candidate to be used for communication, of the second transmitting antenna, by performing similar processes to the processes (a) to (d) for determining the at least one first transmitting-antenna-setting candidate, for a combination of the second transmitting antenna and the first receiving antenna;

(f) transmitting a training signal from the first transmitting antenna in a state where a fixed beam pattern is set in the first transmitting antenna;

(g) receiving the training signal by the second receiving antenna while changing antenna setting of the second receiving antenna and thereby changing a reception beam direction;

(h) obtaining a data string describing a relation between antenna setting and a reception signal characteristic of the second receiving antenna based on a reception result of a training signal obtained in the process (g);

(i) determining at least one second receiving-antenna-setting candidate, which serves as a candidate to be used for communication, of the second receiving antenna by using the data string obtained in the process (h);

(j) determining at least one first receiving-antenna-setting candidate, which serves as a candidate to be used for communication, of the first receiving antenna, by performing similar processes to the processes (f) to (i) for determining the at least one second receiving-antenna-setting candidate, for a combination of the second transmitting antenna and the first receiving antenna; and (k) using the combination of the first transmitting-antenna-setting candidate and the second receiving antenna candidate, and the combination of the first receiving-antenna-setting candidate and the second transmitting antenna candidate for communication between the first and second communication devices.

A third aspect of the present invention relates to a radio communication apparatus that performs radio communication with a corresponding device. The radio communication apparatus includes a transmitting-antenna setting control unit, a receiving-antenna setting control unit, and a processing unit. The transmitting-antenna setting control unit controls a transmission beam direction of a first transmitting antenna by changing transmitting-antenna setting. The receiving-antenna setting control unit controls a reception beam direction of a first receiving antenna by changing receiving-antenna setting. The processing unit performs a process of determining a transmitting and receiving-antenna-setting candidate in a cooperative manner with the corresponding device, the transmitting and receiving-antenna-setting candidate being used for radio communication with the corresponding device. The determination process includes the following processes (a) to (c):

(a) determining at least one first transmitting-antenna-setting candidate to be used at a time of transmission performed by the radio communication apparatus and at least one first receiving-antenna-setting candidate to be used at a time of reception performed by the radio communication apparatus by performing at least one of (i) a first training in which the radio communication apparatus transmits a first training signal while changing transmitting-antenna setting and thereby changing a transmission beam direction and the corresponding device receives the first training signal while maintaining a reception beam pattern in a fixed state, and (ii) a second training in which the corresponding device transmits a second training signal while maintaining a transmission beam pattern in a fixed state and the radio communication apparatus receives the second training signal while changing receiving-antenna setting and thereby changing a reception beam direction;

(b) determining at least one second transmitting-antenna-setting candidate to be used at a time of transmission performed by the corresponding device and at least one second receiving-antenna-setting candidate to be used at a time of reception performed by the corresponding device by performing at least one of (i) a third training in which the corresponding device transmits a third training signal while changing transmitting-antenna setting and thereby changing a transmission beam direction and the radio communication apparatus receives the third training signal while maintaining a reception beam pattern in a fixed state, and (ii) a fourth training in which the radio communication apparatus transmits a fourth training signal while maintaining a transmission beam pattern in a fixed state and the corresponding device receives the fourth training signal while changing receiving-antenna setting and thereby changing a reception beam direction; and (c) applying a combination of the first transmitting-antenna-setting candidate and the second receiving-antenna-setting candidate, and a combination of the first receiving-antenna-setting candidate and the second transmitting-antenna-setting candidate for communication between the radio communication apparatus and the corresponding device.

A fourth aspect of the present invention relates to a control method of a radio communication system in which first and second communication devices perform radio communication with each other. The method includes the following steps (i) to (iii):

(i) selecting a transmission beam candidate of the first communication device by making the first communication device scan a beam direction and thereby transmit a first training signal and making the second communication device receive the first training signal with a fixed beam pattern;

(i) selecting a reception beam candidate of the second communication device by making the first communication device transmit a second training signal with a fixed beam pattern and making the second communication device scan a beam direction and thereby receive the second training signal; and (iii) performing a training for combining the transmission beam candidate with the reception beam candidate.

A fifth aspect of the present invention relates to a radio communication system in which first and second communication devices perform radio communication with each other. The first and second communication devices are configured to perform a control method including the following steps (i) to (iii) in a cooperative manner:

(i) making the first communication device scan a beam direction and thereby transmit a first training signal and making the second communication device receive the first training signal with a fixed beam pattern;

(ii) making the first communication device transmit a second training signal with a fixed beam pattern and making the second communication device scan a beam direction and thereby receive the second training signal; and (iii) combining a transmission beam candidate selected based on transmission/reception of the first training signal with a reception beam candidate selected based on transmission/reception of the second training signal.

Advantageous Effects of Invention

According to each of the above-described exemplary embodiments of the present invention, when radio communication is performed using beam forming, it is possible to find and set a beam direction having good communication quality in a short time.

BRIEF DESCRIPTION OF DRAWINGS

FIG. 16 is a table showing an example of antenna-setting candidates obtained in the process of the control procedure according to the present invention;

FIG. 17 is a table showing an example of an antenna-setting-pair list obtained in the process of the control procedure according to the present invention;

DESCRIPTION OF EMBODIMENTS

Specific exemplary embodiments to which the present invention is applied are explained hereinafter in detail with reference to the drawings. The same signs are assigned to the same components throughout the drawings, and duplicate explanation is omitted as appropriate for clarifying the explanation.

<First Exemplary Embodiment>

A radio communication system according to this exemplary embodiment includes transceivers 400 and 500 having a directivity-controllable antenna for beam forming. There is no particular restriction on the directivity control mechanism of the directivity-controllable antenna of the transceivers 400 and 500. For example, the directivity-controllable antenna of the transceivers 400 and 500 may be a phased array antenna, a sector-selectable antenna, or a mechanically-movable antenna.

Figure 2:
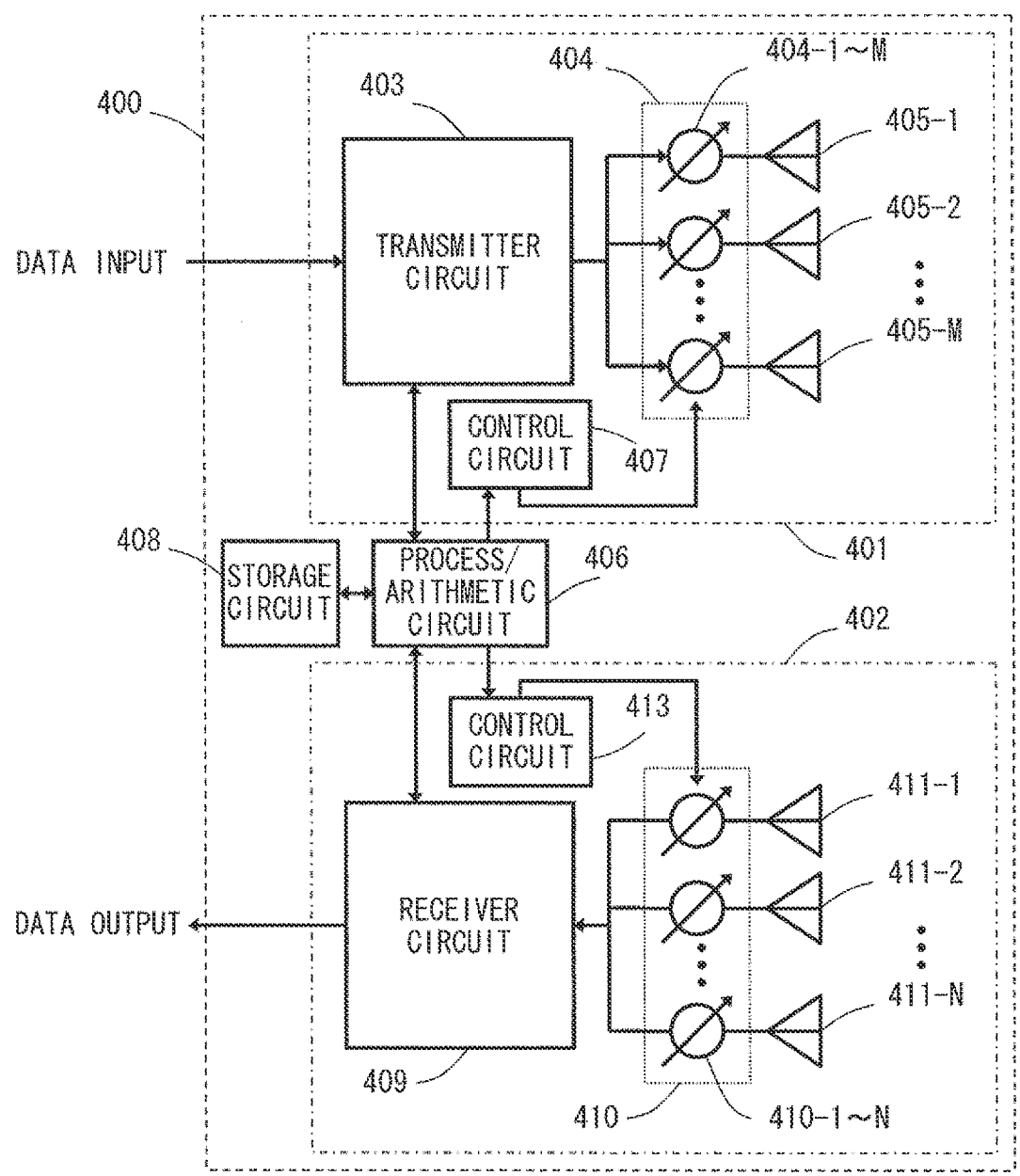
FIG. 2 shows an example of a device configuration used for beam forming, to which the present invention is applicable.

FIG. 2 shows an example of a configuration of the transceiver 400 having a phased array antenna as the directivity-controllable antenna (circuits inessential to the explanation of the operation are omitted). One antenna array includes M transmission radiating elements, and another antenna array includes N reception radiating elements. A transmitter 401 includes a transmitter circuit 403 receiving external data. The output of the transmitter circuit 403 is branched into M outputs and they are input to an antenna setting circuit 404. In the case of the phased array antenna, the antenna setting circuit 404 includes AWV (Array weight vector) control circuits 404-1 to 404-M. Each signal is changed in its amplitude or in its phase, or in both, and eventually output through the transmitting antenna array composed of the radiating elements 405-1 to 405-M. Each of the AWV control circuits 404-1 to 404-M can be implemented by, for example, series connection of an analog phase shifter and a variable-gain amplifier. In such a configuration, both the amplitude and phase of the signal are controlled in a continuous manner. If the AWV control circuits 404-1 to 404-M are implemented by digital phase shifters, only the phases of the signals are controlled in a discrete manner.

A process/arithmetic circuit 406 provides instructions about the setting of the antenna setting circuit 404 through a control circuit 407. By changing both or either of the amplitude and the phase of each signal, it is possible to control the direction, the width, or the like of the beam radiated from the transmitter.

Meanwhile, a receiver 402 has a reversed configuration to the transmitter 401. Signals received by a receiving antenna array composed of radiating elements 411-1 to 411-N are adjusted in both or either of the amplitude and the phase in AWV control circuits 410-1 to 419-N and combined. Then, a receiver circuit 409 receives the combined signal, and outputs data externally. As in the case of the transmitter 401, a process/arithmetic circuit 406 controls both or either of the amplitude and phase of each of the AWV control circuits 410-1 to 419-N.

Figure 3:
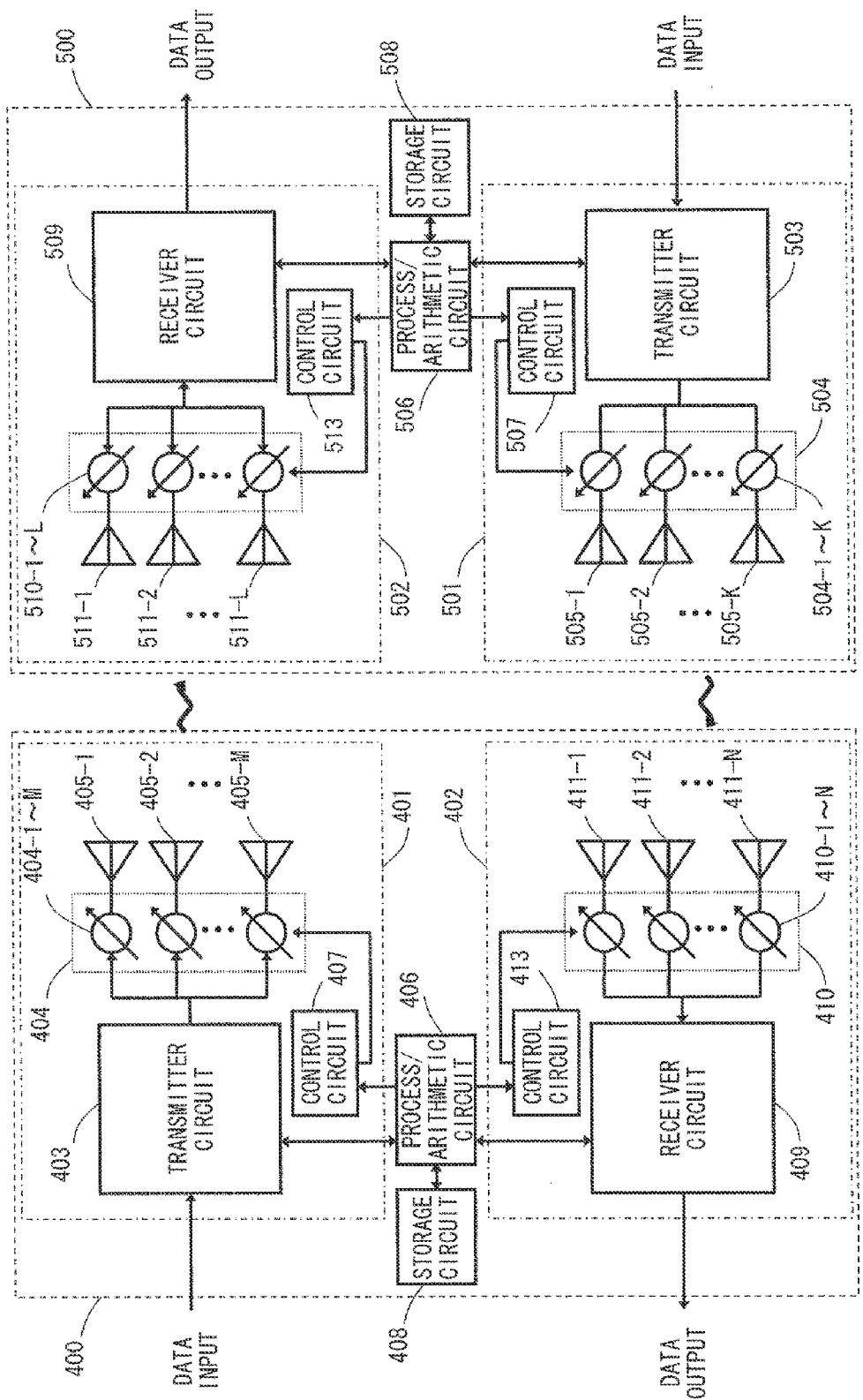
FIG. 3 is a schematic diagram for explaining a radio communication system including two communication devices.

FIG. 3 is a conceptual diagram of a radio communication system including two transceivers (400 and 500) each having the configuration shown in FIG. 2. As an example, the transceiver 500 has K transmission radiating elements and L reception radiating elements.

Figure 4:
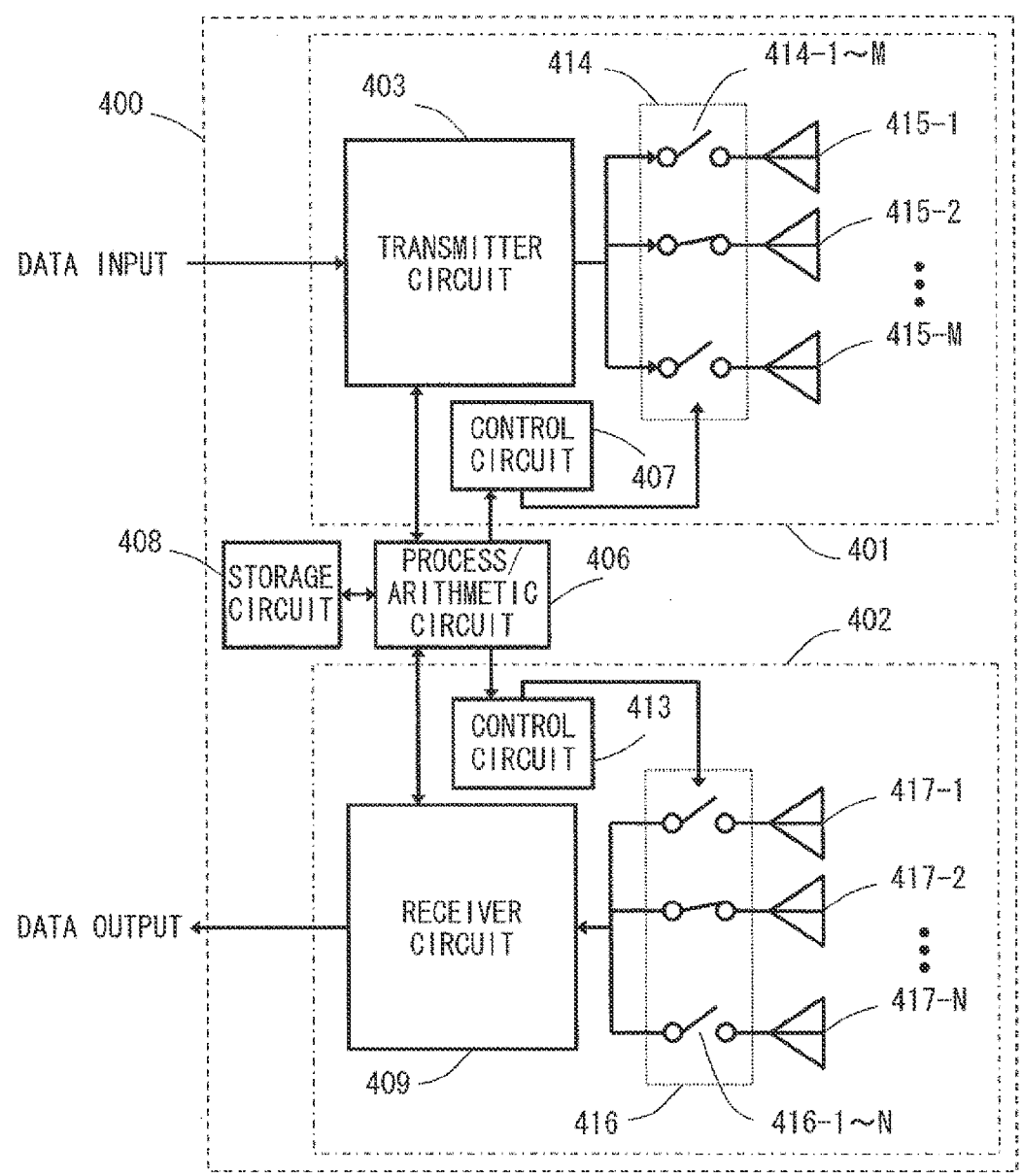
FIG. 4 shows an example of a device configuration used for beam forming, to which the present invention is applicable.

In FIGS. 2 and 3, a configuration example of a communication device including a phased array antenna as the directivity-controllable antenna is shown. However, communication devices including other types of antennas as the directivity-controllable antenna have been also known. FIG. 4 is a configuration example of a transceiver 400 including a sector-selectable antenna as the directivity-controllable antenna. In this case, radiating elements having strong directivity are used as the transmission radiating elements 415-1 to 415-M and the reception radiating elements 417-1 to 417-N, and these radiating elements are arranged to point different directions from one another. The antenna setting circuits 414 and 416 usually include switch elements 414-1 to 414-M and 416-1 to 416-N respectively. A beam is formed in the radiating direction of a radiating element whose switch is turned on. Therefore, it is possible to control the beam direction by changing the antenna setting by using the antenna setting circuits 414 and 416. The operations of the other circuits are similar to those of the circuits shown in FIG. 2.

An overall radio control procedure in a radio communication system according to this exemplary embodiment is explained with reference to a transition diagram shown in FIG. 5. In a states S12 in FIG. 5, the transceivers 400 and 500 perform a training to optimize their antenna setting circuits 404, 410, 504 and 510. In a state S13, either the process/arithmetic circuit 406 or the process/arithmetic circuit 506, or both of the process/arithmetic circuits 406 and 506 in cooperation determine and obtain antenna-setting pair candidates (i.e. antenna-setting-pair list). The method of determining antenna-setting pair candidates performed in the states S12 and S13 is explained later. The obtained antenna-setting pair candidates are stored, in storage circuits 408 and 508, or in one of them, in the form of a data string.

Note that as described above, the antenna-setting pair means a combination of an antenna setting for a transmitting antenna and an antenna setting for a receiving antenna. The antenna setting may be any setting information that defines a directivity pattern (e.g. beam direction or beam pattern) of a transmitting antenna or a receiving antenna. For example, when a phased array antenna is used as the directivity-controllable antenna as shown in FIG. 2, an AWV may be used as the antenna setting. Alternatively, when the directivity-controllable antenna is a sector-selectable antenna as shown in FIG. 4, the antenna setting may be On/Off setting of the switch elements 414-1 to 414-M. Further, for example, the antenna setting may be an identification number that is associated in advance with certain directivity, or may be an antenna setting value itself that determines the directivity such as an AWV.

In a state S14, one of the antenna-setting pair candidates obtained in the state S13 is selected, and communication is performed in a state S15. The method of selecting the antenna-setting pair performed in the state S14 is also explained later. During the communication, the transceivers 400 and 500 monitor the communication state. For example, when the transceiver 500 is operated for reception, the communication quality may be measured in the receiver circuit 509 or the process/arithmetic circuit 506. For example, communication quality such as a received-signal level, a signal to noise ratio (SNR), a bit error rate (BER), a packet error rate (PER), and a frame error rate (FER) may be measured. Meanwhile, the monitoring of the communication state in the transceiver 400, which is operated as a transmitter at this time, may be implemented by measuring a reception status of a communication quality deterioration alert from the transceiver 500 or a reception status of a reception confirmation response (ACK). It should be noted that since publicly-known common techniques may be used as the communication state monitoring technique, detailed explanation of the monitoring technique in this exemplary embodiment is omitted.

When deterioration in communication quality such as disconnected communication is detected during the communication, the transceivers 400 and 500 select another antenna-setting pair from the data string stored in both or either of the storage circuits 408 and 508 (S16).

In a state S17, it is determined whether the quality of the communication using the newly-selected antenna-setting pair is satisfactory or not. When the transceiver 500 is operated for reception, for example, the receiver circuit 509 or the process/arithmetic circuit 506 determines whether the communication quality is satisfactory or not by measuring a received-signal level, an SNR, or the like. When the communication quality is determined to be satisfactory in the state S17, the transceivers 400 and 500 return to the communication state (S15). On the other hand, when the communication quality is determined to be unsatisfactory in the state S17, the transceivers 400 and 500 change to a state S16 and select an antenna-setting pair again.

As an alternative form of operation, when the transceivers 400 and 500 change from the state S15 to the state S16, the transceivers 400 and 500 may check the communication quality of all or some of the antenna-setting pairs obtained in the state S13 and resume the communication by using an antenna-setting pair having good communication quality based on the check result.

When any antenna-setting pair having a satisfactory communication state is not found from the antenna-setting pairs stored in the storage circuits 408 and 508, the procedure returns to the training (S12) and repeats the processes from there.

Figure 1A:
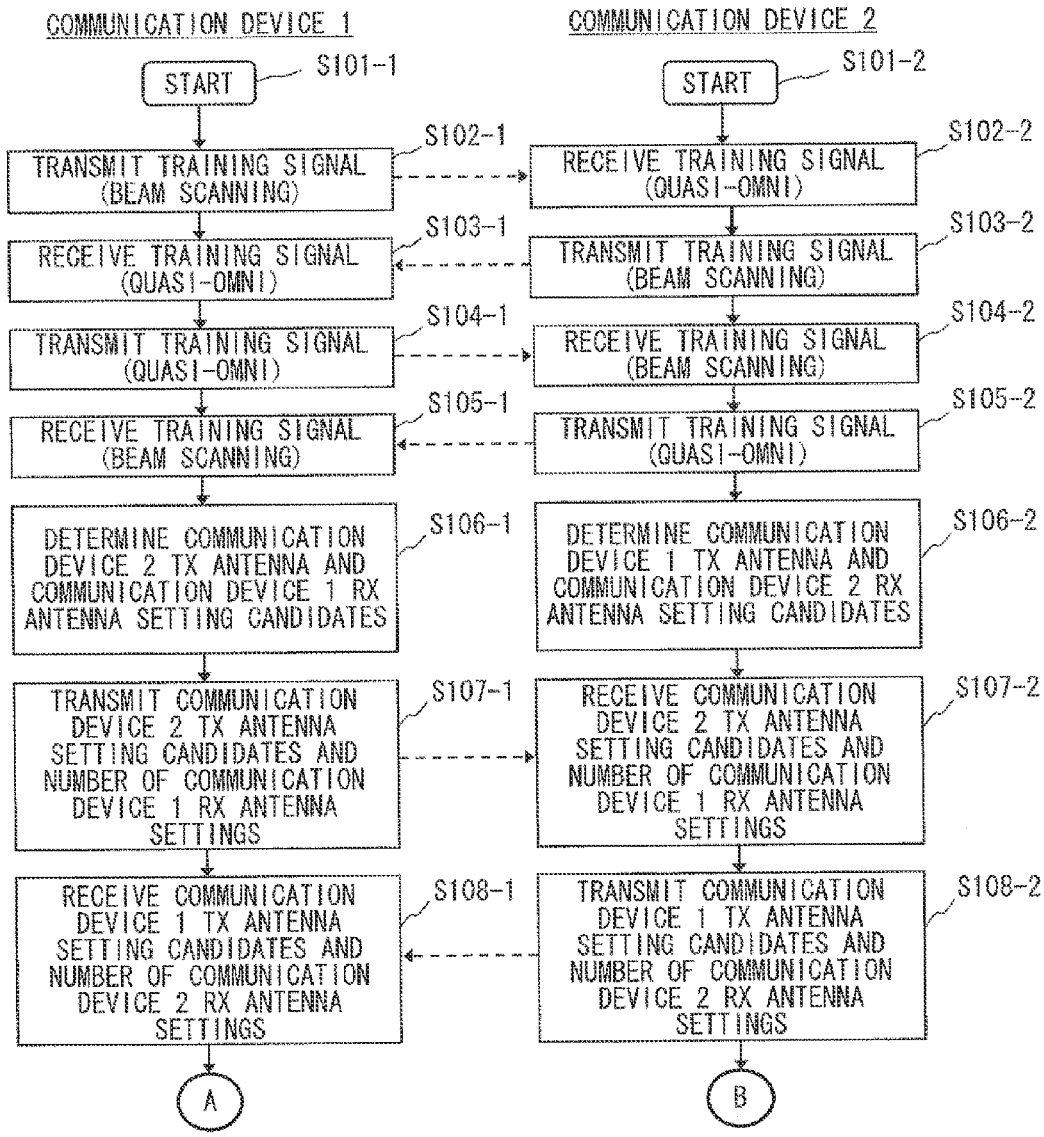
FIG. 1A is a sequence diagram showing an operation of a communication device performed before radio communication is performed in a radio control procedure according to a first exemplary embodiment of the present invention.
Figure 1B:
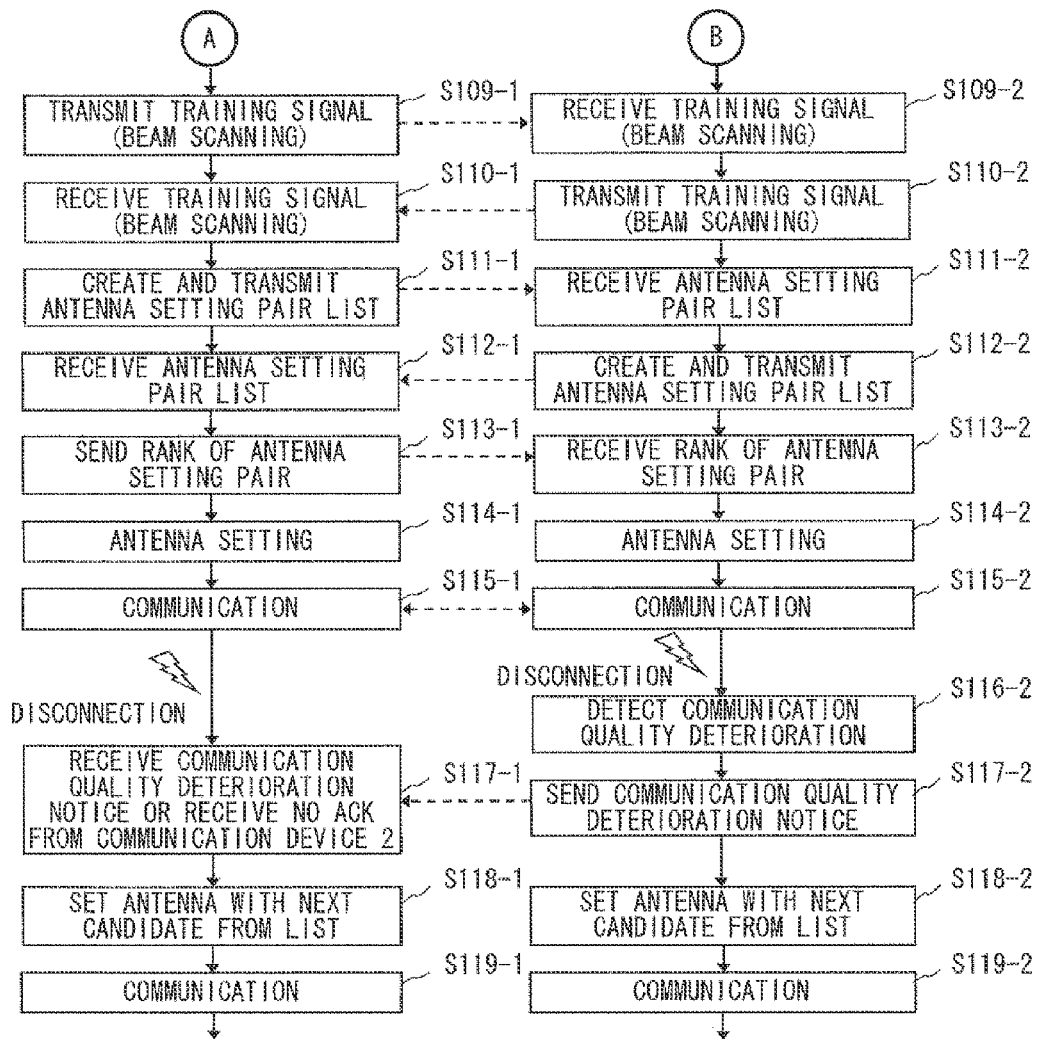
FIG. 1B is a sequence diagram showing an operation of a communication device performed before radio communication is performed in a radio control procedure according to the first exemplary embodiment of the present invention.

Next, the training procedure performed in the state S12 in FIG. 5 and the procedure for obtaining a list of a plurality of antenna-setting pairs performed in the state S13 are explained hereinafter. FIGS. 1A and 1B show a sequence diagram in which these procedures are simplified. Note that the transceiver 400 and the transceiver 500 are shown as "communication device 1" and "communication device 2" respectively in FIGS. 1A and 1B for the simplification. In the following explanation, a procedure and an operation are explained while simultaneously referring to the simplified sequence diagram shown in FIGS. 1A and 1B and the configuration diagram of the radio communication system shown in FIG. 3.

Figure 11:
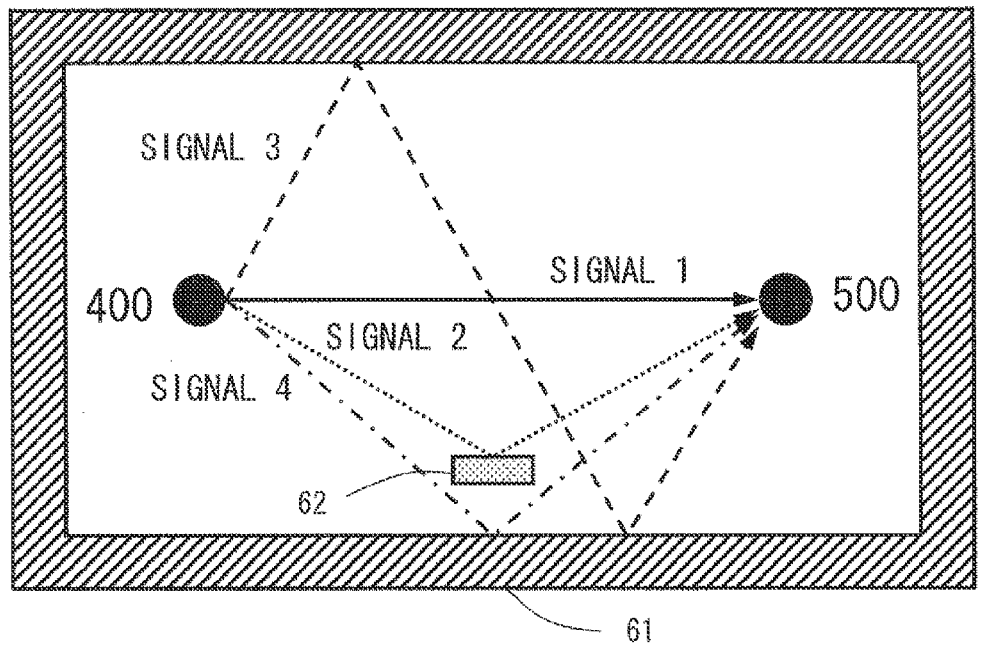
FIG. 11 is a plane view showing an example of a propagation environment to which the present invention is applied.
Figures 12, 13:
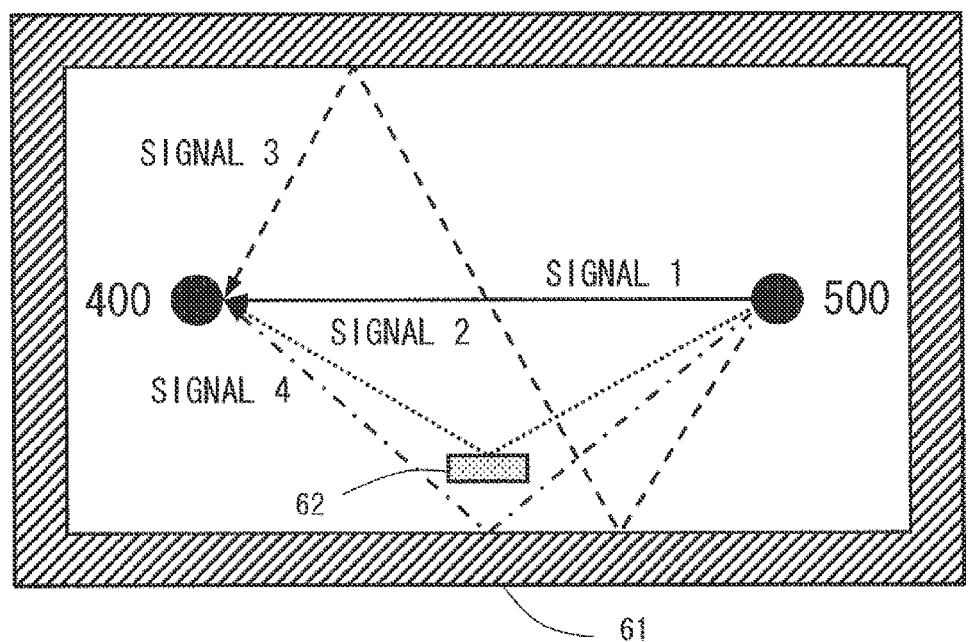
FIG. 12 is a plane view showing an example of a propagation environment to which the present invention is applied.
FIG. 13 is a table showing an example of a data string describing a relation between antenna settings and communication qualities obtained in the process of the control procedure according to the present invention.

As an example, assume a propagation environment shown in FIGS. 11 and 12. FIG. 11 shows a case where a training signal propagates from the communication device 1 to the communication device 2 and FIG. 12 shows an opposite case.

In this example, the communication device 1, the communication device 2, and a reflective body 62 are disposed inside a room (two dimensions) enclosed with a wall 61. Assume that there are four propagation paths, which are indicated as signals 1 to 4, available for communication between the communication device 1 and the communication device 2.

Steps S102-1 and S102-2 shown in FIG. 1A are a training for determining transmitting-antenna-setting candidates of the communication device 1 (transceivers 400). Firstly, the communication device 1 performs a transmitting operation in the step S102-1. In this process, the storage circuit 408, the process/arithmetic circuit 406, the control circuit 407, and the antenna setting circuit 404 of the communication device 1 work together and thereby change the antenna setting of the transmitting antenna (e.g., antenna array 405-1 to 405-M). In this way, the communication device 1 scans the beam direction of the transmitting antenna array 405-1 to 405-M. Further, the transmitter circuit 403 also works together in that state. In this way, the communication device 1 transmits a training signal while scanning the transmission beam direction. When the transmission beam direction matches one of plural propagation paths existing between the communication device 1 (transceivers 400) and the communication device 2 (transceivers 500), the training signal arrives at the transceivers 500 through the propagation path.

In this state, the communication device 2 (transceivers 500) performs a receiving operation in the step S102-2. The storage circuit 508, the process/arithmetic circuit 506, the control circuit 513, and the antenna setting circuit 510 work together and thereby generate a quasi-omni pattern in the receiving antenna (e.g., antenna array 511-1 to 511-L). Further, the receiver circuit 509 also works together in this state. In this way, the communication device 2 receives the training signal transmitted from the communication device 1 with a fixed beam pattern, more specifically, with a quasi-omni pattern.

Next, the communication device 1 and 2 interchange their roles, and perform similar processes. Steps S103-1 and S103-2 are a training for determining transmitting-antenna-setting candidates of the communication device 2 (transceivers 500). That is, in the step S103-2, the communication device 2 performs a transmitting operation, and transmits a training signal while changing its antenna setting and thereby scanning the beam direction. In this state, in the step S103-1, the communication device 1 receives the training signal transmitted from the communication device 2 in a state where a quasi-omni pattern is generated.

Next, in steps S104-1 and S104-2, a training for determining receiving-antenna-setting candidates of the communication device 2 is performed. In the step S104-1, the communication device 1 performs a transmitting operation, and transmits a training signal in a state where a quasi-omni pattern is generated in the transmitting antenna. In this state, in the step S104-2, the communication device 2 performs a receiving operation, and receives the training signal while changing its antenna setting and thereby scanning the beam direction.

Next, the communication device 1 and 2 interchange their roles, and perform similar processes. That is, steps S105-1 and S105-2 are a training for determining receiving-antenna-setting candidates of the communication device 1. In the step S105-2, the communication device 2 performs a transmitting operation, and transmits a training signal in a state where a quasi-omni pattern is generated in the transmitting antenna. In this state, in the step S105-2, the communication device 1 performs a receiving operation, and receives the training signal while changing its antenna setting and thereby scanning the beam direction.

Through the above-described steps S102 to S105, reception results of four training signal are obtained. A procedure for determining four pluralities of antenna-setting candidates of four antennas (transmitting antenna and receiving antenna of communication device 1 and 2) from these reception results is explained hereinafter.

Firstly, a procedure for determining transmitting-antenna-setting candidates of the communication device 1 in a step S106-2 by using the training signal reception result obtained in the step S102-2 is explained hereinafter.

A data string describing a relation between antenna settings (i.e., transmission beam directions) of the transmitting antenna of the communication device 1 and received-signal powers in the receiving antenna of the communication device 2 is obtained from the training signal reception result in the step S102-2. The antenna setting of the transmitting antenna of the communication device 1 is sent from the communication device 1 to the communication device 2 in advance by, for example, adding the antenna settings to the information element of the training signal when the training signal is transmitted. Note that although a data string describing a relation between antenna settings and received-signal powers is obtained in this example, reception signal characteristics other than the received power may be also used. Examples of the received signal characteristics other than the received power include a signal to noise ratio (SNR).

FIG. 13 shows an example of a data string. In this example, a relation between identification numbers of antenna settings of the communication device 1 (transceivers 400) and relative received powers in the communication device 2 (transceivers 500) is recorded. Note that the relative received powers are expressed in such a manner that the maximum received power among the received powers corresponding to all the antenna settings for which the training was carried out is defined as 0 dB and the other received powers are expressed by their ratios to the maximum received power. When the angular resolution of the beam scanning performed in the step S102-1 is low, a plurality of (or one) antenna settings for which the relative received power is greater than a predetermined threshold may be selected and defined as transmitting-antenna-setting candidates of the communication device 1. Alternatively, the number of antenna settings to be detected may be determined in advance. Then, antenna settings may be selected one by one in the descending order of their relative received power until the number of detected antenna settings reaches the predetermined number. These processes may be performed by the process/arithmetic circuit 506. If necessary, the detected antenna settings are stored into the storage circuit 508.

Figures 14, 15:
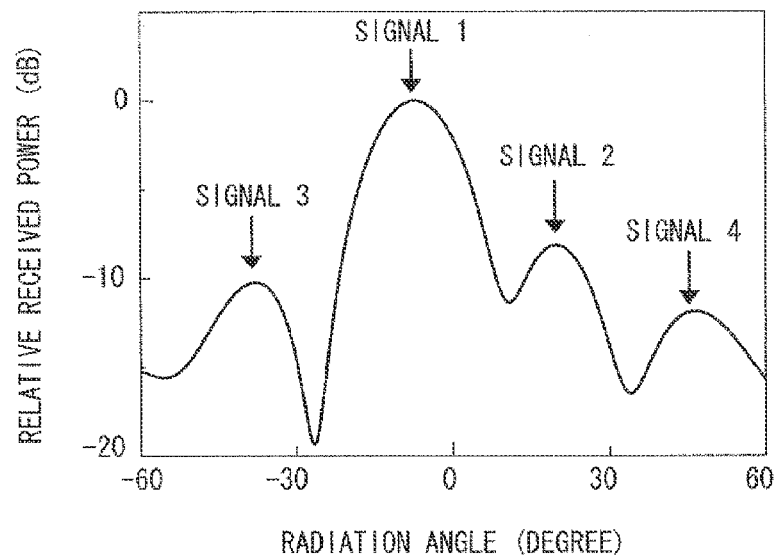
FIG. 14 is a table showing an example of a data string describing a relation among antenna settings, beam directions, and communication qualities obtained in the process of the control procedure according to the present invention.
FIG. 15 is an example of a graph showing a relation between beam directions and communication qualities obtained in the process of the control procedure according to the present invention.

However, when the angular resolution of the beam scanning performed in the step S102-1 is high, there is a possibility that the above-described method cannot detect antenna settings that properly correspond to the signal paths. That is, there is a possibility that antenna settings in or around a beam direction corresponding to a relatively high received power occupy higher ranks of the relative received powers and are detected as antenna settings corresponding to the signal paths. In such cases, it is desirable to perform peak detection by using information on the scanned beam direction (radiation angle or angle of departure) of the transmitting antenna of the communication device 1. To that end, it is necessary to send the information on the beam direction of the transmitting antenna of the communication device 1 in advance from the communication device 1 to the communication device 2. This information may be sent by adding it to the information element of the training signal transmitted in the step S102-1, or may be sent by transmitting separate data dedicated for the delivery of angle information. In such cases, the data string may be, for example, one shown in FIG. 14. In this example, the beam direction is scanned over an angle of 120° with a resolution of 4°. By using the data string like this, it is possible to create a profile shown in FIG. 15. By performing a peak detection using this profile, it is possible to detect antenna settings that properly correspond to the signal paths. Even in such cases, all the peaks may be detected. Alternatively, the number of antenna settings to be detected may be determined in advance. Then, peaks are detected one by one in the descending order of their relative received power until the number of detected peaks reaches the predetermined number. The profile in FIG. 15 is shown just for illustrating a general idea, and in practice, only a data string like the one shown in FIG. 14 may be required. Further, since FIG. 15 is shown only for the sake of explanation, values in FIG. 15 are not necessarily equal to those in FIG. 14. Further, when the identification numbers of the antenna settings are associated with beam directions, the peak detection may be performed without using the angle information. The processes described above may be performed by the process/arithmetic circuit 506. If necessary, the detected antenna settings are stored into the storage circuit 508.

Note that in this specification, a planar (two-dimensional) propagation environment as shown in FIGS. 11 and 12 is assumed for simplifying the explanation. Therefore, the horizontal axis in FIG. 15 indicates radiation directions as one-dimensional values. It is also assumed that the antenna array has one dimension. However, the present invention can be also applied to other cases where a two-dimensional (2D) antenna array is used in a three-dimensional (3D) propagation environment. In such cases, the column of the radiation angle in FIG. 14 and the horizontal axis in FIG. 15 represents 2D arrays each composed of two angles.

A procedure for determining transmitting-antenna-setting candidates of the communication device 2 in a step S106-1 by using the training signal reception result obtained in the step S103-1 is similar to that performed in the above-described step S106-2, and therefore its explanation is omitted. That is, the procedure in the step S106-1 may be executed by performing the above-described procedure in the step S106-2 in a state where the roles of the communication device 1 and the communication device 2 are interchanged.

Next, a procedure for determining receiving-antenna-setting candidates of the communication device 2 in a step S106-2 by using the training signal reception result obtained in the step S104-2 is explained hereinafter. A data string describing a relation between antenna settings (i.e., reception beam directions) of the receiving antenna and received powers of the communication device 2 is obtained from training signal reception result obtained in the step S104-2. The process described below is similar to the above-described procedure for determining transmitting-antenna-setting candidates of the communication device 1 performed in the step S106-2. However, in this process, training signal reception results that are obtained by scanning the reception beam direction of the receiving antenna (S104-2) are used. Therefore, in contrast to the case where a training signal is transmitted from an antenna performing beam scanning, there is no need to send the information on antenna settings and beam directions. Further, the information on the beam direction that is used to perform beam detection is angles of arrival.

A procedure for determining receiving-antenna-setting candidates of the communication device 1 in a step S106-1 by using the training signal reception result obtained in the step S105-1 is similar to that performed in the above-described step S106-2, and therefore its explanation is omitted. That is, the procedure in the step S106-1 may be performed by performing the above-described procedure in the step S106-2 in a state where the roles of the communication device 1 and the communication device 2 are interchanged.

Through the above-described processes, four pluralities of antenna-setting candidates of four antennas (transmitting antenna and receiving antenna of each of communication device 1 and 2) are determined. Next, the communication devices 1 and 2 transmit and receive information necessary for performing round-robin trainings between the determined antenna-setting candidates (S109 to S110). That is, in a step S107, transmitting-antenna-setting candidates of the communication device 2 and the total number of receiving-antenna-setting candidates of the communication device 1 are sent from the communication device 1 to the communication device 2. Similarly, in a step S108, transmitting-antenna-setting candidates of the communication device 1 and the total number of receiving-antenna-setting candidates of the communication device 2 are sent from the communication device 2 to the communication device 1. However, when the total number of antenna-setting candidates with which the round-robin trainings are performed is determined in advance, there is no need to transfer the total number of antenna-setting candidates. Further, for example, identification numbers of antenna settings may be used as the information on transmitting-antenna-setting candidates as shown in FIG. 16. This table shows an example where four antenna settings are detected. These four antenna settings may be arranged, for example, in the descending order of the received power of the training signal as shown in this table.

In a step S109, round-robin trainings are performed between the transmitting-antenna-setting candidates of the communication device 1 and the receiving-antenna-setting candidates of the communication device 2. Similarly, in a step S110, round-robin trainings are performed between the transmitting-antenna-setting candidates of the communication device 2 and the receiving-antenna-setting candidates of the communication device 1. Details of the procedure of these round-robin trainings are explained later. By performing these trainings, appropriate combinations between antenna-setting candidates (i.e. antenna-setting pairs) are found, and they are arranged in descending order of their communication quality (e.g., descending order of received power). The obtained data string of the antenna-setting pairs arranged according to the communication quality is called "antenna-setting-pair list". Note that other cases where the list is arranged according to parameters other than the communication quality are also included the scope of the present invention. FIG. 17 shows an example of an antenna-setting-pair list.

In a step S111, an antenna-setting-pair list for the receiving antenna of the communication device 1 and the transmitting antenna of the communication device 2 obtained in the step S110 is transmitted from the communication device 1 to the communication device 2. Similarly, in a step S112, an antenna-setting-pair list for the transmitting antenna of the communication device 1 and the receiving antenna of the communication device 2 obtained in the step S109 is transmitted from the communication device 2 to the communication device 1. However, the information sent in the step S111 needs to include only the information on the transmitting-antenna setting of the communication device 2. Therefore, among the information items shown in FIG. 17, the information items on the receiving-antenna setting of the communication device 1 may be omitted in order to reduce the amount of information to be transmitted. Similarly, the information sent in the step S112 needs to include only the information on the transmitting-antenna setting of the communication device 1. Therefore, the information items on the receiving-antenna setting of the communication device 2 may be omitted. The received antenna-setting-pair lists are entirely or partially stored in the respective storage circuits 408 and 508.

Figure 5:
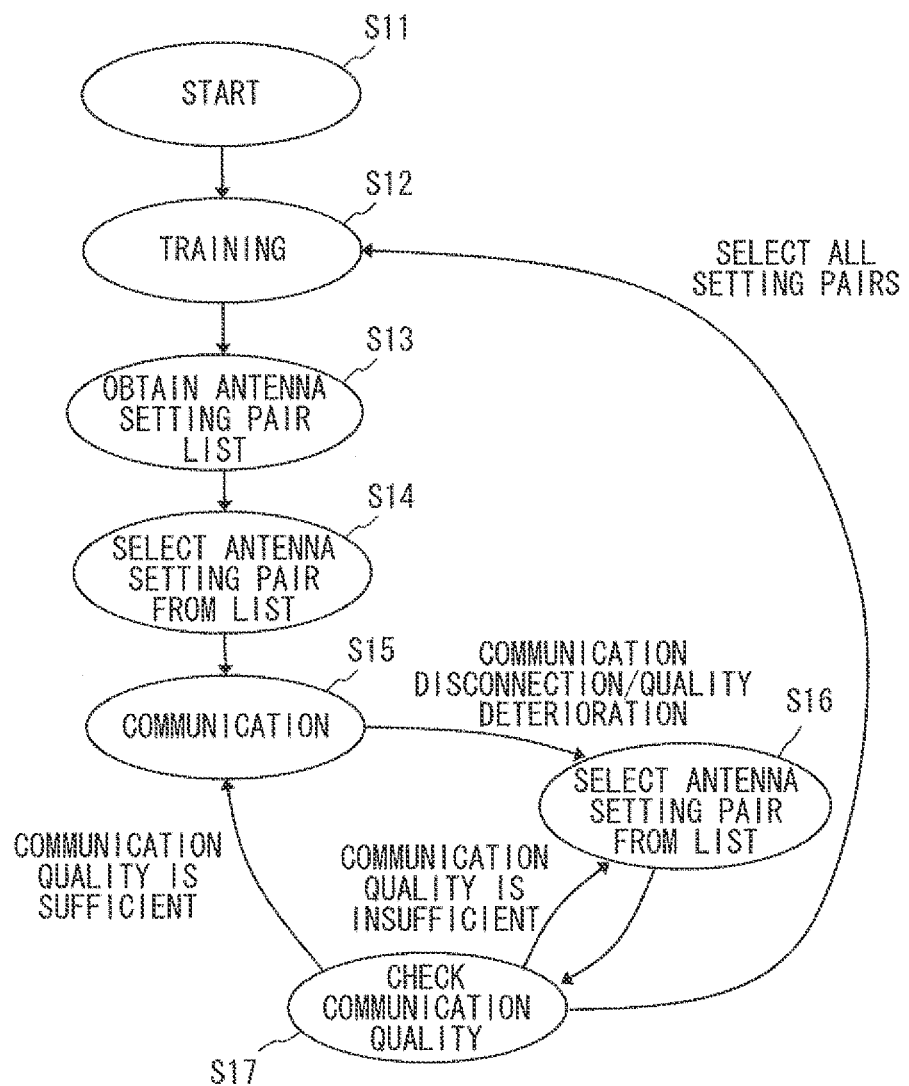
FIG. 5 shows transitions in a radio control procedure according to the first exemplary embodiment of the present invention.

The communication device 1 and 2 each selects an antenna setting in the same rank from the antenna-setting pairs that are stored in the storage circuits 408 or 508 by the above-described method, and resume the communication (S14 and S15 in FIG. 5). For example, in a step S113, the rank of the antenna setting to be used may be sent from the communication device 1 to the communication device 2. The antenna setting rank that is sent in this step may be both or either of the rank of the transmitting antenna of the communication device 1 and the receiving antenna of the communication device 2 and the rank of the transmitting antenna of the communication device 2 and the receiving antenna of the communication device 1. Further, though it is omitted in the figure, both or either of these ranks may be sent from the communication device 2 to the communication device 1. Further, when the order of antenna setting ranks that are used for the communication is determined in advance, the transfer of the rank of the antenna setting to be used may be omitted. The communication device 1 and 2 set the antenna setting circuits 404, 410, 510 and 504 according to the transmitted/received antenna-setting pair rank (S114) and resume the communication (S115).

When the communication using the antenna-setting pair in the selected rank deteriorates and the deterioration is detected in the steps S116 and S117, the communication device 1 and 2 select another antenna-setting pair in the same rank from the antenna settings stored in the storage circuits 408 and 508 (S16 in FIG. 5). Then, if necessary, they check the communication quality (S17 in FIG. 5), and when the communication quality is satisfactory, adopt that antenna-setting pair and thereby resume communication (S118 to S119). Steps S118 and S119 correspond to the transition from the state S15 to S16, the transition from the state S16 to S17, and the transition from the state S17 to S15 in the transition diagram in FIG. 5. In the processes described above, it is desirable to select an antenna-setting pair, for example, in the storing order of the antenna-setting pairs, i.e., in the order of the communication quality (e.g., received power) measured in the round-robin trainings. Note that the steps S116 to S119 shown in FIG. 1B shows a case where the communication quality is deteriorated in a state where the communication device 1 is transmitting and the communication device 2 is receiving. On the other hand, if the communication quality is deteriorated in a state where the communication device 2 is transmitting and the communication device 1 is receiving, a similar process may be performed in a state where the roles of the communication device 1 and 2 are interchanged. Further, for example, when the communication quality is deteriorated in a state where the communication device 1 is transmitting and the communication device 2 is receiving, only the antenna-setting pair of the transmitting antenna of the communication device 1 and the receiving antenna of the communication device 2 may be replaced by a new antenna-setting pair. Alternatively, the antenna-setting pair of the receiving antenna of the communication device 1 and the transmitting antenna of the communication device 2 may be also replaced with a new antenna-setting pair at the same time.

Figure 18A:
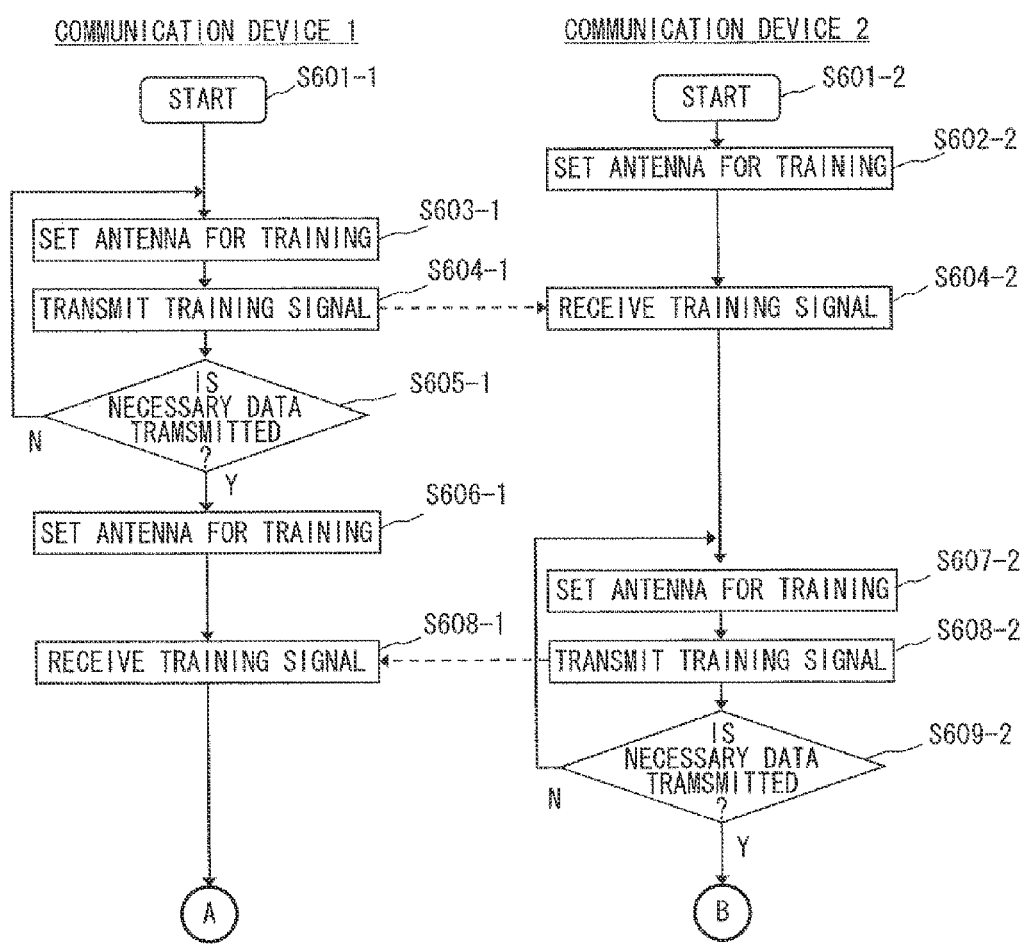
FIG. 18A is a sequence diagram showing an operation of a communication device performed before radio communication is performed in a radio control procedure according to the first exemplary embodiment of the present invention.
Figure 18B:
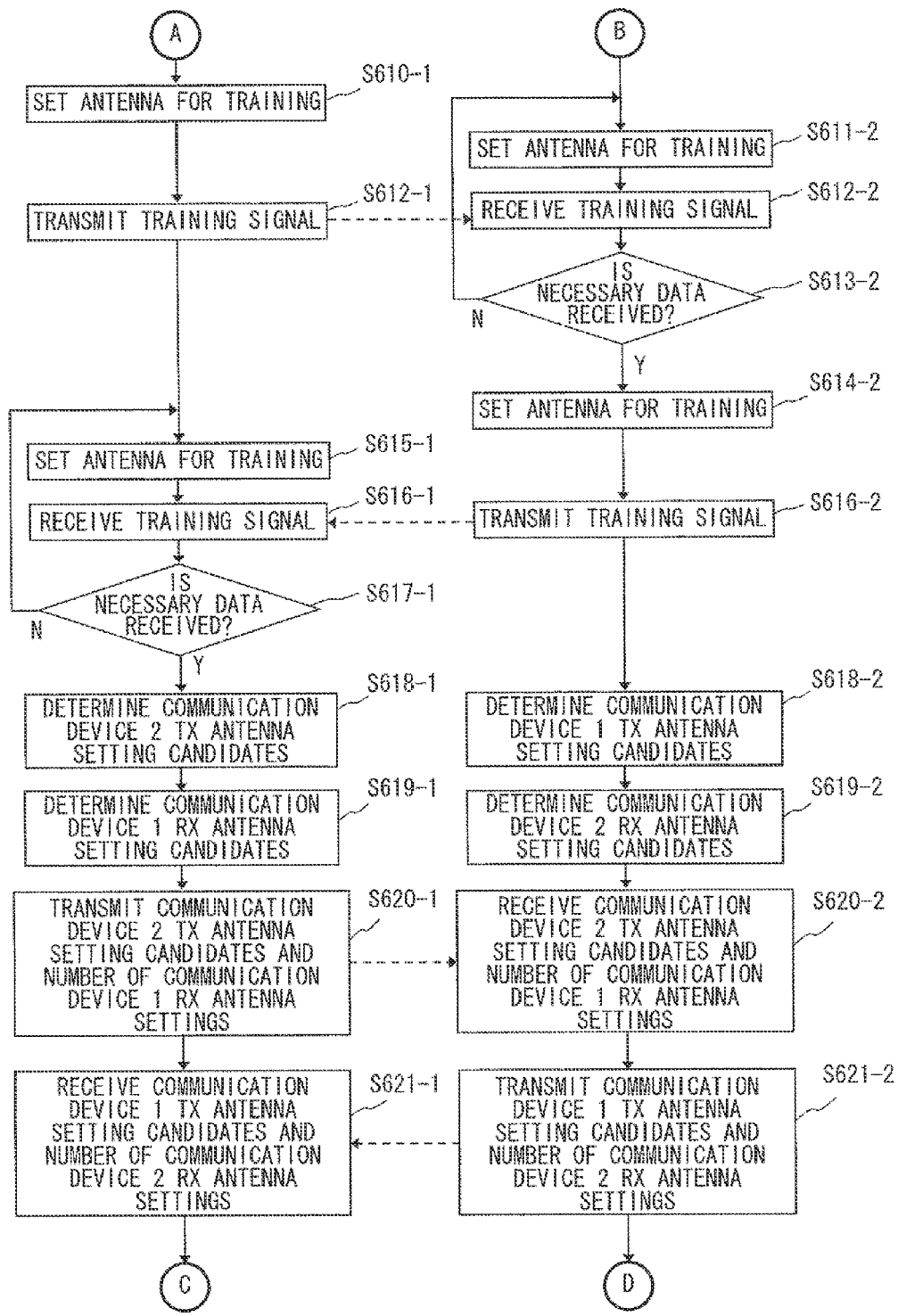
FIG. 18B is a sequence diagram showing an operation of a communication device performed before radio communication is performed in a radio control procedure according to the first exemplary embodiment of the present invention.
Figure 18C:
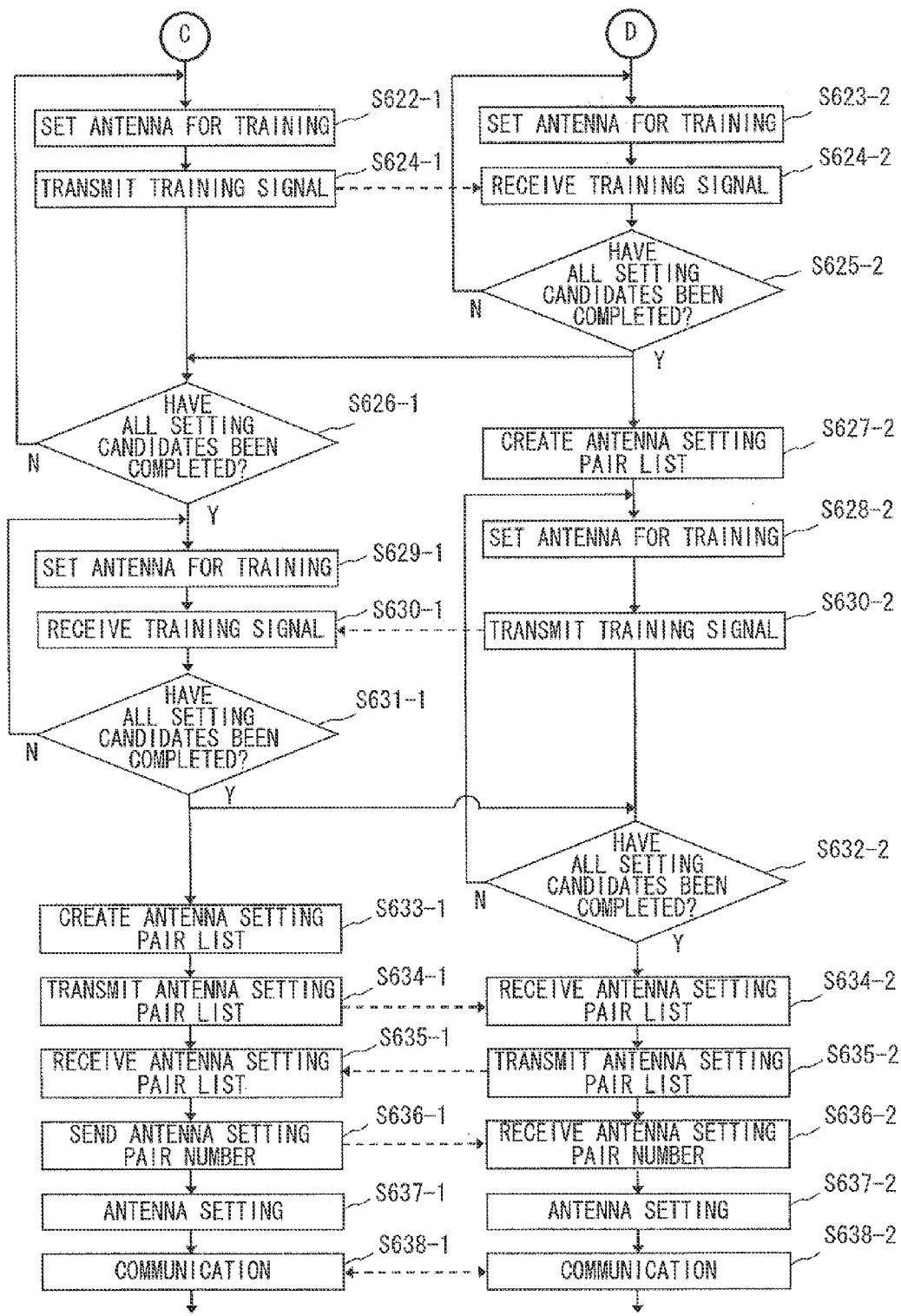
FIG. 18C is a sequence diagram showing an operation of a communication device performed before radio communication is performed in a radio control procedure according to the first exemplary embodiment of the present invention.

Next, the operation that is explained above with reference to the simplified sequence diagram shown in FIGS. 1A and 1B is explained in a more detailed manner. FIGS. 18A to 18C are a sequence diagram showing the procedure from the start of a training (S101) to the start of communication (S115) shown in the simplified sequence diagram shown in FIG. 1 in a more detailed manner. The operation of the part that is simplified in FIGS. 1A and 1B is explained hereinafter.

Steps S602 to S605 show an example of the procedure performed in the step S102 shown in FIG. 1A in a more detailed manner. Firstly, the communication device 2 sets the receiving-antenna setting with values for a training, i.e., values for generating an omni or quasi-omni pattern in this example (S602-2). The communication device 1 repeatedly transmits training signal (S604-1) while changing the transmitting-antenna setting (S603-1) until signal transmissions in all of the predetermined antenna settings have been completed (S605-1). In this process, identification number corresponding to respective antenna setting or equivalent information is transmitted. The communication device 2 receives the training signal and the antenna setting identification number (S604-2).

Steps S606 to S609 show an example of the procedure performed in the step S103 shown in FIG. 1 A in a more detailed manner. These operations are similar to those in the above-described steps S602 to S605 except that the roles of the communication device 1 and 2 are interchanged, and therefore their explanation is omitted.

Steps S610 to S613 show an example of the procedure performed in the step S104 shown in FIG. 1A in a more detailed manner. Firstly, the communication device 1 sets the transmitting-antenna setting with values for a training, i.e., values for generating an omni or quasi-omni pattern in this example (S610-1) and sends out a training signal (S612-1). The communication device 2 repeatedly receives the training signal (S612-2) while changing the receiving-antenna setting (S611-2) until signal receptions in all of the predetermined antenna settings have been completed (S613-2).

Steps S614 to S617 show an example of the procedure performed in the step S105 shown in FIG. 1 A in a more detailed manner. These operations are similar to those in the above-described steps S610 to S613 except that the roles of the communication device 1 and 2 are interchanged, and therefore their explanation is omitted. Steps S620-1, S620-2, S621-1 and S621-2 correspond to the steps S107-1, S107-2, S108-1 and S108-2 shown in FIG. 1A.

Steps S622 to S626 show an example of the procedure performed in the step S109 shown in FIG. 1B in a more detailed manner. In these steps, round-robin trainings (communication quality tests) are performed between the transmitting-antenna-setting candidates of the communication device 1 that are determined in the step S618-2 by using the training signal reception results obtained in the steps S602 to S605 and the receiving antenna-setting candidates of the communication device 2 that are determined in the step S619-2 by using the training signal reception results obtained in the steps S610 to S613.

Firstly, the communication device 1 sets the first antenna setting (e.g., antenna setting identification number 14 in FIG. 17) among the transmitting-antenna-setting candidates (S622-1) and sends a training signal (S624-1). The communication device 2 repeatedly receives the training signal (S624-2) while successively setting the receiving-antenna setting to each one of the antenna-setting candidates determined in the step S619-2 (e.g., antenna setting identification numbers 16, 10, 2 and 7 in FIG. 17) (S623-2) until signal receptions in all the antenna-setting candidates have been completed (S625-2). The above-described procedure is repeated until the procedure has been completed for all of the transmitting-antenna-setting candidates of the communication device 1 determined in the step S618-2 (e.g., antenna setting identification numbers 14, 20, 6 and 26 in FIG. 17) (S626-1).

Steps S627 to S632 show an example of the procedure performed in the step S110 shown in FIG. 1B in a more detailed manner. In these steps, round-robin trainings (communication quality tests) are performed between the transmitting-antenna-setting candidates of the communication device 2 that are determined in the step S618-1 by using the training signal reception results obtained in the steps S606 to S609 and the receiving-antenna-setting candidates of the communication device 1 that are determined in the step S619-1 by using the training signal reception results obtained in the steps S614 to S617. These operations are similar to those in the above-described steps S622 to S626 except that the roles of the communication device 1 and the communication device 2 are interchanged, and therefore their explanation is omitted.

The purpose of carrying out the round-robin trainings (i.e. communication quality tests) for the combinations of all the antenna-setting candidates of the transmitting and receiving antennas in the steps S622-S626 and S627 to S632 is explained hereinafter.

Assume a case where the process of determining antenna-setting candidates of the four antennas (transmitting antenna and receiving antenna of each of communication device 1 and communication device 2) can be carried out with high accuracy in the steps S602 to S621. Assume a propagation environment shown in FIGS. 11 and 12. Since four signals shown in each of these figures propagate through the same paths in the opposite directions, the propagation losses are substantially equal to each other and the relation of the received power among the signals is maintained. Therefore, assuming no error occurs in the process for detecting and determining antenna-setting candidates, it is possible to obtain antenna-setting pairs available for the communication by combining, in descending order of received power, transmitting-antenna-setting candidates of the communication device 1 with the receiving antenna-setting candidates of the communication device 2.

However, when the accuracy of the quasi-omni pattern is poor, i.e., when there are variations in the antenna gain depending on the radiation direction or when other measurement errors occur, there is a possibility that errors occur in the combinations of antenna-setting candidates. Note that the error means that antenna-setting candidates corresponding to different propagation paths are combined. The probability that such errors occur depends on the propagation environment as well as on the antenna characteristic described above. For example, the probability of errors could increase when propagation losses of two or more propagation paths are close to each other. Further, even when the combinations of antenna-setting candidates are properly made, there is a possibility that the antenna-setting pairs are not properly arranged according to the received power.

The problem like this can be avoided by performing round-robin trainings (communication quality tests) for the combinations of all the antenna-setting candidates of the transmitting and receiving antennas. Further, in general, the number of detected and determined antenna-setting candidates is reduced to a sufficiently small number in advance in comparison to the number of antenna settings for the beam direction scanning performed in the steps S602 to S621. Therefore, even when round-robin trainings are performed, they do not cause any significant increase in the total training time.

However, in order to further reduce the processing time, the above-described procedure to measure communication quality for the combinations of all the antenna-setting candidates may be modified as shown below. Firstly, antenna-setting pairs are determined according to the received power (or other communication quality) measured when the antenna-setting candidates are determined. For example, an antenna-setting pair is determined by combining a transmitting-antenna-setting candidate of the communication device 1 for which the received power is highest with a receiving-antenna-setting candidate of the communication device 2 for which the received power is highest. A communication quality test is carried out for a plurality of antenna-setting pairs that are formed in this manner, and only an antenna-setting pair(s) that does not satisfy a predetermined communication quality criterion is cancelled. Then, for the antenna-setting candidates that are cancelled because their communication quality is lower than the communication quality criterion, a search for new antenna-setting pairs is performed by carrying out communication quality tests for all the combinations. After that, the priority order of antenna-setting pairs may be determined again based on the above-described two set of communication quality tests. By employing the method like this, among the antenna-setting pairs that are determined based on the measurement results obtained at the time of determination of the antenna-setting candidates, the available antenna-setting pairs can be excluded from the antenna-setting pairs for which the round-robin-based communication quality measurements are to be performed in order to find new combinations, and thus making it possible to reduce the processing time. The procedure like this is effective when, for example, the number of antenna-setting candidates is large.

Figure 19:
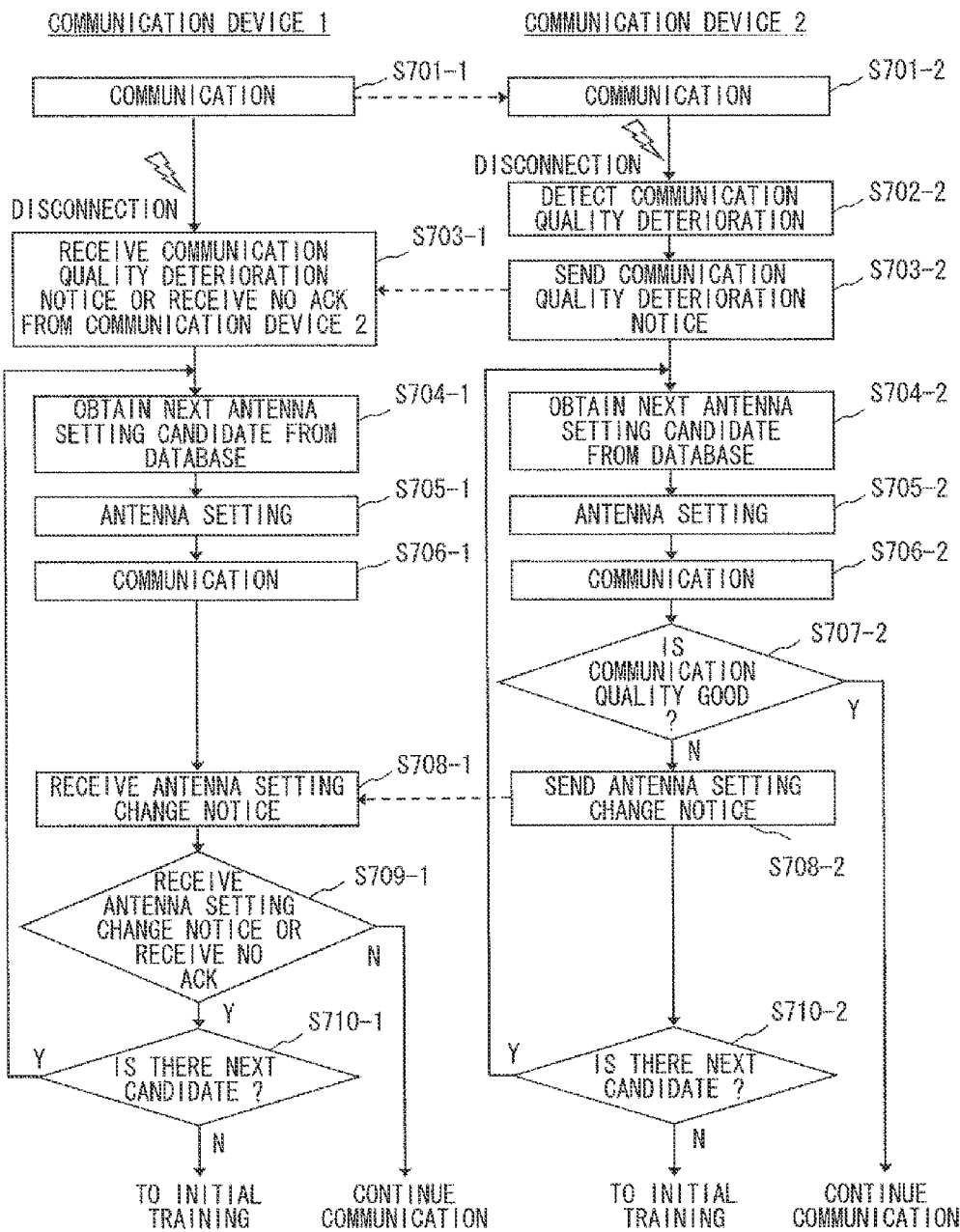
FIG. 19 is a sequence diagram showing an operation of a communication device performed when shielding of radio communication occurs in a radio control procedure according to the first exemplary embodiment of the present invention.

Next, an operation performed when deterioration in communication quality such as disconnected communication occurs is explained with reference to FIG. 19. FIG. 19 is a sequence diagram showing operations of the transceivers 400 and 500 in the transition processes from the state S15 to S17 in FIG. 5. Note that in the following explanation, a case where the transceiver 400 (communication device 1 in FIG. 19) is operated for transmission and the transceiver 500 (communication device 2 in FIG. 19) is operated for reception is explained.

When a problem such as disconnected communication occurs, the transceiver 500, which is performing the receiving operation, detects the deterioration in communication quality (S702-2), and notifies the transceiver 400 of the deterioration (S703-2). The transceiver 400 receives the notification of the communication quality deterioration from the transceiver 500. Alternatively, the transceiver 400 recognizes the disconnected communication (or deteriorated communication state) based on the fact that the ACK signal, which would be transmitted from the transceiver 500 upon the successful data reception under normal communication circumstances, has not been received. At this point, the transceivers 400 and 500 obtain their respective next antenna-setting candidates from their own databases (i.e. antenna-setting-pair lists) (S704-1 and S704-2).

In a step S705-1, the transceiver 400 sets the antenna setting circuit 404 with the next antenna setting candidate. Similarly, in a step S705-2, the transceiver 500 sets antenna setting circuit 510 with the next antenna setting candidate. After that, the transceivers 400 and 500 resume the communication (S706-1 and S706-2). After the communication is resumed, the transceiver 500 checks the communication quality (S707-2). When the communication quality is satisfactory, the communication is continued, whereas when it is unsatisfactory, the transceiver 500 transmits a notice of antenna setting change (S708-2). The transceiver 400 continues the communication without making any change unless it receives the notice of antenna setting change or cannot receive an ACK signal from the transceiver 500 (S709-1). If not so, the transceivers 400 and 500 attempt the communication using the next antenna-setting pair candidate as long as there is another antenna setting candidate (S710-1 and S710-2). If the communication quality cannot be improved with any of the antenna-setting pair candidates stored in the storage devices 408 and 508 and there is no remaining candidate, the transceivers 400 and 500 returns to the training.

The procedure described above in this exemplary embodiment is merely an example. For example, there is flexibility in the order of those steps, the communication devices that perform various processing and calculation, the content of transmitted and received information, and so on. Therefore, various cases where any of these matters is different from those shown in the above exemplary embodiment are also included the scope of the present invention. Further, in the explanation, a group of two or more processes is sometimes handled as one step as in the case of the step S104-1 shown in FIG. 1A, for example, for the sake of convenience. The order of the processes constituting the step like this may be interchanged between steps. For example, such cases where each process constituting the step S104 shown in FIG. 1A is interchanged with each process constituting the step S105 in a temporal manner are also included the scope of the present invention.

According to this exemplary embodiment, it is possible to resume the communication without delay by selecting another antenna-setting pair candidate that is generated in advance when deterioration in communication quality such as disconnected communication occurs. In other words, it is unnecessary to carry out a training whenever deterioration in communication quality occurs in this exemplary embodiment, and thus making it possible to determine a new antenna setting in a short time. The training time in this exemplary embodiment could become longer depending on the number of antenna settings for the beam direction scanning performed in the steps S602 to S621. However, in general, the training is performed before the start of communication. Therefore, it is acceptable to take a longer time for the training in comparison to the time acceptable when the communication is restored after disconnection of the communication. Therefore, it does not cause any significant problem.

Further, in this exemplary embodiment, as a procedure for determining antenna-setting pairs, a specific example in which round-robin communication quality measurements are performed for all the combination of antenna-setting candidates and the antenna-setting pairs are determined based on the measurement results is shown. As described above, when the accuracy of the quasi-omni pattern is poor, i.e., when there are variations in the antenna gain depending on the radiation direction, or when other measurement errors exist, there is a possibility that errors occur in the combinations of antenna-setting candidates. To cope with this problem, round-robin trainings among the antenna-setting candidates are performed, so that it is possible to obtain antenna-setting pairs that are properly combined and properly arranged even when the accuracy of the quasi-omni pattern is poor or when other measurement errors exist in the process for detecting and determining antenna-setting candidates.

The following is supplementary explanation for the reason why this method is effective for millimeter waves or microwaves that are higher than or equal to around 10 GHz and have a high rectilinear propagation property when the method is used indoors. The propagation paths that can be used for radio communication are limited. That is, only the direct wave and reflected waves from certain objects such as walls, windows, and furniture can be used. Therefore, angles at which waves (signals) should be emitted for respective propagation paths or angles at which waves (signals) should be received are widely different from one wave (signal) to another. Meanwhile, when propagation paths having a low rectilinear propagation property such as a 2.4 GHz microwave band are used, it is necessary to give consideration to effects caused by multiple scattering and diffraction. Therefore, in general, directional antennas are not used. Therefore, situations are different between communication using microwaves and millimeter waves that have higher than or equal to around 10 GHz and communication using microwaves in the order of 2.4 GHz. It should be noted that there are some examples of development of adaptive antennas having directivity for the purpose of eliminating interferences even in the field of communication using 2.4 GHz microwaves. However, even when an adaptive-type directional antenna is used, it is relatively easy to ensure satisfactory communication quality at the angle of the direct wave or angles close to the direct wave in the 2.4 GHz band because diffraction effects can be expected in the 2.4 GHz band.

In indoor communication using beam forming in millimeter-wave bands, it is necessary to take the following properties into consideration. As described above, the number of reflected waves other than the direct wave is limited. Further, even if a certain direct wave or a reflected wave is blocked by an obstacle (e.g., human body), there is no correlation between the blocked certain wave and other waves. Therefore, as described with this exemplary embodiment, in millimeter wave communication systems, it is possible to secure reserve beam directions while performing communication in a beam direction having the best communication condition. Meanwhile, when the frequency is lower than around 10 GHz, contribution of multiple reflections and diffractions on the communication quality is large. Therefore, even if a directional antenna is used, the propagation state of the reserve beam directions varies depending on the presence/absence of an obstacle. That is, there is a high possibility that a received signal state of a reserve beam direction, which has satisfactory quality when no obstacle exists, is changed due to the presence of an obstacle. Therefore, it is difficult to obtain an advantageous effect of the present invention in 2.4 GHz microwave communication and the like.

Figure 25A:
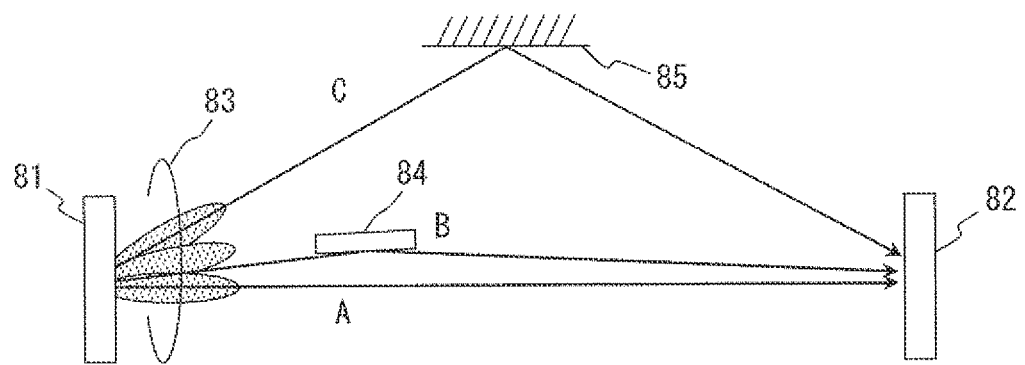
FIG. 25A is a figure for illustrating a radio wave propagation state where propagation paths are created as a result of local reflections of radio signals (when radio waves are not blocked) in radio control procedure according to the first exemplary embodiment of the present invention.
Figure 25B:
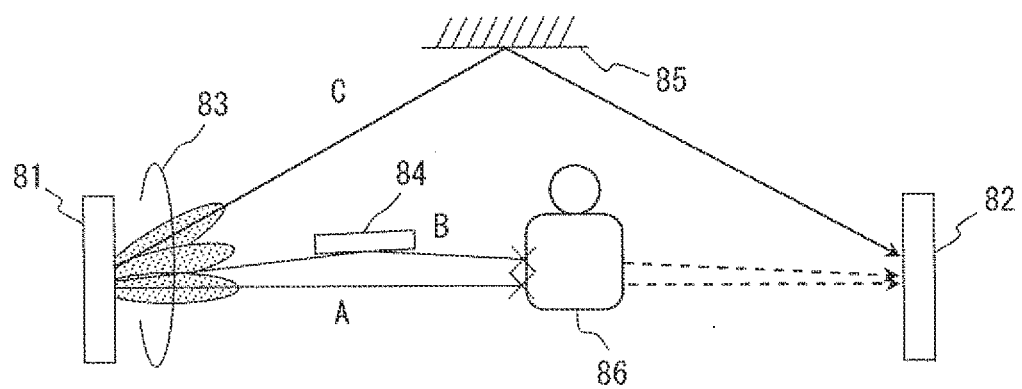
FIG. 25B is a figure for illustrating a radio wave propagation state where propagation paths are created as a result of local reflections of radio signals (when radio waves are blocked by a human body) in radio control procedure according to the first exemplary embodiment of the present invention.
Figure 26:
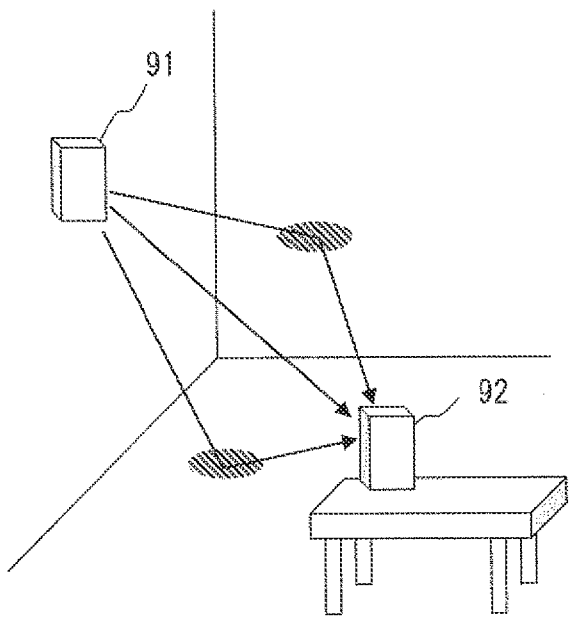
FIG. 26 shows a configuration of a system using wide-angle antennas.
Figure 27:
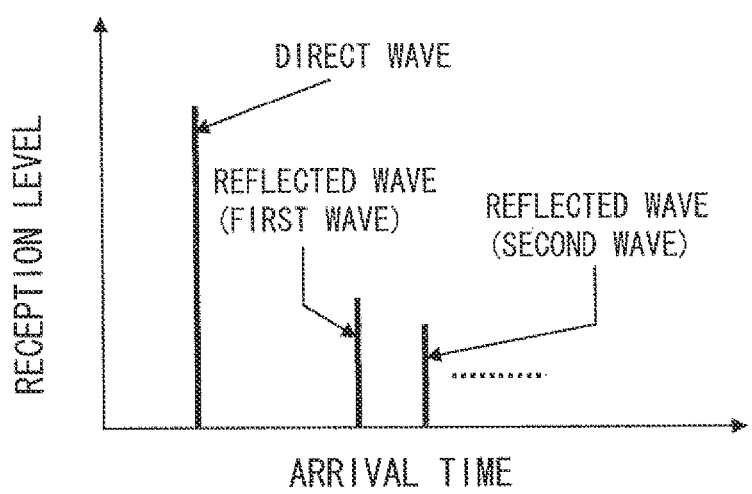
FIG. 27 shows an example of a delay profile of a system using wide-angle antennas when the system is used indoors.

Further, in millimeter wave communication, a local reflection may sometimes create a propagation path. FIGS. 25A and 25B show an aspect of such a situation. In FIG. 25A, there are a transceiver 81 and a receiver 82, and it is assumed that there are propagation paths in the beam forming including a direct wave A, a locally reflected wave B, and a reflected wave C propagating through a long path. There is a possibility that the direct wave A and the locally reflected wave B are blocked at the same time, for example, by a human body. To cope with this problem, Patent literature 1 discloses a technique to give no or a low priority to a beam direction close to another beam direction to which a priority is already assigned has no or a low priority. Although examples in which priority order is assigned to antenna-setting pairs in the order of received power (or other communication quality) has been described so far in the above explanation, it is also possible to take angular relations between beam candidates (antenna-setting candidates) into account in addition to the criterion based on the received power in the assignment of the priority order. Since information about angular relations between beam candidates in the respective communication devices is already obtained in this exemplary embodiment, it is possible to perform the priority order assignment like this.

In the above explanation, an omni pattern or a quasi-omni pattern is used as the radiation pattern of the antenna of the communication device in some of the steps. However, when it is difficult to generate an omni or quasi-omni pattern, other fixed beam patterns may be also used as a substitute. However, it is preferable to use a radiation pattern having an antenna gain over a sufficiently wide angular range. If the radiation pattern of the antenna is known in advance, a process of eliminating the effects caused by the directional dependence of the antenna gain of the fixed beam pattern from the received data obtained in the steps S102 to S105 shown in FIG. 1A may be added. Further, if necessary, a data string describing the directional dependence of the antenna gain of a fixed beam pattern may be transmitted between the communication devices.

In the above explanation, beam forming between two communication devices is explained. Such operations are often performed between two communication devices in a system including three or more communication devices. In general, there is a communication device having special authority called "Piconet coordinator" or "access point" in the system. The decision on which two communication devices perform a beam forming operation therebetween among the three or more communication devices is typically made by instructions from this communication device called "Piconet coordinator" or "access point". The Piconet coordinator or the access point may receive requests from other general communication devices and issue these instructions.

Further, in this exemplary embodiment, the roles of two communication devices are interchanged and then similar processes are performed therebetween. The decision on which of the two communication devices performs which of the roles before the other communication device may be also made by instructions from the communication device called "Piconet coordinator" or "access point".

Further, although expressions such as "to operate a communication device for reception" and "to generate an omni (nondirectional) or quasi-omni (quasi-nondirectional) pattern" are used in the above explanation, these processes may be, in general, performed in accordance with a program that are incorporated in advance into the process/arithmetic circuits 406 and 506 or the like of the transceivers 400 and 500.

<Second Exemplary Embodiment>

Figure 6:
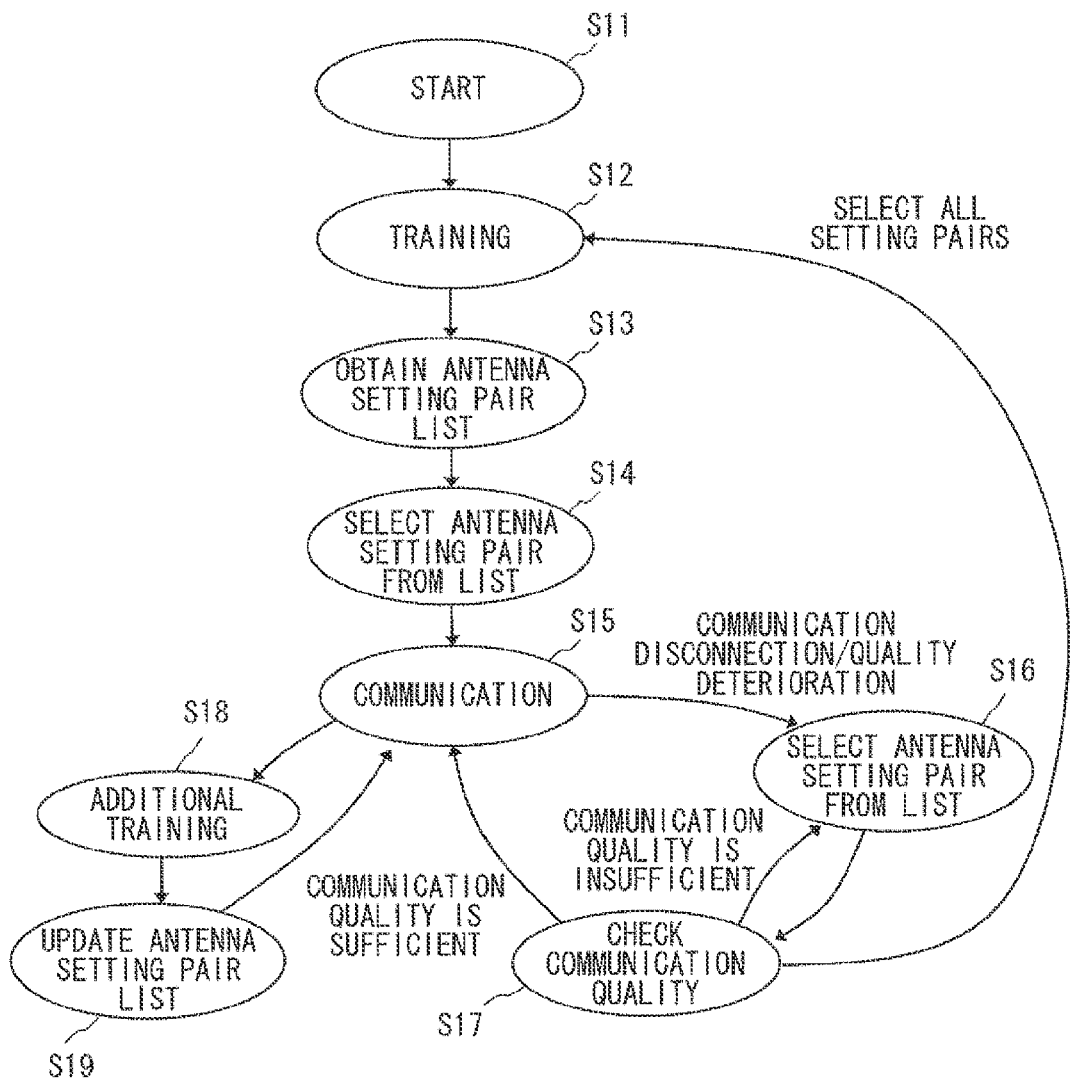
FIG. 6 shows transitions in a radio control procedure according to a second exemplary embodiment of the present invention.

A second exemplary embodiment according to the present invention is explained with reference to a transition diagram shown in FIG. 6. Note that the configuration of a radio communication system according to this exemplary embodiment may be similar to that of the first exemplary embodiment shown in FIG. 3. Each of states S11 to S17 and transition conditions therebetween in FIG. 6 are similar to the states assigned with the same signs and their transition conditions shown in FIG. 5 described above with the first exemplary embodiment. Therefore, detailed explanation of the states S11 to S17 is omitted.

In a state S18 in FIG. 6, the state changes from the state (S15) where the communication is performed, and an additional training is performed. The additional training may be periodically performed or may be performed as appropriate during idle time in which there is no data to be transmitted or received.

In the state S18, the process/arithmetic circuit 406 and 506 calculate antenna-setting pair candidates again. The process/arithmetic circuits 406 and 506 update the antenna-setting-pair list stored in the storage circuits 408 and 508 with the antenna-setting pairs obtained by the recalculation (S19).

In this exemplary embodiment, conditions of reserve beam directions (antenna settings) are periodically or appropriately examined by the additional training and the antenna-setting-pair list is thereby updated. In this way, the radio communication system in accordance with this exemplary embodiment can keep the antenna-setting-pair list that is constantly updated to the newest state. Note that the additional training (S18) may be divided and performed during intervals of the communication. In this way, it can eliminate the need to suspend the communication for a long time. Further, when the communication is disconnected or the communication quality is deteriorated, it is desirable to recover the communication in an extremely short time. However, since this additional training does not need to be performed immediately, no strong restriction is imposed on the training time.

Furthermore, since this additional training often requires less immediacy in comparison to the initial training, the beam direction scanning, which is performed by changing the antenna setting, may be performed with a higher angular resolution. In this way, it is possible to find antenna-setting pairs that make it possible to achieve better communication quality.

Further, the beam direction scanning in the additional training may be performed with such a condition that the scan range is limited to ranges in and around the beam direction corresponding to each of the antenna-setting pairs obtained in the initial training. In this way, the search for antenna-setting pairs that make it possible to achieve better communication quality can be performed in a shorter time.

Note that in the additional training explained above, the procedure from the determination of antenna-setting candidates to the creation of antenna-setting-pair list, i.e., the whole training procedure (part corresponding to S12 and S13) is performed. However, it is possible to adopt another form of operation in which communication quality tests are performed for all or some of the antenna-setting pairs obtained in the state S13 and the update of the antenna-setting-pair list (e.g. rearrangement of antenna-setting pairs included in the antenna-setting-pair list, or removal of some of the antenna-setting pairs) is carried out based on their results. Alternatively, it is also possible to adopt another form of operation in which round-robin communication quality tests between communication devices are performed for all or some of the antenna-setting candidates determined in the state S12 (corresponding to S109 and S110 in FIG. 1B) and the update of the antenna-setting-pair list is carried out based on their results.

Further, an update result of the antenna-setting-pair list that is obtained by performing an additional training may be immediately reflected on the antenna-setting pair that is currently used for the communication, or may be reflected when the state changes from the state S15 to the state S16 due to deterioration of the communication quality.

<Third Exemplary Embodiment>

Figure 7:
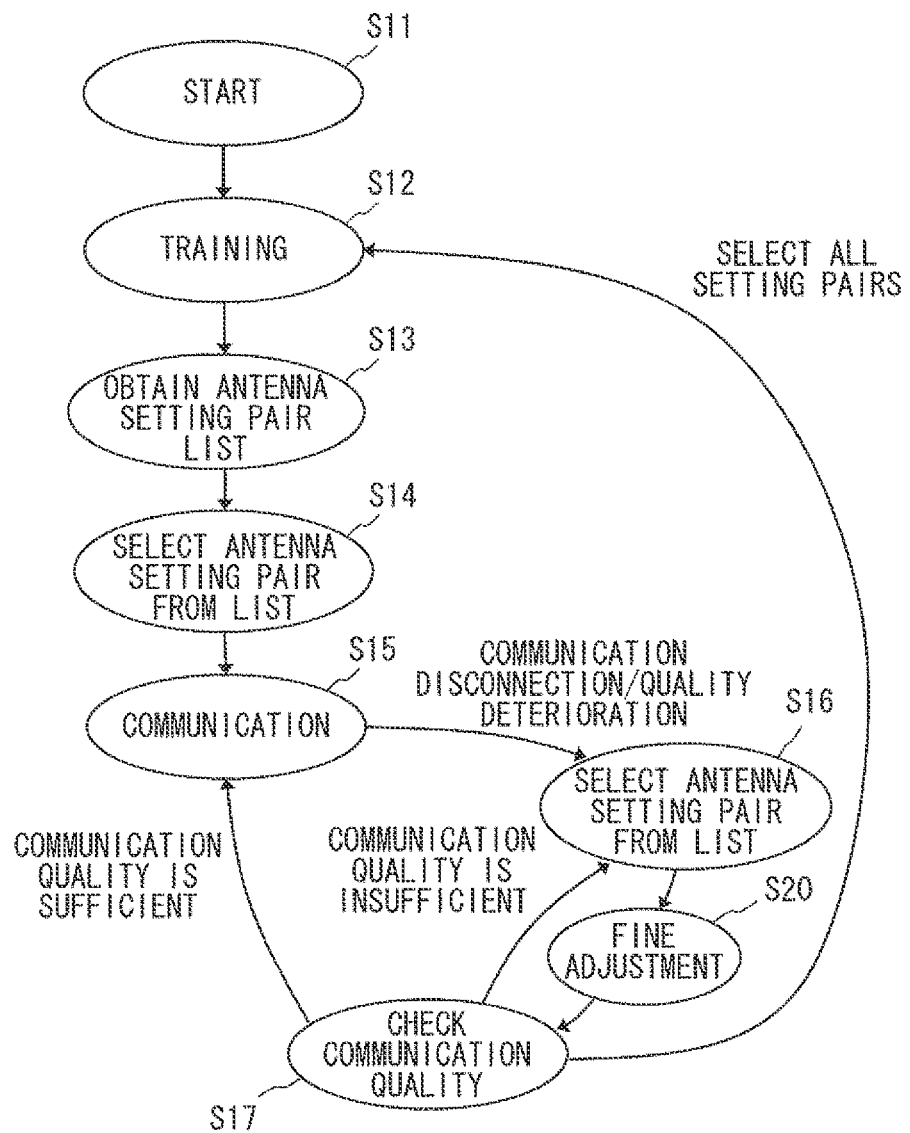
FIG. 7 shows transitions in a radio control procedure according to a third exemplary embodiment of the present invention.

A third exemplary embodiment according to the present invention is explained with reference to a transition diagram shown in FIG. 7. Note that the configuration of a radio communication system according to this exemplary embodiment may be similar to that of the first exemplary embodiment shown in FIG. 3. Further, each of states S11 to S17 and transition conditions therebetween (except for transition between S16 and S17) in FIG. 7 are similar to the states assigned with the same signs and their transition conditions shown in FIG. 5 described above with the first exemplary embodiment. Therefore, detailed explanation of the states S11 to S17 is omitted.

In this exemplary embodiment, when deterioration in communication quality such as disconnected communication occurs, the next antenna-setting pair candidate listed on the antenna-setting-pair list is selected (S16) and a fine adjustment is made in that state (S20). The fine adjustment means a method for searching for an optimal beam (antenna setting) without spending too much time. Specifically, the fine adjustment may be performed by slightly changing the antenna setting and thereby changing the beam direction so that better communication quality is obtained. Further, simplified beam searching procedure such as "Beam Tracking" disclosed in Patent literature 4 may be applied. Furthermore, processes similar to those of the initial training may be performed with an angular resolution higher than that in the initial training in and around the beam direction corresponding to the newly-selected antenna-setting pair.

For example, in a case where the antenna-setting pair is shifted from one antenna-setting pair to another in descending order of their corresponding received power as described in detail with the first exemplary embodiment, there is a possibility the received power becomes gradually smaller and the accuracy deteriorates gradually. Accordingly, this exemplary embodiment provides an advantageous effect that an antenna-setting pair with which stable transmission can be performed with high accuracy can be found, for example, by performing a gain adjustment for the receiving operation and performing a fine adjustment in the optimal state in a state where shielding occurs and the received power is thereby weakened.

<Fourth Exemplary Embodiment>

Figure 8:
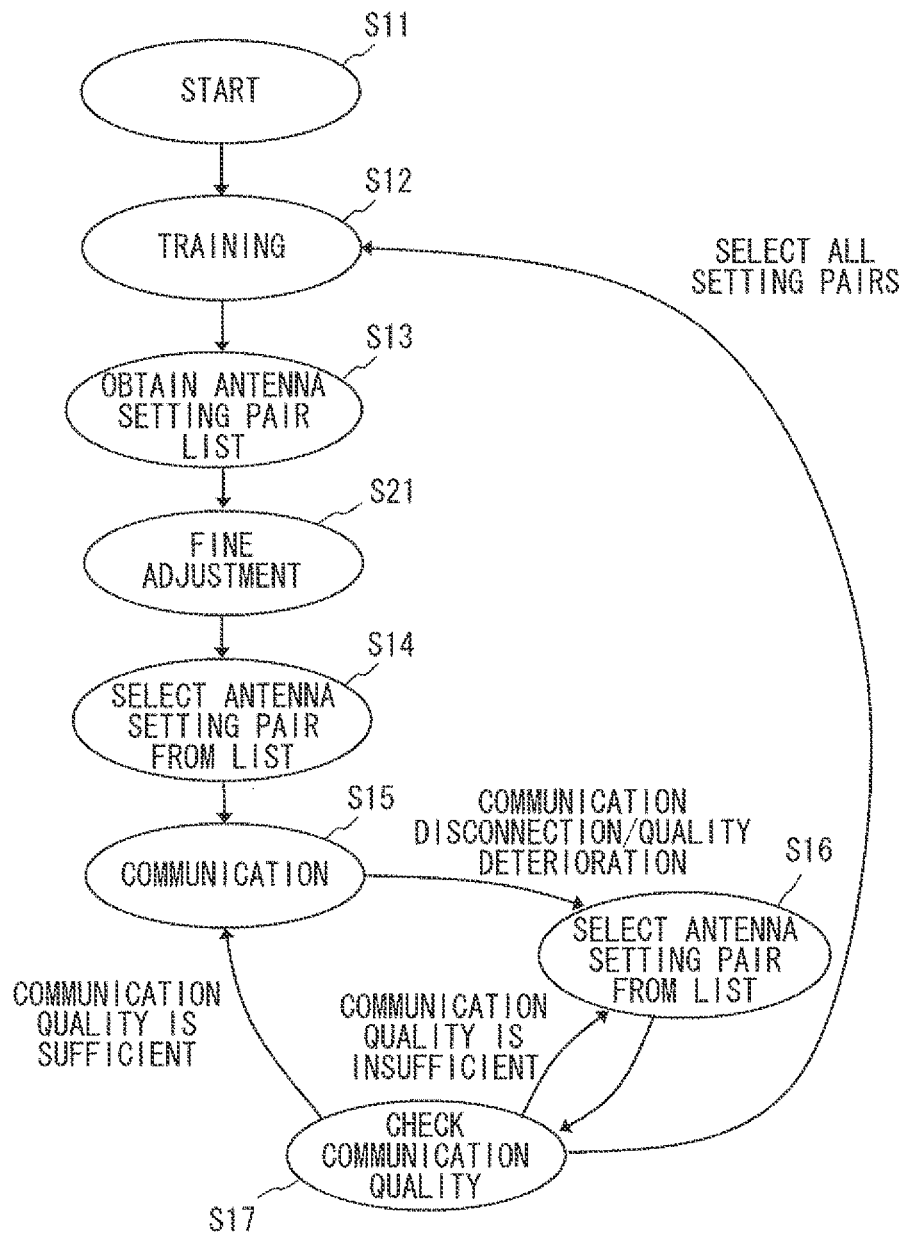
FIG. 8 shows transitions in a radio control procedure according to a fourth exemplary embodiment of the present invention.

A fourth exemplary embodiment according to the present invention is explained with reference to a transition diagram shown in FIG. 8. Note that the configuration of a radio communication system according to this exemplary embodiment may be similar to that of the first exemplary embodiment shown in FIG. 3. Further, each of states S11 to S17 and transition conditions therebetween (except for transition between S13 and S14) in FIG. 8 are similar to the states assigned with the same signs and their transition conditions shown in FIG. 5 described above with the first exemplary embodiment. Therefore, detailed explanation of the states S11 to S17 is omitted.

In this exemplary embodiment, after an antenna-setting-pair list is obtained in the state S13, fine adjustments are made for all or some of the antenna-setting pairs included in the list before the start of communication (S21). The fine adjustment means, for example, an adjustment to antenna setting that is made in and around the beam direction corresponding to an antenna-setting pair included in the list with an angular resolution higher than that in the training performed in the state S12. After that, an antenna-setting pair is selected from the antenna-setting-pair list for which the fine adjustment has been made (S14), and the communication is started (S15).

According to this exemplary embodiment, communication quality between the transceivers 400 and 500 can be improved when the communication is performed by using one of the antenna-setting pairs included in the antenna-setting-pair list. Further, since fine adjustments are made before the start of communication, the communication disconnection time can be shortened in comparison to the case where the fine adjustment is made when the antenna-setting pair is changed due to the occurrence of communication disconnection.

<Fifth Exemplary Embodiment>

Figure 9:
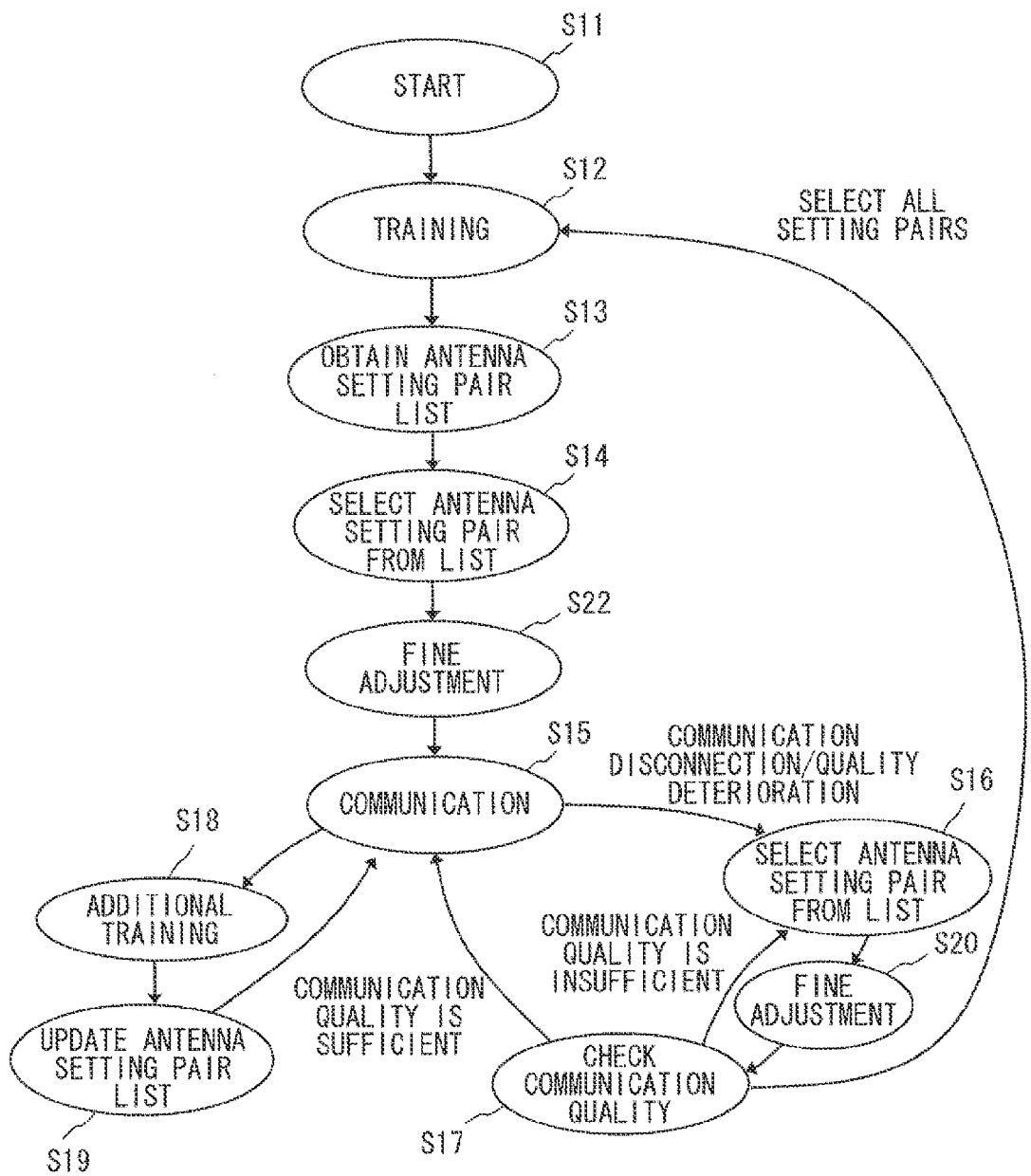
FIG. 9 shows transitions in a radio control procedure according to a fifth exemplary embodiment of the present invention.

A fifth exemplary embodiment according to the present invention is explained with reference to a transition diagram shown in FIG. 9. Note that the configuration of a radio communication system according to this exemplary embodiment may be similar to that of the first exemplary embodiment shown in FIG. 3. Further, each of states S11 to S17 and transition conditions therebetween (except for transition between S13 and S14, and between S16 and S17) in FIG. 9 are similar to the states assigned with the same signs and their transition conditions shown in FIG. 5 described above with the first exemplary embodiment. Therefore, detailed explanation of the states S11 to S17 is omitted.

Two or more of the procedures that are added to the first exemplary embodiment in second to fourth exemplary embodiments explained above may be applied at the same time. This exemplary embodiment is an example in which all the procedures (S18 and S19, S20, and S22) are incorporated at the same time.

<Sixth Exemplary Embodiment>

Figure 10:
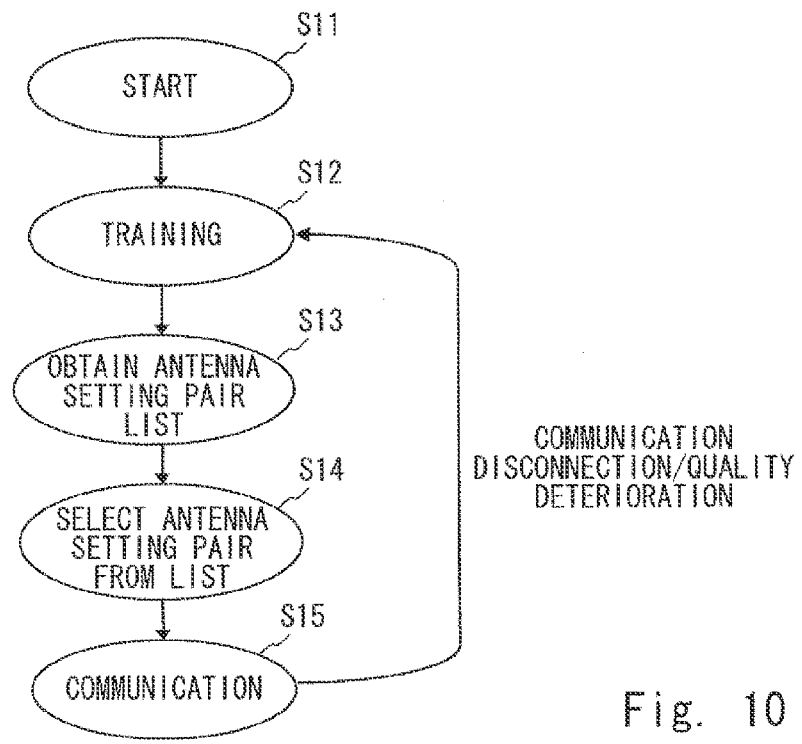
FIG. 10 shows transitions in a radio control procedure according to a sixth exemplary embodiment of the present invention.

A sixth exemplary embodiment according to the present invention is explained with reference to a transition diagram shown in FIG. 10. Note that the configuration of a radio communication system according to this exemplary embodiment may be similar to that of the first exemplary embodiment shown in FIG. 3. Further, each of states S11 to S15 and transition conditions therebetween (except for transition between S15 and S11) in FIG. 10 are similar to the states assigned with the same signs and their transition conditions shown in FIG. 5 described above with the first exemplary embodiment. Therefore, detailed explanation of the states S11 to S15 is omitted.

In the first to fifth exemplary embodiments, when communication disconnection or communication quality deterioration occurs during the communication (S15), another antenna-setting pair is selected from the antenna-setting-pair list (S16); if necessary, a fine adjustment is made (S20); and after the communication quality is checked (S17), the communication is resumed (S15). However, as described in this exemplary embodiment, the procedure may be modified in such a manner that one antenna-setting pair is selected from the antenna-setting-pair list (S14), and when communication disconnection or communication quality deterioration occurs during the communication (S15), a training is performed again (S12). In the state S14, when one antenna-setting pair is selected from the antenna-setting-pair list (S14), it is desirable to select an antenna-setting pair for which the received power (or other communication quality index) measured in the training in the states S12 and S13 is highest.

In this exemplary embodiment, it is impossible to obtain the advantageous effect that the communication can be quickly resumed by changing the antenna-setting pair when communication disconnection or communication quality deterioration occurs, which is achieved by storing reserve antenna-setting pairs in advance. However, as stated in the first exemplary embodiment, the present invention can provide another advantageous effect that it is possible to obtain antenna-setting pairs that are properly combined and properly arranged even when the accuracy of the quasi-omni pattern is poor or when other measurement errors exist in the process for detecting and determining antenna-setting candidates. Therefore, even when the stored reserve antenna-setting pairs are not used as in the case of this exemplary embodiment, the present invention is effective.

<Seventh Exemplary Embodiment>

A seventh exemplary embodiment according to the present invention is explained with reference to a sequence diagram shown in FIGS. 20A and 20B. This sequence diagram is a modified version of that shown in FIGS. 18A and 18B. Therefore, when the processes shown in FIG. 20B are finished, the processes shown in FIG. 18C may be performed.

In the first exemplary embodiment, a quasi-omni pattern is used in the process for determining antenna-setting candidates for each antenna (S102 to S105 in FIG. 1A, and S602 to S617 in FIGS. 18A and 18B). However, there are cases where it is difficult to implement a quasi-omni pattern over the entire desired angular range depending on the conditions of such as the type and the structure of used antenna and the used frequency band. In such cases, the quasi-omni pattern may be divided into an appropriate number of angular ranges in all or some of the steps S102-2, S103-1, S104-1 and S105-2 shown in FIG. 1A, and all or some of the steps S102-2, S103-1, S104-1 and S105-2 may be repeatedly performed for each of the divided angular ranges.

Figure 20A:
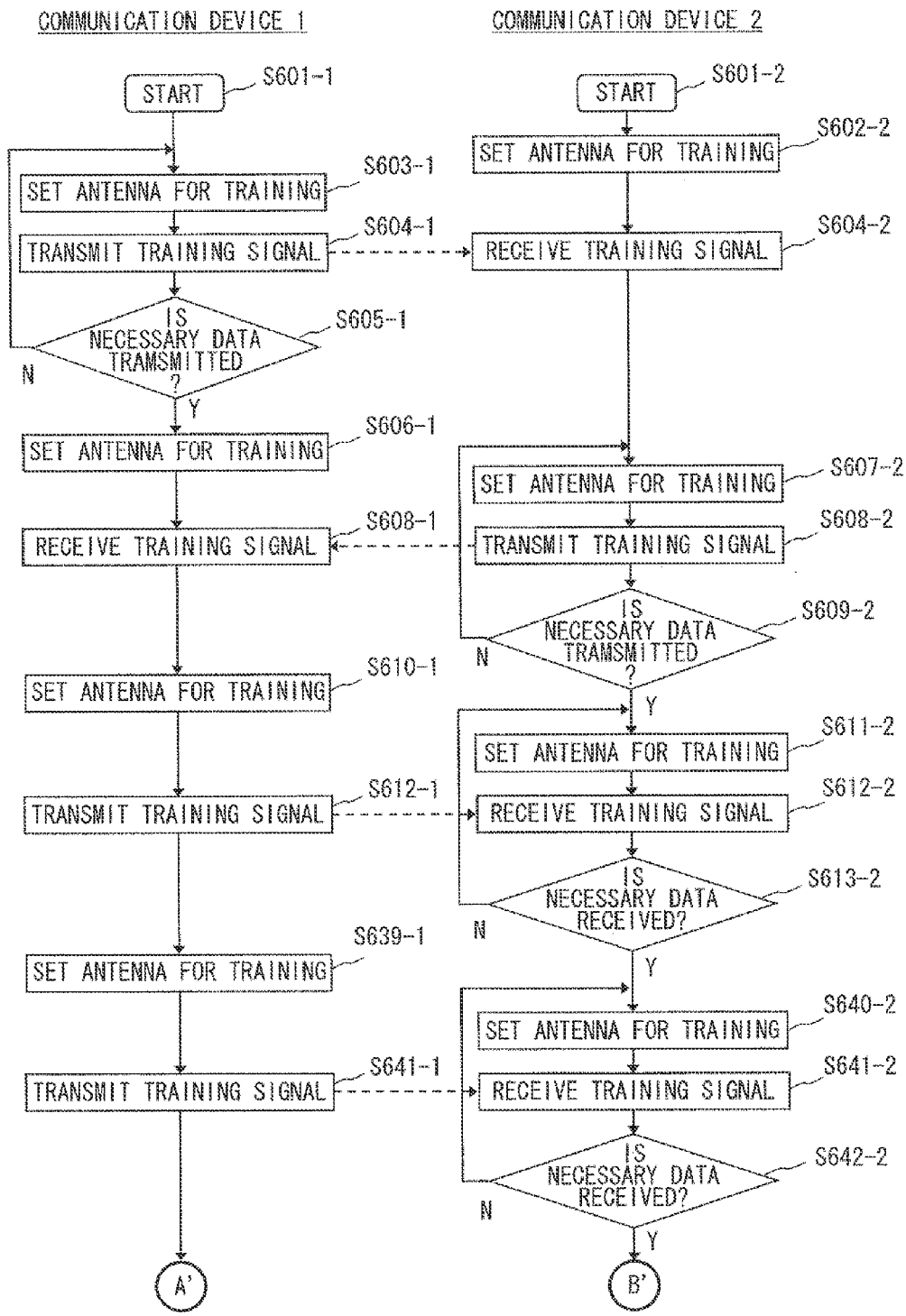
FIG. 20A is a sequence diagram showing a part of an operation of a communication device in a radio control procedure according to a seventh exemplary embodiment of the present invention.
Figure 20B:
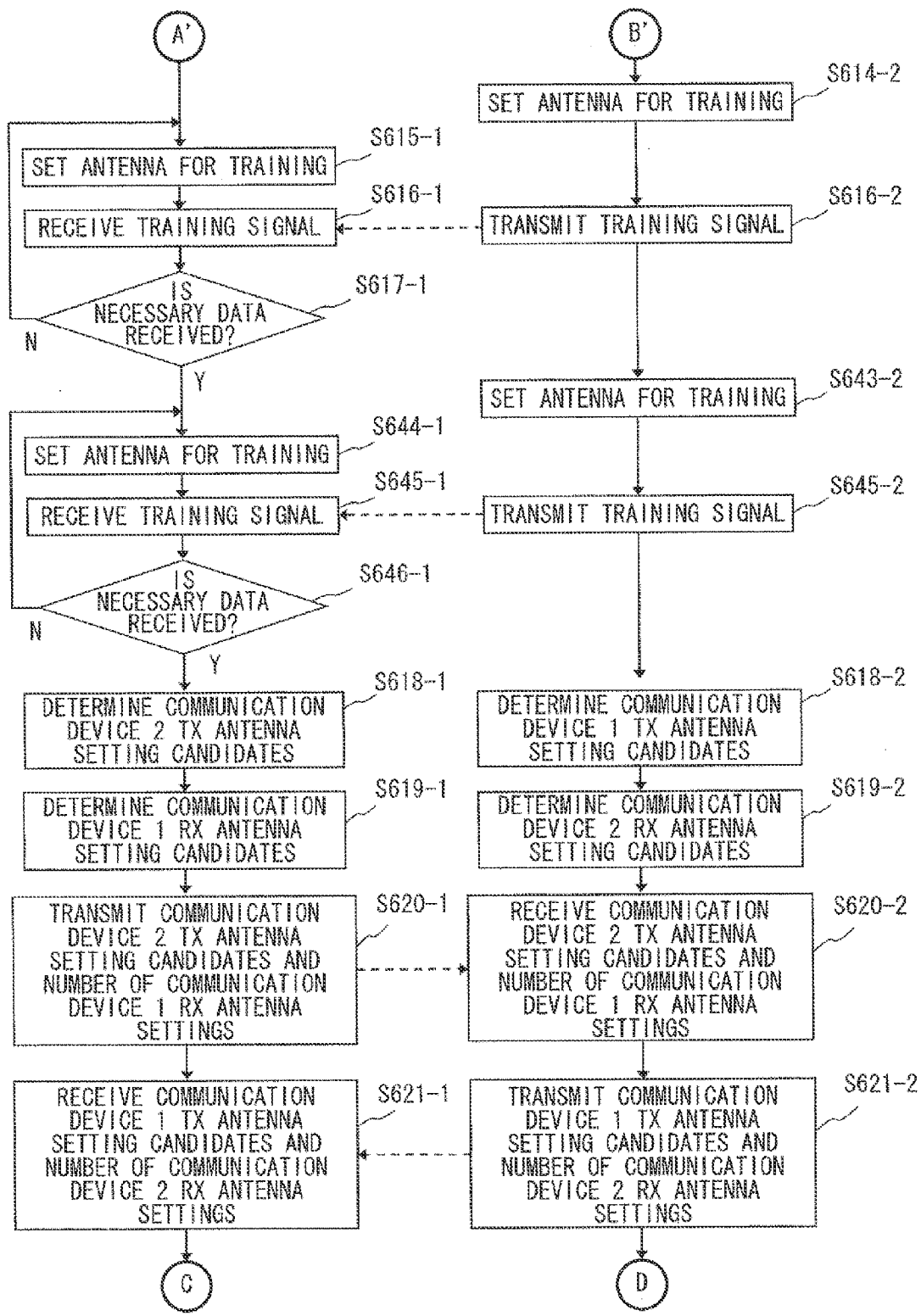
FIG. 20B is a sequence diagram showing a part of an operation of a communication device in a radio control procedure according to the seventh exemplary embodiment of the present invention.

The sequence diagram shown in FIGS. 20A and 20B is an example where the steps S104 and S105 shown in FIG. 1A are each divided into two sections. In comparison to FIGS. 18A and 18B, steps S639 to S642 and S643 to S646 are added. The desired angular range of the transmitting antenna of the communication device 1 is covered by two quasi-omni patterns that are set in the step S610-1 and S639-1 respectively. When receiving antenna-setting candidates of the communication device 2 are determined in the step S619-2, both of the reception signal data obtained in the step S612-2 and the step S641-2 may be used. Similarly, the desired angular range of the transmitting antenna of the communication device 2 is covered by two quasi-omni patterns that are set in the step S614-2 and S643-2 respectively. When receiving antenna-setting candidates of the communication device 1 are determined in the step S619-1, both of the reception signal data obtained in the step S616-1 and the step S645-1 may be used.

The above-mentioned "desired angular range" means, for example, an angular range (direction range) including all the propagation paths used for the communication. Non-patent literature 5 discloses a method for covering a necessary angular range with a plurality of quasi-omni patterns in a manner like this.

<Eighth Exemplary Embodiment>

Figure 21A:
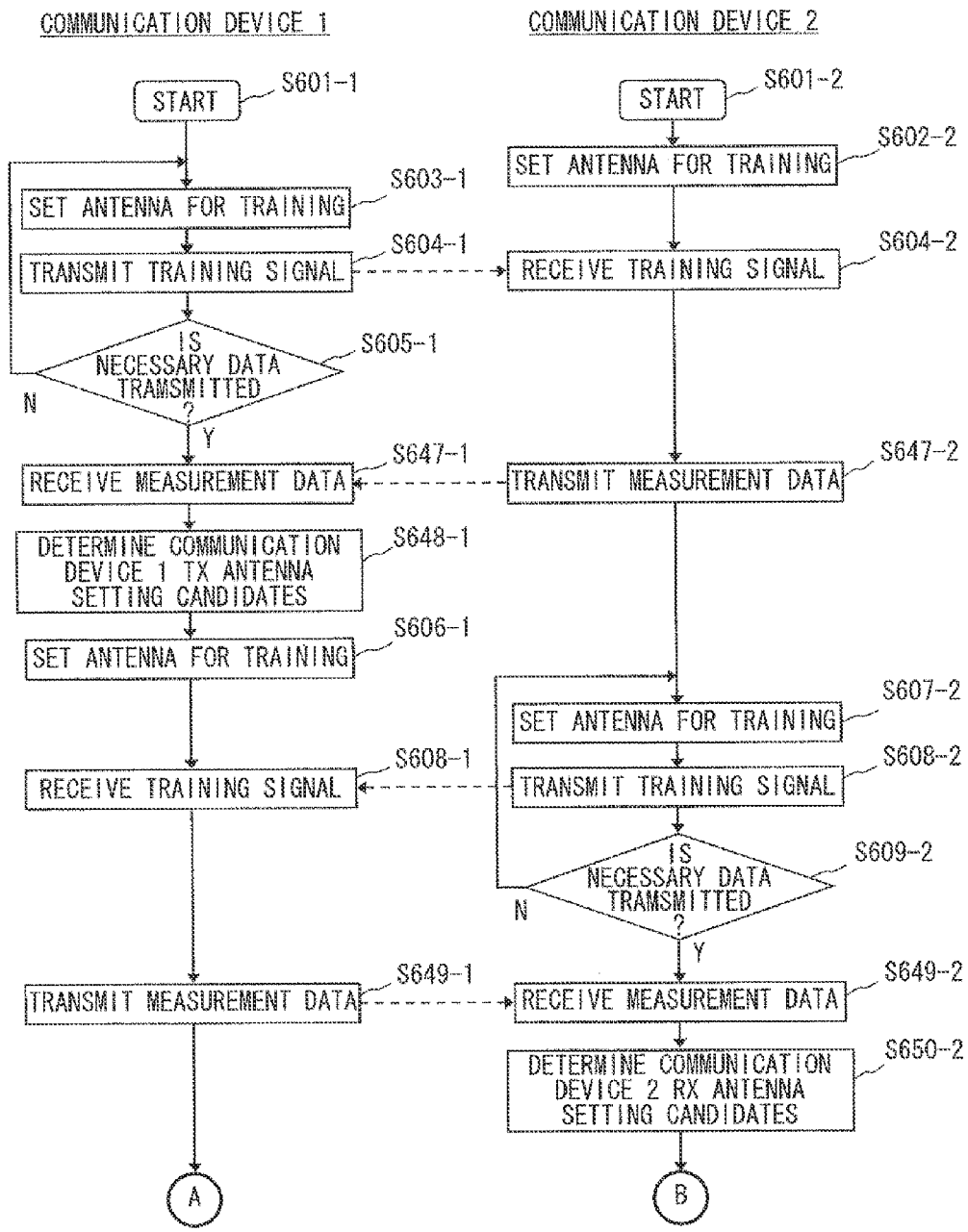
FIG. 21A is a sequence diagram showing a part of an operation of a communication device in a radio control procedure according to an eighth exemplary embodiment of the present invention.
Figure 21B:
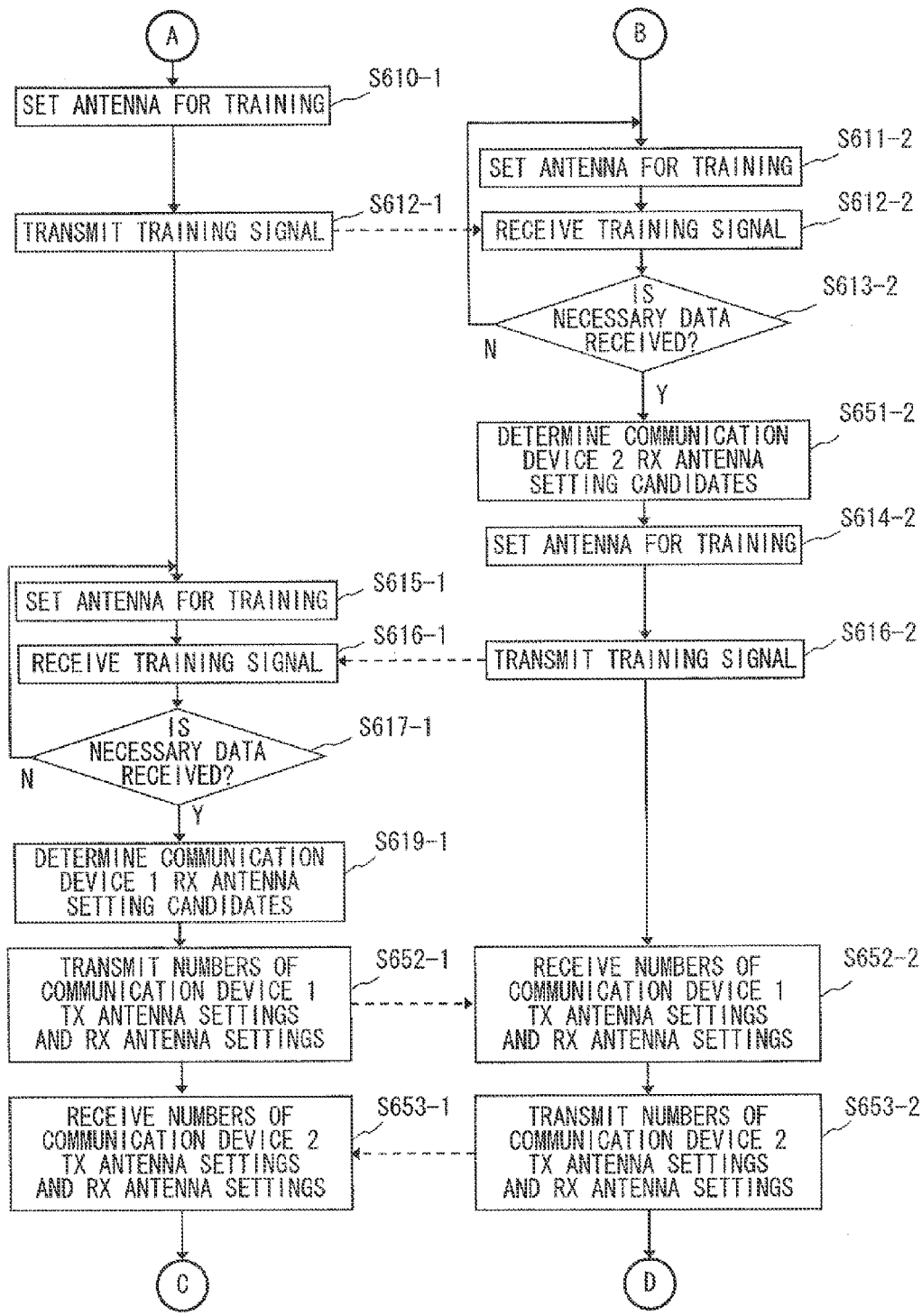
FIG. 21B is a sequence diagram showing a part of an operation of a communication device in a radio control procedure according to the eighth exemplary embodiment of the present invention.

An eighth exemplary embodiment according to the present invention is explained with reference to a sequence diagram shown in FIGS. 21A and 21B. This sequence diagram is a modified version of that shown in FIGS. 18A and 18B. When the processes shown in FIG. 21B are finished, the processes shown in FIG. 18C may be performed.

As stated in the end of the first exemplary embodiment, there are various flexibilities in the order of those steps, the communication devices that perform various processing and calculation, the content of transmitted and received information, and so on when the present invention is put into practice. This exemplary embodiment shows an example of such modifications. An operation is explained hereinafter along the sequence diagram shown in FIGS. 21A and 21B.

Firstly, the communication device 2 sets the receiving-antenna setting with values for a training, i.e., values for generating a quasi-omni pattern in this example (S602-2). The communication device 1 repeatedly transmits training signal (S604-1) while changing the transmitting-antenna setting (S603-1) until signal transmissions in all of the predetermined antenna settings have been completed (S605-1). The communication device 2 receives the training signal (S604-2).

Next, the communication device 2 feeds measurement data received in the step S604-2 back to the communication device 1 (S647-2). The communication device 1 receives this measurement data (S647-1) and determines its own transmitting-antenna-setting candidates by using this measurement data.

In steps S606 to S650, the procedure of the above-described steps (S602 to S648) is performed in a state where the roles of the communication device 1 and 2 are interchanged.

The steps S610 to S613 are exactly the same as those in the first exemplary embodiment (FIG. 18B). However, in this exemplary embodiment, the communication device 2 performs a process of determining its own receiving antenna-setting candidates by using measurement data received in the step S612-2 immediately after the steps S610 to S613 (S651-2).

In steps S614 to S619, the procedure of the above-described steps (S610 to S651) is performed in a state where the roles of the communication device 1 and 2 are interchanged.

In this exemplary embodiment, the content of information to be transmitted and received in the steps S652 and S653 is also different from that in the first exemplary embodiment. In this exemplary embodiment, the determination of antenna-setting candidates is performed by the communication devices themselves in which the respective antennas are mounted. Therefore, the transmission and reception of antenna-setting candidates like the one performed in FIG. 16 is unnecessary. However, each communication device has to notify the other communication device of the total number of its own antenna-setting candidates so that round-robin trainings between the antenna-setting candidates can be performed. That is, in a step S652, the communication device 1 sends, to the communication device 2, the total number of its own transmitting-antenna-setting candidates and the total number of its own receiving-antenna-setting candidates. On the other hand, in a step S653, the communication device 2 sends, to the communication device 1, the total number of its own transmitting-antenna-setting candidates and the total number of its own receiving-antenna-setting candidates.

<Ninth Exemplary Embodiment>

Figure 22C:
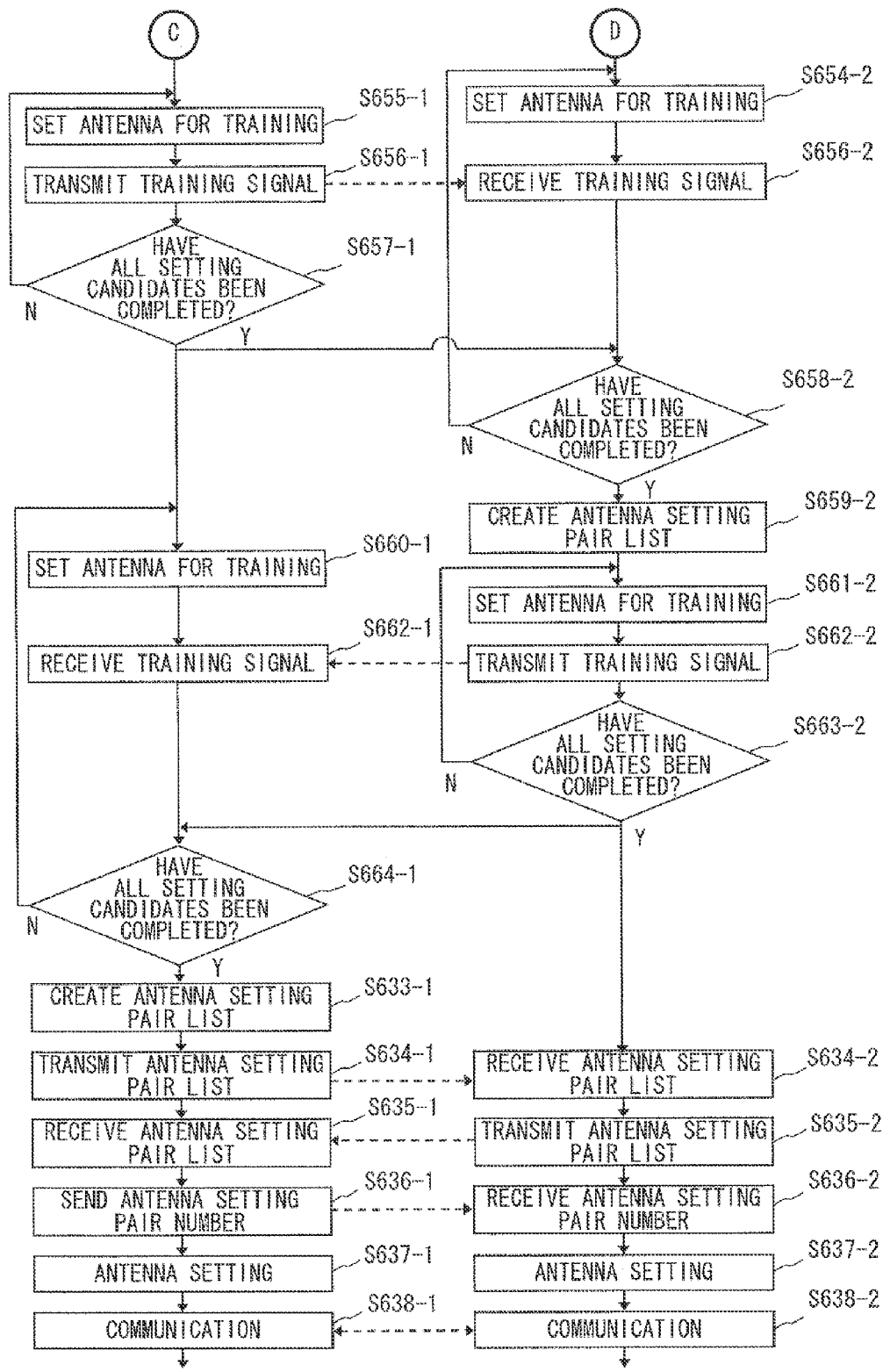
FIG. 22C is a sequence diagram showing a part of an operation of a communication device in a radio control procedure according to a ninth exemplary embodiment of the present invention.

A ninth exemplary embodiment according to the present invention is explained with reference to a sequence diagram shown in FIG. 22C. This sequence diagram is a modified version of that shown in FIG. 18C. Therefore, the processes shown in FIG. 22C may be performed after the processes shown in FIGS. 18A and 18B, FIGS. 20A and 20B, or FIGS. 21A and 22B are finished.

In the first exemplary embodiment, the round-robin communication quality tests between transmitting-antenna-setting candidates of the communication device 1 and receiving-antenna-setting candidates of the communication device 2 (S622 to S627 in FIG. 18C) are performed as below. That is, the process, in which one transmitting-antenna-setting candidate is successively combined with respective receiving antenna-setting candidates and measurement (transmission and reception of training signal) is carried out for each combination, is repeated for all the transmitting-antenna-setting candidates. In contrast to this, in this exemplary embodiment, a process in which one receiving-antenna-setting candidate is successively combined with respective transmitting-antenna-setting candidates and measurement is carried out for each combination is repeated for all the receiving antenna-setting candidates (S654 to S658 in FIG. 22C). The round-robin communication quality tests between receiving-antenna-setting candidates of the communication device 1 and those of the transmitting antenna of the communication device 2 (S660 to S632 in FIG. 22C) are also performed in a similar fashion.

<Tenth Exemplary Embodiment>

Figure 23B:
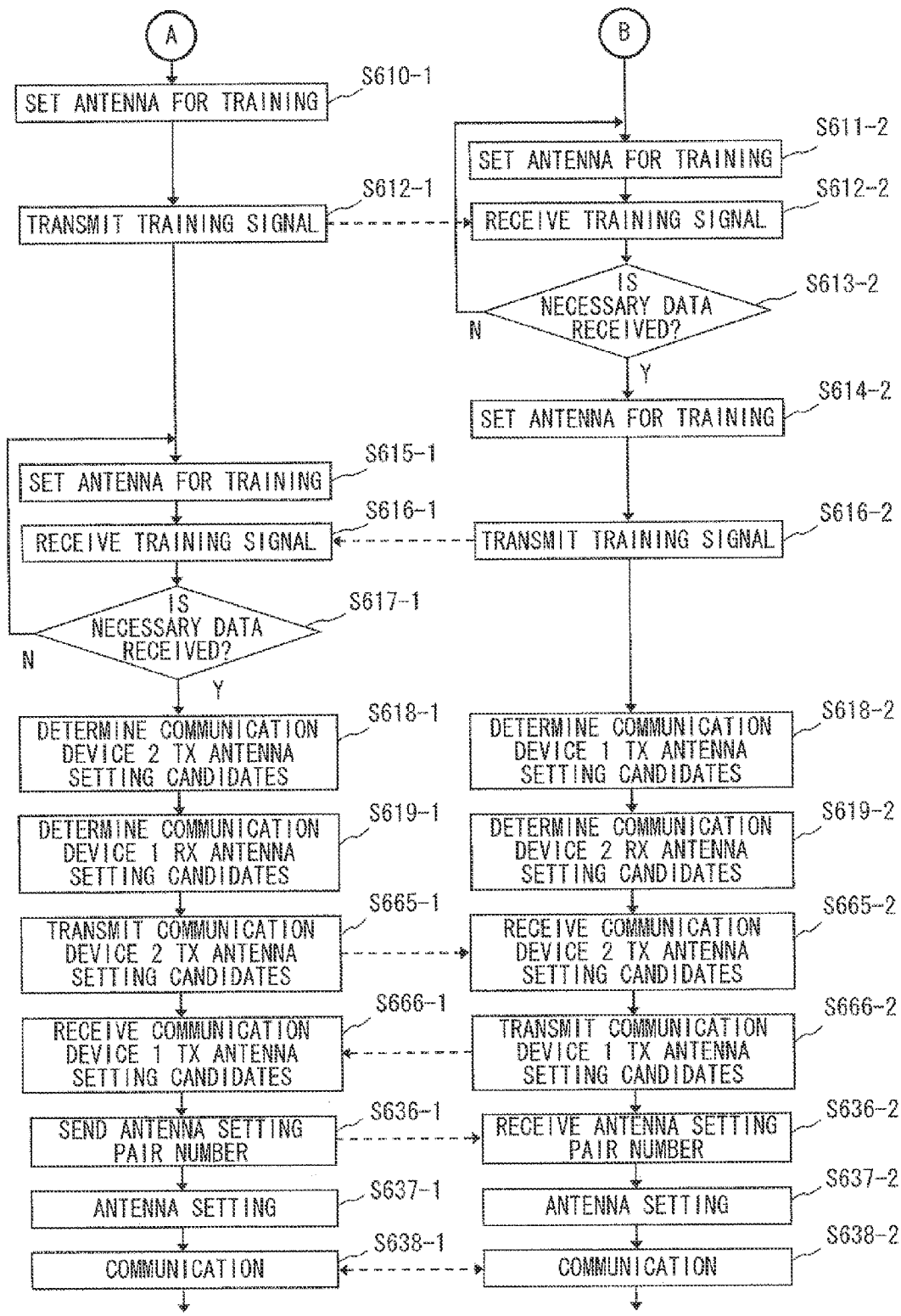
FIG. 23B is a sequence diagram showing a part of an operation of a communication device in a radio control procedure according to a tenth exemplary embodiment of the present invention.

A tenth exemplary embodiment according to the present invention is explained with reference to a sequence diagram shown in FIG. 23B. This sequence diagram is a modified version of that shown in FIGS. 18B and 18C. Therefore, the below-explained processes shown in FIG. 23B may be performed after the processes shown in FIG. 18A are finished.

In the steps S622 and S623 in the first exemplary embodiment shown in FIG. 18, round-robin communication quality tests are performed between transmitting-antenna-setting candidates of the communication device 1 and receiving-antenna-setting candidates of the communication device 2 and between receiving-antenna-setting candidates of the communication device 1 and transmitting-antenna-setting candidates of the communication device 2. This procedure is performed in order to obtain antenna-setting pairs that are properly combined and properly arranged even when the accuracy of the quasi-omni pattern is poor, when other measurement errors exist, or even when there are two or more propagation paths having similar propagation losses (or other communication quality) in the process for detecting and determining antenna-setting candidates as described in the first exemplary embodiment. However, when a good quasi-omni pattern can be formed, when other measurement errors are sufficiently small, or when there are not any two propagation paths having similar propagation losses (or other communication quality), it is possible to omit these round-robin communication quality tests between antenna-setting candidates. That is, each antenna-setting pair may be formed by combining antenna-setting candidates for which the received powers (or other communication qualities), measured in determining antenna-setting candidates, are ranked in the same positions with each other.

Through a similar procedure to that in the first exemplary embodiment, antenna-setting candidates of each antenna are determined before and in the step S619 (S618 and S619). Since the round-robin communication quality tests are not performed in this exemplary embodiment, there is no need to transfer the number of antenna-setting candidates. Therefore, in a step S665, only the transmitting-antenna-setting candidates of the communication device 2 are sent from the communication device 1 to the communication device 2. Similarly, in a step S666, only the transmitting-antenna-setting candidates of the communication device 1 are sent from the communication device 2 to the communication device 1. After that, the communication device 1 notifies the communication device 2 of an antenna-setting pair number (S636), and the communication devices 1 and 2 perform antenna setting (S637) and start the communication (S638). The delivery of an antenna-setting pair number in the step S636 may be performed from the communication device 2 to the communication device 1. Alternatively, when the order of antenna-setting pair numbers to be used for the communication is determined in advance, this delivery may be omitted.

Note that when the round-robin communication quality tests between antenna-setting candidates are omitted as in the case of this exemplary embodiment, it is impossible to completely eliminate the possibility that an error occurs in the combination or order of antenna settings. However, even if an error occurs in the combination or order of antenna settings, it never causes any fatal effect such as prolonged communication disconnection and complete communication stop. This is because since, for example, the communication quality is checked in the state S17 in FIG. 5, the state changes to the state S16 and the antenna-setting pair is selected again when the above-mentioned combination error occurs. However, when such errors occur frequently, it is desirable to apply the procedure including round-robin communication quality tests between antenna-setting candidates as described in the first exemplary embodiment.

<Eleventh Exemplary Embodiment>

Figure 24:
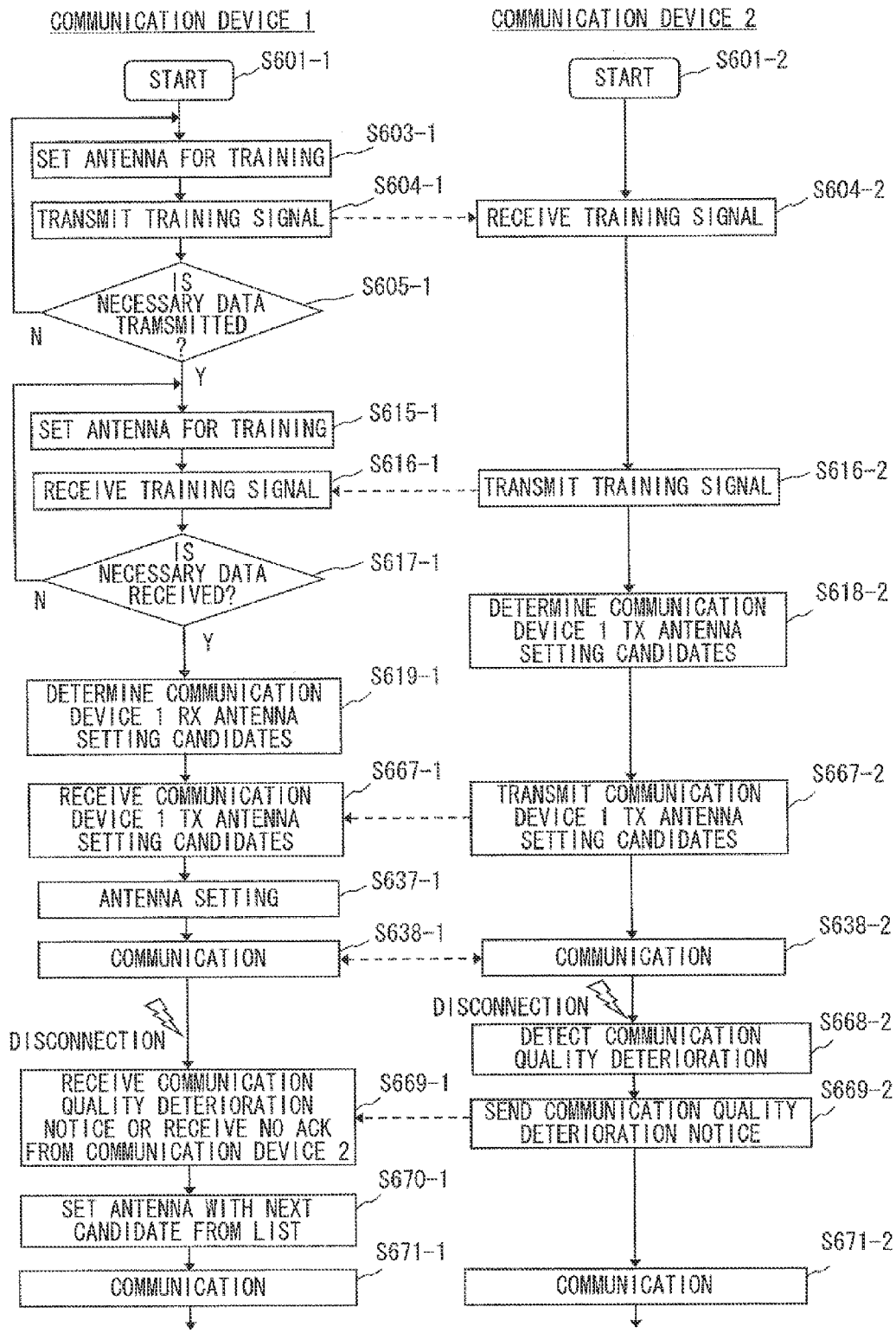
FIG. 24 is a sequence diagram showing an operation of a communication device performed before radio communication is performed in a radio control procedure according to an eleventh exemplary embodiment of the present invention.

The above explanation has been made on the assumption that communication is performed between communication devices each equipped with an antenna having a directivity control function. However, the present invention can be also applied to communication between a communication device equipped with an antenna that forms a fixed beam and a communication device equipped with an antenna having a directivity control function. FIG. 24 shows an example of a sequence diagram of a case where beam forming is performed between a communication device equipped with an antenna having a directivity control function (communication device 1) and a communication device equipped with an antenna forming a fixed beam (communication device 2).

In this exemplary embodiment, antenna-setting candidates may be determined only for the transmission and receiving antennas of the communication device 1 (S603 to S619). That is, there is no need to perform the procedure of determining antenna-setting candidates for the communication device 2 forming a fixed beam. Further, since there is no need to determine antenna-setting pairs, no round-robin quality tests between setting candidates are performed.

Note that in this exemplary embodiment, the communication device 2 determines transmitting-antenna-setting candidates of the communication device 1 by using measurement data obtained in the step S604-2 (S618-2), and feeds them back to the communication device 1 (S667). However, the measurement data obtained in the step S604-2 may be fed back to the communication device 1 and the communication device 1 may determine the transmitting-antenna-setting candidates on its own.

Further, FIG. 24 also shows the procedure that is performed before the communication is resumed when communication disconnection or communication quality deterioration occurs (S668 to S671). In this exemplary embodiment, plural antenna-setting candidates are reserved in advance. Therefore, when communication disconnection or communication quality deterioration is detected (S668 and S669), another antenna setting of the communication device 1 may be selected and set from the reserve list (S670-1) and the communication may be thereby resumed.

<Twelfth Exemplary Embodiment>

A twelfth exemplary embodiment is characterized in that the training and the acquiring/setting of antenna-setting pairs are performed at a low rate (with a narrow band) and actual communication is performed at a relatively high rate (with a wide band). Alternatively, it is characterized in that parts the training and the acquiring/setting of antenna-setting pairs are performed at a low rate (with a narrow band) and the remaining part of the training and the acquiring/setting of antenna-setting pairs as well as actual communication is performed at a relatively high rate (with a wide band). The other operations may be performed by using the method according to one of the first to eleventh exemplary embodiments.

In millimeter wave communication, since free space propagation losses are large, the received power is expected to be small. Therefore, if an antenna is set so as to generate an omni or quasi-omni pattern in the training, there is a possibility that a sufficient CNR (Carrier to Noise Ratio) is not achieved. Accordingly, it is expected that the use of the low rate (narrow band) having better reception sensitivity provides advantageous effects such as making the training possible and improving the accuracy. It should be noted that the "use of low rate (narrow band)" means to narrow the frequency band used to transmit a training signal in order to narrow the noise bandwidth or to adopt a modulation technique having a small necessary CNR. Note that "to adopt a modulation technique having a small necessary CNR" means, in other words, to adopt a modulation technique in which the distance between signal points on the constellation is large (typically a smaller transmission rate). It should be noted that it is assumed that a narrow beam width is used in this exemplary embodiment. Therefore, there is no significant difference in optimal beam combinations (antenna-setting pairs) regardless of whether the transmission is preformed at a low rate (narrow band) or at a high rate (wide band) because the correlative bandwidth is wide.

<Other Exemplary Embodiments>

In the first to twelfth exemplary embodiments, examples in which each of the transceivers 400 and 500 includes both the transmitting antenna (405-1 to 405-M, or 505-1 to 505-K) and the receiving antenna (411-1 to 411-N, or 511-1 to 511-L) are shown. Further, no particular assumption is made for the relation between the length of the propagation path and the distance between the transmitting antennas 405-1 to 405-M and the receiving antennas 411-1 to 411-N of the transceivers 400. Similarly, no particular assumption is made for the relation between the length of the propagation path and the distance between the transmitting antennas 505-1 to 505-K and the receiving antennas 511-1 to 511-L of the transceivers 500. Further, cases where configurations of the transmitting antenna and the receiving antenna of each transceiver are usually different are shown. That is, examples where (i) a training for determining antenna setting candidates of the transmitting antennas 405-1 to 405-M of the transceiver 400 (S102), (ii) a training for determining antenna setting candidates of the receiving antennas 411-1 to 411-N of the transceiver 400 (S105), (iii) a training for determining antenna setting candidates of the transmitting antennas 505-1 to 505-K of the transceiver 500 (S103), and (iv) a training for determining antenna setting candidates of the receiving antennas 511-1 to 511-L of the transceiver 500 (S104), are separately performed are shown.

However, when each of the transceivers 400 and 500 has only one antenna array and the one antenna array is used for both the transmission and the reception by switching or by using a similar scheme, the workload of the procedure described in the first to twelfth exemplary embodiments is reduced to about the half. Because it can be considered that the transmitting-antenna-setting candidates (transmission beam direction) of the transceivers 400 are the same as its own receiving antenna-setting candidates (reception beam direction). This also holds true for the transmitting-antenna-setting candidates of the transceivers 500 (transmission beam direction) and its own receiving antenna-setting candidates (reception beam direction). For example, among the four steps S102 to S105 for determining antenna-setting candidates in FIG. 1A, a process corresponding to only two of these steps may be performed. The combination of the two steps to be performed may be any of the combinations of the steps S102 and S103, of the steps S102 and S104, of the steps S103 and S105, and of the steps S104 and S105. Further, as for the steps S109 and S110 for performing round-robin communication quality tests between antenna-setting candidates, a process corresponding to only one of these steps may be performed. The types of information items that need to be transferred are also reduced.

Further, even when each of the transceivers 400 and 500 has both the transmitting antenna and the receiving antenna, the workload of the procedure described in the first to twelfth exemplary embodiments can be reduced to about the half in a similar manner to the above-described manner when the distance between the transmitting antenna and the receiving antenna of each communication device is sufficiently small in comparison to the length of the propagation path and the configurations of the transmitting antenna and the receiving antenna of each communication device are identical to each other.

Incidentally, the term "communication quality" has been used in the above-described first to twelfth exemplary embodiments. The communication quality may be any value representing communication quality such as a received-signal level, a signal to noise ratio (SNR), a bit error rate (BER), a packet error rate (PER), and a frame error rate (FER), and one or more than one of them may be used. Further, a certain data string in a preamble contained in a transmission data string of the transmitter 401 or transmitter 501 may be used for the communication quality evaluation.

Further, controls and arithmetic operations for the generating and switching of antenna-setting candidates that are performed in the transceivers 400 and 500 in the above-described first to twelfth exemplary embodiments can be implemented using a computer, such as a microprocessor(s), to execute a program(s) for transceiver. For example, in the case of the first exemplary embodiment, these processes may be implemented by causing a computer running a transmission/reception control program to execute the steps of calculations and transmission/reception controls shown in the sequence diagram in FIGS. 18A to 18C and FIG. 19. Similarly, controls and arithmetic operations for the generating and switching of antenna-setting candidates that are performed in the transceiver 500 in the above-described first to fifth exemplary embodiments can be also implemented using a computer, such as a microprocessor(s), to execute a program(s) for transceiver controls. For example, in the case of the first exemplary embodiment, these processes may be implemented by causing a computer running a transceiver control program to execute the steps of calculations and transmission/reception controls shown in the sequence diagram in FIGS. 18A to 18C and FIG. 19.

Further, in addition to the process/arithmetic circuits 406 and 506, part of the transmitter circuits 403 and 503 (modulation process and the like), part of the receiver circuits 409 and 509 (demodulation process and the like), and components relating to digital signal processing or device control of the control circuits 407 and 507 and the like may be implemented by a computer(s) such as a microcomputer(s) or a DSP(s) (Digital Signal Processor). Further, the so-called "software-antenna technology" may be applied to the transceivers 400 and 500. Specifically, the antenna setting circuits 404, 410, 504 and 510 may be constructed by digital filters, or a computer(s) such as a DSP(s).

In the above explanation, situations where communication is performed between two transceivers are explained as examples. However, the present invention is applicable to other situations where three or more transceivers perform communication.

Further, the present invention is not limited to the above-described exemplary embodiments, and needless to say, various modifications can be made without departing from the spirit and scope of the present invention described above.

This application is based upon and claims the benefit of priority from Japanese patent application No. 2009-253118, filed on Nov. 4, 2009,the disclosure of which is incorporated herein in its entirety by reference.

Reference Signs List 400, 500 TRANSCEIVER
401, 801, 81, 91 TRANSMITTER
402, 502, 82, 92 RECEIVER
403, 503 TRANSMITTER CIRCUIT
404 ANTENNA SETTING CIRCUIT
404-1 to 404-M, 504-1 to 504-K AWV (ARRAY WEIGHT VECTOR) CONTROL CIRCUIT
405-1 to 405-M, 505-1 to 505-K TRANSMISSION RADIATING ELEMENT
406, 506 PROCESS/ARITHMETIC CIRCUIT
407, 507 CONTROL CIRCUIT
408, 508 STORAGE CIRCUIT
409, 509 RECEIVER CIRCUIT 410 ANTENNA SETTING CIRCUIT
410-1 to 410-N, 510-1 to 510-L AWV (ARRAY WEIGHT VECTOR) CONTROL CIRCUIT
411-1 to 411-N, 511-1 to 511-L RECEPTION RADIATING ELEMENT
413, 513 CONTROL CIRCUIT
414 ANTENNA SETTING CIRCUIT
414-1 to 414-M SWITCH
415-1 to 415-M TRANSMISSION RADIATING ELEMENT
416 ANTENNA SETTING CIRCUIT
416-1 to 416-N SWITCH
417-1 to 417-N RECEPTION RADIATING ELEMENT
83 BEAM PATTERN (IMAGE)
084, 85 REFLECTOR
86 HUMAN BODY
61 WALL
62 REFLECTOR

The invention claimed is:

1. A control method of a radio communication system comprising first and second communication devices, wherein
the first communication device is configured to control a transmission beam direction of a first transmitting antenna by changing transmitting-antenna setting and to control a reception beam direction of a first receiving antenna by changing receiving-antenna setting,
the second communication device is configured to control a transmission beam direction of a second transmitting antenna by changing transmitting-antenna setting and to control a reception beam direction of a second receiving antenna by changing receiving-antenna setting, and
the method comprises:
(a) transmitting a training signal from the first transmitting antenna while changing antenna setting of the first transmitting antenna;
(b) receiving the training signal by the second receiving antenna in a state where a fixed beam pattern is set in the second receiving antenna;
(c) obtaining a data string describing a relation between antenna setting of the first transmitting antenna and a reception signal characteristic of the second receiving antenna based on a reception result of the training signal obtained in the operation (b);
(d) determining, by using the data string, at least one first transmitting-antenna-setting candidate, which each serves as a candidate to be used for communication, of the first transmitting antenna;
(e) determining at least one second transmitting-antenna-setting candidate, which each serves as a candidate to be used for communication, of the second transmitting antenna, by performing the operations (a) to (d), which were performed by using the first transmitting antenna and the second receiving antenna, for a combination of the second transmitting antenna and the first receiving antenna;
(f) transmitting a training signal from the first transmitting antenna in a state where a fixed beam pattern is set in the first transmitting antenna;
(g) receiving the training signal by the second receiving antenna while changing antenna setting of the second receiving antenna;
(h) obtaining a data string describing a relation between antenna setting and a reception signal characteristic of the second receiving antenna based on a reception result of a training signal obtained in the operation (g);
(i) determining at least one second receiving-antenna-setting candidate, which each serves as a candidate to be used for communication, of the second receiving antenna by using the data string;
(j) determining at least one first receiving-antenna-setting candidate, which each serves as a candidate to be used for communication, of the first receiving antenna, by performing the operations (f) to (i), which were performed by using the first transmitting antenna and the second receiving antenna, for a combination of the second transmitting antenna and the first receiving antenna; and
(k) using, for communication between the first and second communication devices, a combination of one of the at least one first transmitting-antenna-setting candidate and one of the at least one second receiving-antenna-setting candidate, and a combination of one of the at least one first receiving-antenna-setting candidate and one of the at least one second transmitting-antenna-setting candidate.

2. The control method of a radio communication system according to claim 1, wherein
the operation (k) comprises:
measuring communication quality for all or some of combinations between the at least one first transmitting-antenna-setting candidate and the at least one second receiving-antenna-setting candidate, and for all or some of combinations between the at least one first receiving-antenna-setting candidate and the at least one second transmitting-antenna-setting candidate; and
selecting at least one combination of antenna-setting candidates to be used for communication based on the measured communication quality.

3. The control method of a radio communication system according to claim 2, wherein the operation (k) comprises:
assigning priority order to the at least one combination of antenna-setting candidates in descending order of communication quality; and
performing radio communication by using a combination of antenna-setting candidates that is successively selected according to this priority order.

4. The control method of a radio communication system according to claim 2, wherein the operation (k) comprises:
assigning priority order to the at least one combination of antenna-setting candidates in descending order of communication quality; and
performing radio communication by using a combination of antenna-setting candidates ranked in a highest position of the priority order.

5. The control method of a radio communication system according to claim 1, wherein the operation (k) comprises obtaining each of the combination of the first transmitting-antenna-setting candidate and the second receiving antenna candidate and the combination of the first receiving-antenna-setting candidate and the second transmitting antenna candidate by combining antenna-setting candidates that are ranked in same positions when arranged according to their reception signal characteristic obtained at a time of a training.

6. The control method of a radio communication system according to claim 5, wherein the operation (k) comprises:
assigning priority order to the at least one combination of antenna-setting candidates in descending order of their reception signal characteristic; and
performing radio communication by using a combination of antenna-setting candidates that is successively selected according to this priority order.

7. The control method of a radio communication system according to claim 3, wherein the operation (k) comprises:
monitoring communication quality during communication;
selecting a combination of antenna-setting candidates in a next rank according to the priority order in response to deterioration in the communication quality; and
performing radio communication by applying the selected combination of antenna-setting candidates.

8. The control method of a radio communication system according to claim 1, wherein
the operation (a) comprises scanning a transmission beam direction of the first transmitting antenna by changing antenna setting of the first transmitting antenna,
the operation (e) comprises scanning a transmission beam direction of the second transmitting antenna by changing antenna setting of the second transmitting antenna,
the operation (g) comprises scanning a reception beam direction of the second receiving antenna by changing antenna setting of the second receiving antenna, and
the operation (j) comprises scanning a reception beam direction of the first receiving antenna by changing antenna setting of the first receiving antenna.

9. The control method of a radio communication system according to claim 1, wherein
at least one of four groups of operations including: the operations (a) and (b); operations in the operation (e) corresponding to the operations (a) and (b); the operations (f) and (g); and operations in the operations (j) corresponding to the operations (f) and (g), comprises:
dividing the fixed beam pattern into a plurality of fixed beam patterns; and
performing the group of operations for each of the divided fixed beam patterns.

10. The control method of a radio communication system according to claim 1, wherein the fixed beam pattern is an omni (nondirectional) pattern or a quasi-omni (quasi-nondirectional) pattern.

11. The control method of a radio communication system according to claim 1, wherein the operation (d) is performed in the second communication device, and information including the at least one first transmitting-antenna-setting candidate is transmitted from the second communication device to the first communication device.

12. The control method of a radio communication system according to claim 1, wherein an operation in the operation (e) corresponding to the operation (d) is performed in the first communication device, and information including the at least one second transmitting-antenna-setting candidate is transmitted from the first communication device to the second communication device.

13. The control method of a radio communication system according to claim 11, wherein the operation (i) comprises transmitting a number of the at least one second receiving-antenna-setting candidate from the second communication device to the first communication device.

14. The control method of a radio communication system according to claim 11, wherein an operation in the operation (j) corresponding to the operation (i) comprises transmitting a number of the at least one first receiving-antenna-setting candidate from the first communication device to the second communication device.

15. The control method of a radio communication system according to claim 1, wherein a reception characteristic of the training signal received in the operation (b) or the data string obtained in the operation (c) is transmitted from the second communication device to the first communication device, and the operation (d) is performed in the first communication device.

16. The control method of a radio communication system according to claim 1, wherein a reception characteristic of the training signal received in an operation in the operation (e) corresponding to the operation (b) or the data string obtained in an operation in the operation (e) corresponding to the operation (c) is transmitted from the first communication device to the second communication device, and an operation in the operation (e) corresponding to the operation (d) is performed in the second communication device.

17. The control method of a radio communication system according to claim 15, wherein the operation (k) comprises:
transmitting a number of the at least one second receiving-antenna-setting candidate determined in the operation (i) from the second communication device to the first communication device; and
transmitting a number of the at least one second transmitting-antenna-setting candidate determined in an operation in the operation (e) corresponding to the operation (d) from the second communication device to the first communication device.

18. The control method of a radio communication system according to claim 15, wherein the operation (k) comprises:
transmitting a number of the at least one first receiving-antenna-setting candidate determined in an operation in the operation (j) corresponding to the operation (i) from the first communication device to the second communication device; and
transmitting a number of the at least one first transmitting-antenna-setting candidate determined in the operation (d) from the first communication device to the second communication device.

19. The control method of a radio communication system according to claim 1, wherein when at least one of the at least one first transmitting-antenna-setting candidate, the at least one second transmitting-antenna-setting candidate, the at least one first receiving-antenna-setting candidate, and the at least one second receiving-antenna-setting candidate is determined, information on a beam direction corresponding to each antenna setting is used.

20. The control method of a radio communication system according to claim 19, wherein when at least one of the at least one first transmitting-antenna-setting candidate, the at least one second transmitting-antenna-setting candidate, the at least one first receiving-antenna-setting candidate, and the at least one second receiving-antenna-setting candidate is determined, a data string describing a relation between a beam direction corresponding to each antenna setting and a reception signal characteristic is created and peak detection is performed in the data string.

21. A control method of a radio communication system comprising first and second communication devices, wherein
the first communication device is configured to control a transmission beam direction of a first transmitting antenna by changing transmitting-antenna setting and to control a reception beam direction of a first receiving antenna by changing receiving-antenna setting,
the second communication device is configured to transmit a radio signal from a second transmitting antenna and receive a radio signal by a second receiving antenna, and
the method comprises:
(a) transmitting a training signal from the first transmitting antenna while changing antenna setting of the first transmitting antenna;

(b) receiving the training signal by the second receiving antenna having a fixed beam pattern;

(c) obtaining a data string describing a relation between antenna setting of the first transmitting antenna and a reception signal characteristic of the second receiving antenna based on a reception result of the training signal obtained in the operation (b);

(d) determining, by using the data string, transmitting-antenna-setting candidates, which each serves as a candidate to be used for communication, of the first transmitting antenna;

(e) transmitting a training signal from the second transmitting antenna having a fixed beam pattern;

(f) receiving the training signal by the first receiving antenna while changing antenna setting of the first receiving antenna;

(g) obtaining a data string describing a relation between antenna setting and a reception signal characteristic of the first receiving antenna based on a reception result of the training signal obtained in the operation (f);

(h) determining, by using the data string, receiving-antenna-setting candidates, which each serves as a candidate to be used for communication, of the first receiving antenna; and (i) performing communication between the first and second communication devices by applying one of the transmitting-antenna-setting candidates to the first transmitting antenna and applying one of the receiving-antenna-setting candidates to the first receiving antenna obtained through a procedure including the operations (a) to (h).

22. The control method of a radio communication system according to claim 21, wherein
the operation (a) comprises scanning a transmission beam direction of the first transmitting antenna by changing antenna setting of the first transmitting antenna, and
the operation (f) comprises scanning a reception beam direction of the first receiving antenna by changing antenna setting of the first receiving antenna.

23. The control method of a radio communication system according to claim 21, wherein
at least one of two groups of operations including the operations (a) and (b) and the operations (e) and (f) comprises:
dividing the fixed beam pattern into a plurality of fixed beam patterns; and
performing the group of operations for each of the divided fixed beam patterns.

24. The control method of a radio communication system according to claim 21, wherein the fixed beam pattern is an omni (nondirectional) pattern or a quasi-omni (quasi-nondirectional) pattern.

25. The control method of a radio communication system according to claim 21, wherein the operation (d) is performed in the second communication device, and information including the transmitting-antenna-setting candidates is transmitted from the second communication device to the first communication device.

26. The control method of a radio communication system according to claim 21, wherein a reception characteristic of the training signal received in the operation (b) or the data string obtained in the operation (c) is transmitted from the second communication device to the first communication device, and the operation (d) is performed in the first communication device.

27. The control method of a radio communication system according to claim 21, wherein when at least one of the transmitting-antenna-setting candidates and the receiving-antenna-setting candidates are determined, information on a beam direction corresponding to each antenna setting candidate is used.

28. The control method of a radio communication system according to claim 27, wherein when at least one of the transmitting-antenna-setting candidates and the receiving antenna-setting candidates are determined, a data string describing a relation between a beam direction corresponding to each antenna setting and a reception signal characteristic is created and peak detection is performed in the data string.

29. The control method of a radio communication system according to claim 21, wherein the operation (i) comprises:
assigning priority order to the transmitting-antenna-setting candidates and the receiving-antenna-setting candidates in descending order of their reception signal characteristic; and
performing radio communication by using a transmitting-antenna-setting candidate and a receiving-antenna-setting candidate that are successively selected according to this priority order.

30. The control method of a radio communication system according to claim 29, wherein the operation (i) comprises:
monitoring communication quality during communication;
selecting a transmitting-antenna-setting candidate and a receiving-antenna-setting candidate in next ranks according to the priority order in response to deterioration in the communication quality; and
performing radio communication by applying the selected transmission and receiving antenna-setting candidates.

31. The control method of a radio communication system according to claim 1, wherein a radio wave containing a signal that is mainly used for data communication, and a radio wave having a smaller data transmission rate or a narrower transmission frequency band in comparison with the radio wave containing the signal are used; and a training or a part of a training is carried out by using the radio wave having the smaller data transmission rate or the narrower transmission frequency band.

32. A radio communication system comprising: a first communication device configured to transmit a radio signal from a first transmitting antenna and to receive a radio signal by a first receiving antenna; and a second communication device is configured to transmit a radio signal from a second transmitting antenna and to receive a radio signal by a second receiving antenna, wherein the first and second communication devices are further configured to perform a process of determining a transmitting-antenna-setting candidate and a receiving-antenna-setting candidate used for radio communication in a cooperative manner, the determination process includes: (a) transmitting a training signal from the first transmitting antenna while changing antenna setting of the first transmitting antenna and thereby changing a transmission beam direction; (b) receiving the training signal by the second receiving antenna in a state where a fixed beam pattern is set in the second receiving antenna; (c) obtaining a data string describing a relation between antenna setting of the first transmitting antenna and a reception signal characteristic of the second receiving antenna based on a reception result of a training signal obtained in the operation (b); (d) determining, by using the data string, at least one first transmitting-antenna-setting candidate, which each serves as a candidate to be used for communication, of the first transmitting antenna; (e) determining at least one second transmitting-antenna- setting candidate, which each serves as a candidate to be used for communication, of the second transmitting antenna, by performing the operations (a) to (d), which were performed by using the first transmitting antenna and the second receiving antenna, for a combination of the second transmitting antenna and the first receiving antenna; (f) transmitting a training signal from the first transmitting antenna in a state where a fixed beam pattern is set in the first transmitting antenna; (g) receiving the training signal by the second receiving antenna while changing antenna setting of the second receiving antenna and thereby changing a reception beam direction; (h) obtaining a data string describing a relation between antenna setting and a reception signal characteristic of the second receiving antenna based on a reception result of the training signal obtained in the operation (g); (i) determining at least one second receiving-antenna-setting candidate, which each serves as a candidate to be used for communication, of the second receiving antenna by using the data string obtained in operation (h); (j) determining at least one first receiving-antenna-setting candidate, which each serves as a candidate to be used for communication, of the first receiving antenna, by performing the operations (f) to (i), which were performed by using the first transmitting antenna and the second receiving antenna, for a combination of the second transmitting antenna and the first receiving antenna; and (k) using, for communication between the first and second communication devices, a combination of one of the at least one first transmitting-antenna-setting candidate and one of the at least one second receiving- antenna-setting candidate, and the combination of one of the at least one first receiving- antenna-setting candidate and one of the at least one second transmitting-antenna-setting candidate.

33. The radio communication system according to claim 32, wherein
the operation (k) comprises:
measuring communication quality for all or some of combinations between the at least one first transmitting-antenna-setting candidates and the at least one second receiving-antenna-setting candidates, and for all or some of combinations between the at least one first receiving-antenna-setting candidates and the at least one second transmitting-antenna-setting candidates; and
selecting at least one combination of antenna-setting candidates to be used for communication based on the measured communication quality.

34. The radio communication system according to claim 33, wherein the operation (k) comprises:
assigning priority order to the at least one combination of antenna-setting candidates in descending order of communication quality; and
performing radio communication by using a combination of antenna-setting candidates that is successively selected according to this priority order.

35. The radio communication system according to claim 33, wherein the operation (k) comprises:
assigning priority order to the at least one combination of antenna-setting candidates in descending order of communication quality; and
performing radio communication by using a combination of antenna-setting candidates ranked in a highest position of the priority order.

36. The radio communication system according to claim 32, wherein each of the combination of the first transmitting-antenna-setting candidate and the second receiving antenna candidate and the combination of the first receiving-antenna-setting candidate and the second transmitting-antenna-setting candidate is obtained by combining antenna-setting candidates that are ranked in same positions when arranged according to their reception signal characteristic obtained at a time of a training.

37. The radio communication system according to claim 36, wherein the operation (k) comprises:
assigning priority order to the at least one combination of antenna-setting candidates in descending order of their reception signal characteristic; and
performing radio communication by using a combination of antenna-setting candidates that is successively selected according to this priority order.

38. The radio communication system according to claim 34, wherein the operation (k) comprises:
monitoring communication quality during communication;
selecting a combination of antenna-setting candidates in a next rank according to the priority order in response to deterioration in the communication quality; and
performing radio communication by applying the selected combination of antenna-setting candidates.

39. The radio communication system according to claim 32, wherein
the operation (a) comprises scanning a transmission beam direction of the first transmitting antenna by changing antenna setting of the first transmitting antenna,
the operation (e) comprises scanning a transmission beam direction of the second transmitting antenna by changing antenna setting of the second transmitting antenna,
the operation (g) comprises scanning a reception beam direction of the second receiving antenna by changing antenna setting of the second receiving antenna, and
the operation (j) comprises scanning a reception beam direction of the first receiving antenna by changing antenna setting of the first receiving antenna.

40. The radio communication system according to claim 32, wherein
at least one of four groups of operations including: the operations (a) and (b); operations in the operation (e) corresponding to the operations (a) and (b); the operations (f) and (g); and operations in the operations (j) corresponding to the operations (f) and (g), comprises:
dividing the fixed beam pattern into a plurality of fixed beam patterns; and
performing the group of operations for each of the divided fixed beam patterns.

41. The radio communication system according to claim 32, wherein the fixed beam pattern is an omni (nondirectional) pattern or a quasi-omni (quasi-nondirectional) pattern.

42. The radio communication system according to claim 32, wherein
the operation (d) is performed in the second communication devices, and
the second communication device is configured to transmit information including the at least one first transmitting-antenna-setting candidate to the first communication device.

43. The radio communication system according to claim 32, wherein
an operation in the operation (e) corresponding to the operation (d) is performed in the first communication devices, and
the first communication device is configured to transmit information including the at least one second transmitting-antenna-setting candidate to the second communication device.

44. The radio communication system according to claim 42, wherein
the operation (i) is performed in the second communication devices, and
the second communication device is configured to transmit a number of the at least one second receiving-antenna-setting candidate to the first communication device.

45. The radio communication system according to claim 42, wherein
an operation in the operation (j) corresponding to the operation (i) is performed in the first communication devices, and
the first communication device is configured to transmit a number of the at least one first receiving-antenna-setting candidate to the second communication device.

46. The radio communication system according to claim 32, wherein
operation (d) is performed in the first communication devices, and
the second communication device is configured to transmit a reception characteristic of the training signal received in the operation (b) or the data string obtained in the operation (c) to the first communication device.

47. The radio communication system according to claim 32, wherein
an operation in the operation (e) corresponding to the operation (d) is performed in the second communication devices, and
the first communication device is configured to transmit a reception characteristic of the training signal received in an operation in the operation (e) corresponding to the operation (b) or the data string obtained in an operation in the operation (e) corresponding to the operation (c) to the second communication device.

48. The radio communication system according to claim 46, wherein
the operation (k) comprises:
transmitting a number of the at least one second receiving-antenna-setting candidate determined in the operation (i) from the second communication device to the first communication device; and
transmitting a number of the at least one second transmitting-antenna-setting candidate determined an operation in the operation (e) corresponding to the operation (d) from the second communication device to the first communication device.

49. The radio communication system according to claim 46, wherein
the operation (k) comprises:
transmitting a number of the at least one first receiving-antenna-setting candidate in an operation in the operation (j) corresponding to the operation (i) from the first communication device to the second communication device; and
transmitting a number of the at least one first transmitting-antenna-setting candidate determined in the operation (d) from the first communication device to the second communication device.

50. The radio communication system according to claim 32, wherein when at least one of the at least one first transmitting-antenna-setting candidate, the at least one second transmitting-antenna-setting candidate, the at least one first receiving-antenna-setting candidate, and the at least one second receiving-antenna-setting candidate is determined, information on a beam direction corresponding to each antenna setting is used.

51. The radio communication system according to claim 50, wherein when at least one of the at least one first transmitting-antenna-setting candidate, the at least one second transmitting-antenna-setting candidate, the at least one first receiving-antenna-setting candidate, and the at least one second receiving-antenna-setting candidate is determined, a data string describing a relation between a beam direction corresponding to each antenna setting and a reception signal characteristic is created and peak detection is performed in the data string.

52. A radio communication system comprising: a first communication device configured to transmit a radio signal from a first transmitting antenna and to receive a radio signal by a first receiving antenna; and a second communication device configured to transmit a radio signal from a second transmitting antenna and to receive a radio signal by a second receiving antenna, wherein the first and second communication devices are further configured to perform a process of determining a transmitting-antenna-setting candidate and a receiving-antenna-setting candidate used for radio communication in a cooperative manner, the determination process includes: (a) transmitting a training signal from the first transmitting antenna while changing antenna setting of the first transmitting antenna and thereby changing a transmission beam direction; (b) receiving the training signal by the second receiving antenna having a fixed beam pattern; (c) obtaining a data string describing a relation between antenna setting of the first transmitting antenna and a reception signal characteristic of the second receiving antenna based on a reception result of the training signal obtained in the operation (b); (d) determining, by using the data string, transmitting-antenna-setting candidates, which each serves as a candidate to be used for communication, of the first transmitting antenna; (e) transmitting a training signal from the second transmitting antenna having a fixed beam pattern; (f) receiving the training signal by the first receiving antenna while changing antenna setting of the first receiving antenna and thereby changing a reception beam direction; (g) obtaining a data string describing a relation between antenna setting and a reception signal characteristic of the first receiving antenna based on a reception result of the training signal obtained in the operation (f); (h) determining receiving-antenna-setting candidates, which each serves as a candidate to be used for communication, of the first receiving antenna by using the data string obtained in the operation (g); and (i) performing communication between the first and second communication devices by applying one of the transmitting-antenna-setting candidates to the first transmitting antenna and applying one of the receiving-antenna-setting candidates to the first receiving antenna.

53. The radio communication system according to claim 52, wherein
the operation (a) comprises scanning a transmission beam direction of the first transmitting antenna by changing antenna setting of the first transmitting antenna, and
the operation (f) comprises scanning a reception beam direction of the first receiving antenna by changing antenna setting of the first receiving antenna.

54. The radio communication system according to claim 52, wherein
at least one of two groups of operations including the operations (a) and (b) and the operations (e) and (f) comprises:
dividing the fixed beam pattern into a plurality of fixed beam patterns; and
performing the group of operations for each of the divided fixed beam patterns.

55. The radio communication system according to claim 52, wherein the fixed beam pattern is an omni (nondirectional) pattern or a quasi-omni (quasi-nondirectional) pattern.

56. The radio communication system according to claim 52, wherein
the operation (d) is performed in the second communication devices, and
the second communication device is configured to transmit information including the transmitting-antenna-setting candidates to the first communication device.

57. The radio communication system according to claim 52, wherein
the operation (d) is performed in the first communication devices, and
the second communication device is configured to transmit a reception characteristic of the training signal received in the operation (b) or the data string obtained in the operation (c) to the first communication device.

58. The radio communication system according to claim 52, wherein when at least one of the transmitting-antenna-setting candidates and the receiving-antenna-setting candidates are determined, information on a beam direction corresponding to each antenna setting candidate is used.

59. The radio communication system according to claim 58, wherein when at least one of the transmitting-antenna-setting candidates and the receiving-antenna-setting candidates are determined, a data string describing a relation between a beam direction corresponding to each antenna setting and a reception signal characteristic is created and peak detection is performed in the data string.

60. The radio communication system according to claim 52, wherein the operation (i) comprises:
assigning a priority rank to the transmitting-antenna-setting candidates and the receiving antenna-setting candidates in descending order of their reception signal characteristic; and
performing radio communication by using a transmitting-antenna-setting candidate and a receiving-antenna-setting candidate that are successively selected according to this priority order.

61. The radio communication system according to claim 60, wherein the operation (i) comprises
monitoring communication quality during communication;
selecting a transmitting-antenna-setting candidate and a receiving-antenna-setting candidate in next ranks according to the priority order in response to deterioration in the communication quality; and
performing radio communication by applying the selected transmission and receiving antenna-setting candidates.

62. The radio communication system according to claim 32, wherein at least one of the first and second transmitting antennas and the first and second receiving antennas is a phased array antenna.

63. The radio communication system according to claim 62, wherein the antenna setting includes setting of an array weight vector.

64. The radio communication system according to claim 32, wherein at least one of the first and second transmitting antennas and the first and second receiving antennas is a sector-selectable antenna.

65. The radio communication system according to claim 64, wherein the antenna setting includes setting of a switch that selects a radiating element.

66. The radio communication system according to claim 32, wherein at least one of the first and second transmitting antennas and the first and second receiving antennas is a mechanical antenna.

67. The radio communication system according to claim 66, wherein the antenna setting is performed by a mechanical operation for an antenna direction.

68. The radio communication system according to claim 32, wherein the reception signal characteristic includes at least one of a received power, a signal to noise ratio (SNR), a bit error rate (BER), a packet error rate (PER), and a frame error rate (FER).

69. The radio communication system according to claim 32, wherein a radio wave containing a signal that is mainly used for data communication, and a radio wave having a smaller data transmission rate or a narrower transmission frequency band in comparison with the radio wave containing the signal are used; and a training or a part of a training is carried out by using the radio wave having the smaller data transmission rate or the narrower transmission frequency band.

70. A radio communication apparatus that performs radio communication with a corresponding device, comprising:
a transmitting-antenna setting control unit that controls a transmission beam direction of a first transmitting antenna by changing transmitting-antenna setting;
a receiving-antenna setting control unit that controls a reception beam direction of a first receiving antenna by changing receiving-antenna setting; and
a processing unit that performs a process of determining a transmitting-antenna-setting candidate and receiving-antenna-setting candidate, used for radio communication with the corresponding device, in a cooperative manner with the corresponding device, wherein
the process of determining a transmitting and receiving-antenna-setting candidate comprises:
(a) determining at least one first transmitting-antenna-setting candidate to be used for transmission of the radio communication apparatus and at least one first receiving-antenna-setting candidate to be used for reception performed of the radio communication apparatus by performing at least one of (i) a first training in which the radio communication apparatus transmits a first training signal while changing transmitting-antenna setting and thereby changing a transmission beam direction and the corresponding device receives the first training signal while maintaining a reception beam pattern in a fixed state, and (ii) a second training in which the corresponding device transmits a second training signal while maintaining a transmission beam pattern in a fixed state and the radio communication apparatus receives the second training signal while changing receiving-antenna setting and thereby changing a reception beam direction;
(b) determining at least one second transmitting-antenna-setting candidate to be used for transmission of the corresponding device and at least one second receiving-antenna-setting candidate to be used for reception of the corresponding device by performing at least one of (i) a third training in which the corresponding device transmits a third training signal while changing transmitting-antenna setting and thereby changing a transmission beam direction and the radio communication apparatus receives the third training signal while maintaining a reception beam pattern in a fixed state, and (ii) a fourth training in which the radio communication apparatus transmits a fourth training signal while maintaining a transmission beam pattern in a fixed state and the corresponding device receives the fourth training signal while changing receiving-antenna setting and thereby changing a reception beam direction; and (c) applying, for communication between the radio communication apparatus and the corresponding device, a combination of one of the at least one first transmitting-antenna-setting candidate and one of the at least one second receiving-antenna-setting candidate, and a combination of one of the at least one first receiving-antenna-setting candidate and one of the at least one second transmitting-antenna-setting candidate.

71. The radio communication apparatus according to claim 70, wherein the process (c) comprises:

measuring communication quality for all or some of combinations between the at least one first transmitting-antenna-setting candidates and the at least one second receiving-antenna-setting candidates, and for all or some of combinations between the at least one first receiving-antenna-setting candidates and the at least one second transmitting-antenna-setting candidates; and selecting at least one combination of antenna-setting candidates to be used for communication based on the measured communication quality.

72. The radio communication apparatus according to claim 71, wherein the process (c) comprises:

assigning priority order to the at least one combination of antenna-setting candidates in descending order of communication quality; and performing radio communication by using a combination of antenna-setting candidates that is successively selected according to this priority order.

73. The radio communication apparatus according to claim 70, wherein the first transmitting antenna is a transmitting/receiving common antenna that also serves as the first receiving antenna, and the second transmitting antenna is a transmitting/receiving common antenna that also serves as the second receiving antenna.

74. A control method of a radio communication system in which first and second communication devices perform radio communication with each other, comprising:

(i) selecting a transmission beam candidate of the first communication device by making the first communication device scan a beam direction and thereby transmit a first training signal and making the second communication device receive the first training signal with a fixed beam pattern;

(i) selecting a reception beam candidate of the second communication device by making the first communication device transmit a second training signal with a fixed beam pattern and making the second communication device scan a beam direction and thereby receive the second training signal; and (iii) performing a training for combining the transmission beam candidate with the reception beam candidate.

75. The control method of a radio communication system according to claim 74, wherein the fixed beam pattern is an omni pattern (nondirectional pattern) or a quasi-omni pattern (quasi-nondirectional pattern).

76. The control method of a radio communication system according to claim 74, wherein the fixed beam pattern is divided into a plurality of fixed beam patterns.

77. A radio communication system in which first and second communication devices perform radio communication with each other, comprising:

(i) first training section operable to make the first communication device scan a beam direction and thereby transmit a first training signal and to make the second communication device receive the first training signal with a fixed beam pattern;

(ii) second training section operable to make the first communication device transmit a second training signal with a fixed beam pattern and to make the second communication device scan a beam direction and thereby receive the second training signal; and (iii) third training section operable to combine the transmission beam candidate selected by the first training section with the reception beam candidate selected by the second training section.

78. The radio communication system according to claim 77, wherein the fixed beam pattern is an omni pattern or a quasi-omni pattern.

79. The radio communication system according to claim 77, wherein the fixed beam pattern is divided into a plurality of fixed beam patterns.

80. A radio communication system comprising:

a first communication device configured to transmit a radio signal from a first transmitting antenna and to receive a radio signal by a first receiving antenna;

a second communication device is configured to transmit a radio signal from a second transmitting antenna and to receive a radio signal by a second receiving antenna;

first means for transmitting a training signal from the first transmitting antenna while changing antenna setting of the first transmitting antenna and thereby changing a transmission beam direction;

second means for receiving the training signal by the second receiving antenna in a state where a fixed beam pattern is set in the second receiving antenna;

third means for obtaining a data string describing a relation between antenna setting of the first transmitting antenna and a reception signal characteristic of the second receiving antenna based on a reception result of a training signal obtained by the second means;

fourth means for determining, by using the data string, at least one first transmitting-antenna-setting candidate, which each serves as a candidate to be used for communication, of the first transmitting antenna;

fifth means for determining at least one second transmitting-antenna-setting candidate, which each serves as a candidate to be used for communication, of the second transmitting antenna, by performing similar processes to those of the first to fourth determining the at least one first transmitting-antenna-setting candidate, for a combination of the second transmitting antenna and the first receiving antenna;

sixth means for transmitting a training signal from the first transmitting antenna in a state where a fixed beam pattern is set in the first transmitting antenna;

seventh means for receiving the training signal by the second receiving antenna while changing antenna setting of the second receiving antenna and thereby changing a reception beam direction;

eighth means for obtaining a data string describing a relation between antenna setting and a reception signal characteristic of the second receiving antenna based on a reception result of the training signal obtained by the seventh means;

ninth means for determining at least one second receiving-antenna-setting candidate, which each serves as a candidate to be used for communication, of the second receiving antenna by using the data string obtained by the eighth means;

tenth means for determining at least one first receiving-antenna-setting candidate, which each serves as a candidate to be used for communication, of the first receiving antenna, by performing similar processes to those of the sixth to ninth means for determining the at least one second receiving-antenna-setting candidate, for a combination of the second transmitting antenna and the first receiving antenna; and eleventh means for using, for communication between the first and second communication devices, a combination of one of the at least one first transmitting-antenna-setting candidate and one of the at least one second receiving-antenna-setting candidate, and the combination of one of the at least one first receiving-antenna-setting candidate and one of the at least one second transmitting-antenna-setting candidate.

81. A radio communication system comprising:

a first communication device configured to transmit a radio signal from a first transmitting antenna and to receive a radio signal by a first receiving antenna;

a second communication device configured to transmit a radio signal from a second transmitting antenna and to receive a radio signal by a second receiving antenna;

first means for transmitting a training signal from the first transmitting antenna while changing antenna setting of the first transmitting antenna and thereby changing a transmission beam direction;

second means for receiving the training signal by the second receiving antenna having a fixed beam pattern;

third means for obtaining a data string describing a relation between antenna setting of the first transmitting antenna and a reception signal characteristic of the second receiving antenna based on a reception result of the training signal obtained by the second means;

fourth means for determining, by using the data string, transmitting-antenna-setting candidates, which each serves as a candidate to be used for communication, of the first transmitting antenna;

fifth means for transmitting a training signal from the second transmitting antenna having a fixed beam pattern;

sixth means for receiving the training signal by the first receiving antenna while changing antenna setting of the first receiving antenna and thereby changing a reception beam direction;

seventh means for obtaining a data string describing a relation between antenna setting and a reception signal characteristic of the first receiving antenna based on a reception result of the training signal obtained by the sixth means;

eighth means for determining receiving-antenna-setting candidates, which each serves as a candidate to be used for communication, of the first receiving antenna by using the data string obtained by the seventh means; and ninth means for performing communication between the first and second communication devices by applying one of the transmitting-antenna-setting candidates to the first transmitting antenna and applying one of the receiving-antenna-setting candidates to the first receiving antenna.

82. A radio communication system in which first and second communication devices perform radio communication with each other, comprising:

(i) first training making the first communication device scan a beam direction and thereby transmit a first training signal and making the second communication device receive the first training signal with a fixed beam pattern;

(ii) second training making the first communication device transmit a second training signal with a fixed beam pattern and making the second communication device scan a beam direction and thereby receive the second training signal; and (iii) third training combining the transmission beam candidate selected by the first training means with the reception beam candidate selected by the second training means.

* * * * *